(12) United States Patent
Waun et al.

(10) Patent No.: US 11,296,628 B2
(45) Date of Patent: *Apr. 5, 2022

(54) SYSTEM FOR ANTICIPATING LOAD CHANGES

(71) Applicant: General Electric Company, Schenectady, NY (US)

(72) Inventors: Scott Douglas Waun, Loveland, OH (US); Michael Thomas Gansler, Mason, OH (US); Mary Kathryn Thompson, Fairfield Township, OH (US); Joshua Tyler Mook, Loveland, OH (US); Michael Robert Notarnicola, Cincinnati, OH (US); Aigbedion Akwara, Cincinnati, OH (US); Kevin Michael VandeVoorde, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/000,797

(22) Filed: Aug. 24, 2020

(65) Prior Publication Data

US 2020/0389106 A1 Dec. 10, 2020

Related U.S. Application Data

(63) Continuation of application No. 16/418,071, filed on May 21, 2019, now Pat. No. 10,770,996.

(51) Int. Cl.
*H02P 9/04* (2006.01)
*F02B 75/28* (2006.01)
(Continued)

(52) U.S. Cl.
CPC .............. *H02P 9/04* (2013.01); *F02B 63/041* (2013.01); *F02B 75/282* (2013.01); *F02D 29/06* (2013.01);
(Continued)

(58) Field of Classification Search
CPC .......... H02P 9/04; H02P 9/02; H02P 2101/25; F02B 63/041; F02B 75/282; F02D 29/06; H02K 7/1884
See application file for complete search history.

(56) References Cited

U.S. PATENT DOCUMENTS 4,138,847 A 2/1979 Hill
5,370,112 A 12/1994 Perkins
(Continued)

FOREIGN PATENT DOCUMENTS

DE 19636738 A1 3/1998

OTHER PUBLICATIONS

Atco Power, Combined-Cycle Plants, Our Facilities, Our Power Technologies, 1 Page. https://www.atcopower.com/Our-Facilities/Our-Power-Technologies/Combined-Cycle-Plants/.
(Continued)

*Primary Examiner* — Sean Gugger
(74) *Attorney, Agent, or Firm* — Dority & Manning, P.A.

(57) ABSTRACT

Systems and methods for converting energy are provided. In one aspect, the system includes a closed cycle engine having a piston body and a piston assembly movable within the piston body. An electric machine is operatively coupled with the piston assembly and operable to generate electrical power. An electrical device is in communication with the electric machine. The system includes a control system having sensors, a controllable device, and a controller. The controller is configured to determine whether a load change on the electric machine is anticipated based at least in part
(Continued)

on received data indicative of a load state of the electrical device; in response to whether the load change is anticipated, determine a control command for adjusting an output of at least one of the engine and the electric machine; and cause the controllable device to adjust the output based at least in part on the control command.

20 Claims, 27 Drawing Sheets

(51) Int. Cl.
  F02B 63/04   (2006.01)
  H02P 9/02    (2006.01)
  F02D 29/06   (2006.01)
  H02K 7/18    (2006.01)
  H02P 101/25  (2016.01)

(52) U.S. Cl.
  CPC .............. *H02K 7/1884* (2013.01); *H02P 9/02* (2013.01); *H02P 2101/25* (2015.01)

(56) References Cited

U.S. PATENT DOCUMENTS

| | | |
|---|---|---|
| 5,533,566 A | 7/1996 | Fineblum |
| 5,968,680 A | 10/1999 | Wolfe et al. |
| 6,365,290 B1 | 4/2002 | Ghezel-Ayagh et al. |
| 6,896,988 B2 | 5/2005 | Wang et al. |
| 7,862,938 B2 | 1/2011 | Ghezel-Ayagh |
| 9,810,068 B2 | 11/2017 | Shkolnik et al. |
| 2005/0028520 A1 | 2/2005 | Chertok |
| 2007/0158945 A1 | 7/2007 | Annen et al. |
| 2009/0091195 A1 | 4/2009 | Hyde et al. |
| 2011/0027673 A1 | 2/2011 | Ignatiev et al. |
| 2012/0112467 A1 | 5/2012 | Gopalakrishnan et al. |
| 2012/0112468 A1* | 5/2012 | Najt .................... F02B 71/04 290/1 A |
| 2012/0112469 A1 | 5/2012 | Durrett et al. |
| 2014/0015257 A1 | 1/2014 | Dobbs |
| 2014/0265349 A1 | 9/2014 | Morreim |
| 2014/0265353 A1 | 9/2014 | Yu et al. |
| 2015/0280628 A1 | 10/2015 | Jacob |
| 2016/0111879 A1 | 4/2016 | Ayana et al. |
| 2016/0156291 A1 | 6/2016 | Becker |
| 2017/0005470 A1 | 1/2017 | Wagoner et al. |
| 2017/0285677 A1 | 10/2017 | Converse et al. |
| 2017/0373561 A1 | 12/2017 | Hollingworth |
| 2018/0094581 A1 | 4/2018 | Teixeira |
| 2019/0052207 A1 | 2/2019 | Noderer et al. |
| 2019/0052208 A1 | 2/2019 | Noderer |

OTHER PUBLICATIONS

Bahrami et al., Investigation of the Effect of Organic Working Fluids on Thermodynamic Performance of Combined Cycle Stirling-ORC, International Journal of Energy and Environmental Engineering, vol. 4, No. 12, 2013, 9 Pages. https://link.springer.com/content/pdf/10.1186%2F2251-6832-4-12.pdf http://www.journal-ijeee.com/content/4/1/12 https://link.springer.com/article/10.1186/2251-6832-4-12.

Bakos et al., Technoeconomic Assessment of an Integrated Solar Combined Cycle Power Plant in Greece Using Line-Focus Parabolic Trough Collectors, ScienceDirect, Renewable Energy, vol. 60, Dec. 2013, pp. 598-603. (Abstract Only) https://www.sciencedirect.com/science/article/pii/S096014811300270X.

Center for Sustainable Energy, Combined Heat and Power (CHP), What is combined Heat and Power?, San Diego CA, 6 Pages. https://energycenter.org/self-generation-incentive-program/business/technologies/chp.

Charky, Oil Sealed Rotary Vane Pumps, VacAero International Inc., Canada, Mar. 5, 2019, 10 Pages. https://vacaero.com/information-resources/vacuum-pump-technology-education-and-training/1046-oil-sealed-rotary-vane-pumps-part-2.html.

CSIROpedia, Solid Oxide Fuel Cell Technology, 17 Pages. https://csiropedia.csiro.au/ceramic-fuel-cells/.

Darshini, How Big is the Gas-Based Distributed Power Generation Market? And will it grow?, Power Engineering International, Decentralized Energy, Jan. 30, 2017, 6 Pages. https://www.powerengineeringint.com/articles/decentralized-energy/2017/01/how-big-is-the-gas-based-distributed-power-generation-market-and-will-it-grow.html.

Engineering Technology Simulation Learning Videos on YouTube, Types of Hydraulic Pumps, Jun. 5, 2015. (Video) https://www.youtube.com/watch?v=Oy_liV6EzNHg.

Geyer et al., Concentrated Solar Thermal Power—Now!, ResearchGate, Technical Report, Jan. 2005, 49 Pages. https://www.researchgate.net/publication/298944888_Concentrated_Solar_Thermal_Power_-_Now.

Geyer, Figure 2.6: Integrated Solar/Combined Cycle Systems (ISCC), ResearchGate, 4 Pages. https://www.researchgate.net/figure/Integrated-Solar-Combined-Cycle-system-ISCC_fig2_298944888.

Green Car Congress, MHI to Develop Fuel Cell Triple Combined Cycle Power Generation System; Expected to Deliver Power Generation Exceeding 70% (LHV) in Larger Applications, Jun. 1, 2012, 9 Pages. https://www.greencarcongress.com/2012/06/mhi-20120601.html.

Group of Energy Conversion System (GECOS), Fuel Cells and Electrochemical Energy Systems, Politecnico Milano, 7 Pages. http://www.gecos.polimi.it/research-areas/fuel-cells-and-electrochemical-energy-systems/.

Honeywell Aerospace, Stirling Cycle Cryocoolers, Auxiliary Power and Thermal, Ultra Long-Life, Flight Qualified Technology for High Speed Imaging and Sensing Infra-Red Detectors, 4 Pages. https://aerospace.honeywell.com/en/products/auxiliary-power-and-thermal/stirling-cycle-cryocoolers.

Howden, Reciprocating Compressor C Series—Animation on YouTube, Jun. 20, 2017. (Video Link) https://www.youtube.com/watch?v=owNOdUBL37U&feature=youtu.be.

Huang, Toroidal Engine, YouTube, Oct. 29, 2016. (Video) https://www.youtube.com/watch?v=lwMDXxge8c8.

Ingram-Goble, Modeling and Optimization of a Combined Cycle Stirling—ORC System and Design of an Integrated Microchannel Stirling Heat Rejector, Thesis, Oregon State University, Advanced Technology and Manufacturing Institute (ATAMI), Corvallis, OR, 2010, 122 Pages. https://ir.library.oregonstate.edu/concern/graduate_thesis_or_dissertations/p8418q749.

Kawasaki, CHP Cogeneration/Distributed Power, Kawasaki Heavy Industries, 5 Pages. http://global.kawasaki.com/en/energy/solutions/distributed_power/index/html.

Kellner, The New Power Generation: This Fuel Cell Startup Could Spark a Revolution, GE Reports, Jul. 22, 2014, 4 Pages. https://www.ge.com/reports/post/92454271755/the-new-power-generation-this-fuel-cell-startup/.

Khalili et al., Investigating the Effect of Channel Angle of a Subsonic MHD (Magneto-Hydro-Dynamic) Generator on Optimum Efficiency of a Triple Combined Cycle, ScienceDirect, Journals & Books, Energy, vol. 85, Jun. 1, 2015, pp. 543-555. (Abstract Only) https://www.sciencedirect.com/science/article/abs/pii/S0360544215003734.

Kobayashi et al., Extremely High-Efficiency Thermal Power System-Solid Oxide Fuel Cell (SOFC) Triple Combined-Cycle System, Mitsubishi Heavy Industries Technical Review, vol. 48, No. 3, Sep. 2011, pp. 9-15. https://www.mhi.co.jp/technology/review/pdf/e483/e483009.pdf.

Kubo, Technical and Economic Study of Stirling and Rankine Cycle Bottoming Systems for Heavy Truck Diesel Engines, NASA CR-180833, CTR 0723-97001, Sep. 1987, 171 Pages. https://ntrs.nasa.gov/archive/nasa/casi.ntrs.nasa.gov/19870019037.pdf.

Machine Tech Video Blog on YouTube, Positive Displacement Pump Types, Aug. 25, 2016. (Video) https://www.youtube.com/watch?v=4OJTN0MIDBk.

Mekanizmalar (Web Link) https://www.mekanizmalar.com/.

(56) References Cited

OTHER PUBLICATIONS

Mekanizmalar (Video) https://www.youtube.com/mekanizmalar.
Mekanizmalar, Roots Pump Two Lobe on YouTube, May 11, 2012. (Video) https://www.youtube.com/watch?v=_-fwWrFLiyY.
Mekanizmalar, Roots Pump Four Lobe on YouTube, May 29, 2012. (Video) https://www.youtube.com/watch?v=BttM3K817AA.
Muller-Steinhagen, Ranking Cycle, Thermopedia, A-to-Z Guide to Thermodynamics, Heat & Mass Transfer, and Fluids Engineering, 9 Pages. http://www.thermopdia.com/content/1072/rankinecycle.
Nissan Motor Corporation, Nissan Announces Development of the World's First SOFC-Powered Vehicle System that Runs on Bio-Ethanol Electric Power, Global Newsroom, Press Release, Jun. 14, 2016, 22 Pages. https://newsroom.nissan-global.com/releases/160614-01-e.
Okoroigwe et al., An Integrated Combined Cycle System Driven by a Solar Tower: A Review, ScienceDirect, Renewable and Sustainable Energy Reviews, vol. 57, May 2016, pp. 337-350. (Abstract Only) https://www.sciencedirect.com/science/article/pii/S1364032115014756.
Owens, et al., GE-Fuel Cells the Power of Tomorrow, GE Ecomagination, Feb. 2, 2016, 43 Pages. https://www.ge.com/sites/default/files/GE-Fuel%20cell%20020216.pdf.
Paanu et al, Waste Heat Recovery-Bottoming Cycle Alternatives, University of Vaasa, Finland, 2012, 26 Pages. https://osuva.uwasa.fi/bitstream/handle/10024/7796/isbn_978-952-476-389-9.pdf?sequence=1.
Panasonic, Panasonic Makes Zero Emissions Homes Possible, Panasonic Marketing Europe GmbH, 2019, 4 Pages. https://www.aircon.panasonic.eu/GB_en/cases/case/panasonic-smart-home/.
Solar Cell Central, Stirling Engines, 3 Pages. http://solarcellcentral.com/stirling_page.html.
Starrotor Corporation Improved Gerotor Technology, Texas, 2019, 2 Pages. https://www.starrotor.com.
Tchanche, Heat Conversion into Power Using Small Scale Organic Rankine Cycles, Doctoral Thesis University of Athens (AUA), ResearchGate, Oct. 2012, 2002 Pages. https://www.researchgate.net/publication/256496874_Heat_conversion_into_power_using_small_scale_organic_Rankine_cycles.
Thimsen, Stirling Engine Assessment, Electric Power Research Institute, Inc. (EPRI), Palo Alto, CA, 1007317, 2002, 170 Pages. http://www.engr.colostate.edu/~marchese/mech337-10/epri.pdf.
Wei et al., A Total Cost of Ownership Model for Low Temperature PEM Fuel Cells in Combined Heat and Power and Backup Power Applications, LBNL-6772E, Lawrence Berkeley National Laboratory, Environmental Technologies Division, Oct. 2014, 222 Pages. https://www.energy.gov/sites/prod/files/2016/12/f34/fcto_tco_model_low_temp_pem_fc.pdf.
Wikipedia, Balance of Plant, 1 Page. https://en.wikipedia.org/wiki/Balance_of_plant.
Wikipedia, Roots-Type Supercharger, 5 Pages. https://en.wikipedia.org/wiki/Roots-type_supercharger.
Wikipedia, Swing-Piston Engine, 4 Pages. https://en.wikipedia.org/wiki/Swing-piston_engine.
wn.com, Swing-Piston Engine, 3 Pages. https://wn.com/swing-piston_engine.

* cited by examiner

SYSTEM FOR ANTICIPATING LOAD CHANGES

CROSS-REFERENCE TO RELATED APPLICATION

This application is a continuation of U.S. application Ser. No. 16/418,071, filed May 21, 2019 and entitled SYSTEM FOR ANTICIPATING LOAD CHANGES.

FIELD

The present subject matter relates generally to energy conversion systems, power generation systems, and energy distribution systems. The present subject matter further relates to piston engine assemblies, such as closed-cycle engine systems. The present subject matter still further relates to systems and methods for control or operation of one or more systems of the present subject matter herein.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. Closed cycle engines may suffer due to inefficient combustion, inefficient heat exchangers, inefficient mass transfer, heat losses to the environment, non-ideal behavior of the working fluid(s), imperfect seals, friction, pumping losses, and/or other inefficiencies and imperfections. As such, there is a need for improved closed cycle engines and system arrangements that may provide improved power output, improved power density, or further improved efficiency. Additionally, there is a need for an improved closed cycle engine that may be provided to improve power generation and power distribution systems.

Additionally, or alternatively, there is a general need for improved heat transfer devices, such as for heat engines, or as may be applied to power generation systems, distribution systems, propulsion systems, vehicle systems, or industrial or residential facilities.

Furthermore, there is a need for improved control system and methods for operating power generation systems as may include subsystems that collectively may provide improved power generation efficiency or reduced emissions

BRIEF DESCRIPTION

Aspects and advantages of the invention will be set forth in part in the following description, or may be obvious from the description, or may be learned through practice of the invention.

In one aspect, a system is provided. For instance, the system can be a system for energy conversion. The system includes a closed cycle engine having a piston body defining a hot side and a cold side and having a piston assembly movable within the piston body. The system also includes an electric machine operatively coupled with the piston assembly, wherein the electric machine is operable to generate electrical power when the piston assembly is moved within the piston chamber. Further, the system includes an electrical device in communication with the electric machine, the electrical device operable to receive electrical power from the electric machine. Moreover, the system includes a control system. The control system includes one or more sensors, a controllable device, and a controller communicatively coupled with the one or more sensors and the controllable device. The controller is configured to: determine whether a load change on the electric machine is anticipated based at least in part on data received indicative of a load state of the electrical device; in response to whether the load change is anticipated, determine a control command indicative of instructions for adjusting an output of at least one of the closed cycle engine and the electric machine; and cause the controllable device to adjust the output based at least in part on the control command.

In some embodiments, the piston assembly movable within the piston body is one of a plurality of piston assemblies of the closed cycle engine, and wherein each of the plurality of piston assemblies are movable within respective piston bodies of the closed cycle engine.

In some embodiments, the piston assembly is a free piston assembly.

In some embodiments, the load state of the electrical device is indicative of an anticipated change in electrical power demanded by the electrical device on the electric machine and an anticipated time at which the anticipated change in electrical power demanded by the electrical device on the electric machine is to occur.

In some embodiments, the electrical device is one of a plurality of electrical devices, and wherein the load state of the electrical device is indicative of a total anticipated change in electrical power demanded by the plurality of electrical devices on the electric machine for a predetermined time period, and wherein the control command is determined based at least in part on the total anticipated change in electrical power demanded by the plurality of electrical devices on the electric machine over the predetermined time period.

In some embodiments, the electrical device comprises one or more energy storage devices.

In some embodiments, the one or more energy storage devices are batteries.

In some embodiments, the electrical device comprises the grid.

In some embodiments, the load state of the electrical device includes a runtime indicator indicative of a time period in the electrical device anticipates coming on line or dropping offline.

In some embodiments, the controller is configured to: determine whether the anticipated load change is a load increase or a load decrease.

In some embodiments, if the anticipated load change is a load decrease, the control command is determined such that a fuel input to the closed cycle engine is ramped down to anticipate the load decrease.

In some embodiments, if the anticipated load change is a load increase, the control command is determined such that a fuel input to the closed cycle engine is ramped up to anticipate the load increase.

In another aspect, a method is provided. The method includes operating a closed cycle engine having a piston assembly movable within a piston chamber defined by a piston body of the closed cycle engine. Further the method includes receiving data indicative of a load state of an electrical device in communication with an electric machine operatively coupled with the piston assembly. In addition, the method includes determining a load change is anticipated on the electric machine based at least in part on the load state of the electrical device. Moreover, the method includes determining a control command indicative of instructions for adjusting an output of at least one of the closed cycle engine and the electric machine prior to the anticipated load change on the electric machine. The method includes causing a controllable device to adjust the output of at least one of the closed cycle engine and the electric machine prior to the anticipated load change on the electric machine based at least in part on the determined control command.

In some implementations, the load state of the electrical device is indicative of the electrical power demanded by the electrical device on the electric machine.

In some implementations, the load state of the electrical device includes a runtime indicator indicative of a time period in which the electrical device anticipates coming on line or dropping offline.

In some implementations, the method includes determining whether the anticipated load change is a load increase or a load decrease.

In some implementations, if the anticipated load change is a load decrease, the control command is determined such that a fuel input to a combustor of the closed cycle engine is ramped down to anticipate the load decrease.

In some implementations, if the anticipated load change is a load increase, the control command is determined such that a fuel input to a combustor of the closed cycle engine is ramped up to anticipate the load increase.

In some implementations, the controllable device is a fuel control device.

In yet another aspect, a computer readable medium is provided. The computer readable medium includes computer-executable instructions, which, when executed by one or more processors of a controller, cause the controller to: cause a temperature differential between a hot side and a cold side of a closed cycle engine having a piston assembly movable within a piston chamber defined by a piston body of the closed cycle engine, the piston assembly moved based at least in part on the temperature differential; receive data indicative of a load state of an electrical device in communication with an electric machine operatively coupled with the piston assembly, the electric machine operable to generate electrical power when the piston assembly is moved within the piston chamber; determine whether a load change is anticipated on the electric machine based at least in part on the load state of the electrical device; determine a control command indicative of instructions for adjusting an output of at least one of the closed cycle engine and the electric machine prior to or at the same time as the anticipated load change on the electric machine; and cause a controllable device to adjust the output of at least one of the closed cycle engine and the electric machine prior to or at the same time as the anticipated load change on the electric machine based at least in part on the determined control command.

In some embodiments, the closed cycle engine is a regenerative heat engine.

In some embodiments, the closed cycle engine is a Stirling engine.

In some embodiments, the piston assembly movable within the piston body is one of a plurality of piston assemblies of the closed cycle engine, and wherein each of the plurality of piston assemblies are movable within respective piston bodies of the closed cycle engine.

BRIEF DESCRIPTION OF THE DRAWINGS

A full and enabling disclosure including the best mode, directed to one of ordinary skill in the art, is set forth in the specification, which makes reference to the appended figures, in which.

Figure 1:
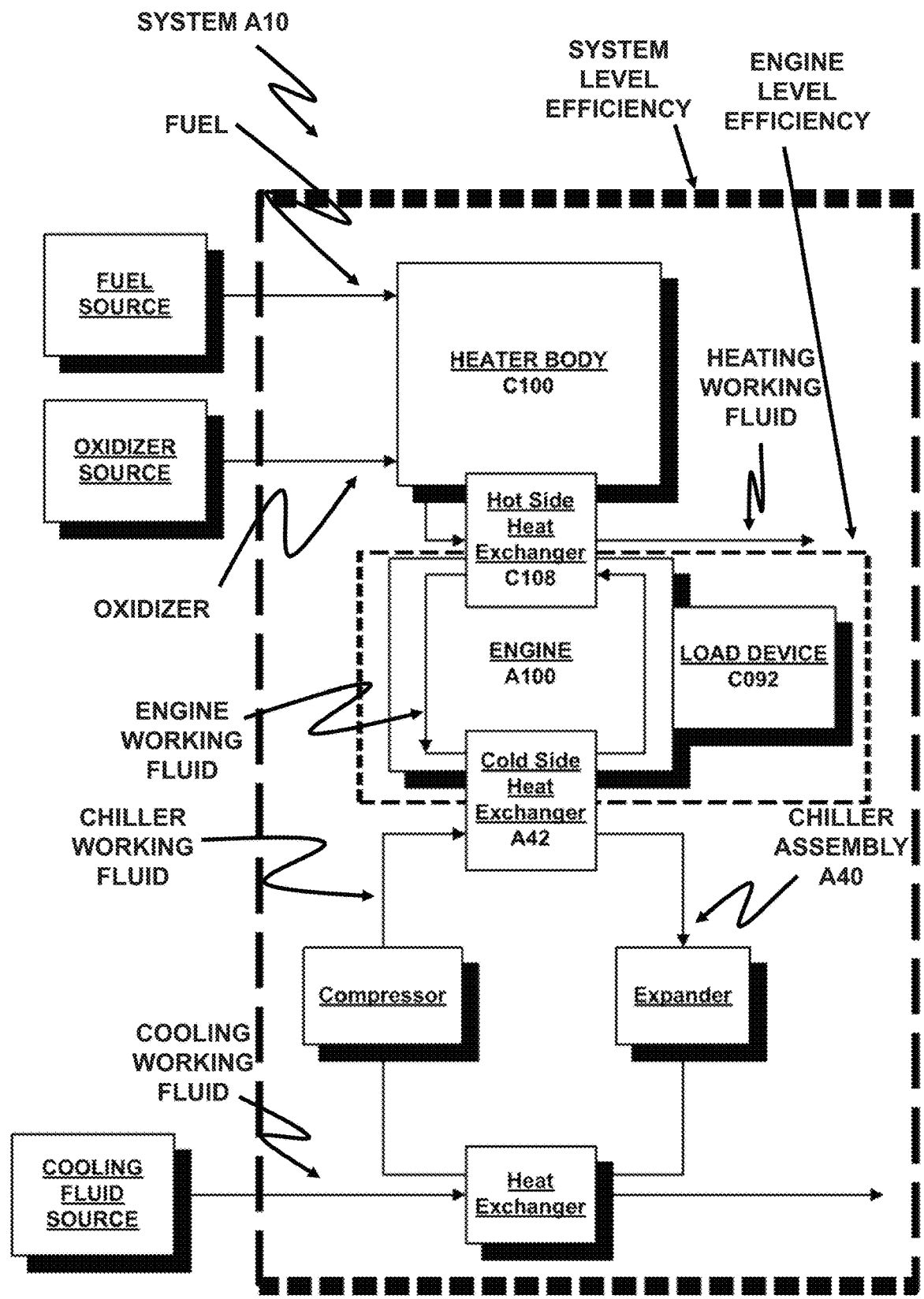
FIG. 1 is a schematic block diagram depicting a system for energy conversion according to an aspect of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "loop" can be any suitable fluid pathway along which fluid can flow and can be either open or closed, unless stated otherwise.

Chapter 1—Generation, Conversion, and Distribution Systems

Chapter 1.1—Power Generation, Engine and Energy Conversion Systems, and Energy Distribution Systems Improved power generation systems that provide improved efficiency and reduced emissions over known power generation systems that may further be sized or scaled to provide improved power distribution without adversely affecting efficiency and emissions are provided herein. The need for improved power generation systems is further, or alternatively, such that issues regarding power distribution, power generation versus changing peak power demands, emissions, barriers to infrastructure development, and challenges and limitations posed by vehicle electrification may each be addressed, improved upon, or alleviated.

Small-scale or portable power generation systems are desirable for applications including space vehicles and systems, automotive drivetrain and aerospace propulsion electrification, direct cooling sources, and portable or distributed power generation such as to address issues regarding power generation efficiency, density, and output. However, there is a need for improved thermal efficiency, electrical conversion efficiency, or both, for such systems.

Heat engines and other devices for converting thermal energy into useful work are generally inefficient relative to their maximum theoretical efficiency. Carnot's theorem states that the maximum theoretical efficiency ($\eta_{Carnot}$) for an ideal, reversible heat engine is given by:

$$\eta_{Carnot} = 1 - \left(\frac{T_{Hot,engine}}{T_{Cold,ambient}}\right)$$

where $T_{hot,engine}$ is the absolute temperature (e.g. in Rankine or Kelvin) at which heat enters the engine and $T_{cold,ambient}$ is the absolute temperature of the environment into which the engine exhausts its waste heat. $T_{Hot,engine}$ is generally limited by the maximum operating temperature of the materials in the engine and $T_{Cold,ambient}$ is limited by an available heat sink available (e.g., the atmosphere at ambient temperature, the temperature of a body of water, etc.). Closed cycle heat engines operate through an exchange of thermal energy to and from relatively hot and cold volumes of a piston engine. Closed cycle heat engines, such as Stirling arrangements, or variations thereof, such as Franchot or Vuilleimier arrangements, generally have a maximum theoretical efficiency that is the Carnot efficiency. As such, closed cycle engines such as Stirling arrangements are considered to have a greater potential as high efficiency engines based at least on the difference in maximum theoretical efficiency and actual efficiency.

Achieving maximum theoretical efficiency of a system is challenged or limited based at least on inefficient combustion, inefficient heat exchange, heat losses to a surrounding environment, non-ideal behavior of one or more working fluids, friction losses, pumping losses, or other inefficiencies and imperfections, or energy required to operate the system. Actual or real thermal efficiency $\eta_{th,system}$ of a system including a heat engine, heat generation sources, heat removal systems, or other heat exchangers, is given by:

$$\eta_{th,system} \equiv \frac{W_{out}}{Q_{in} + E_{in} + W_{in}} = \frac{(Q_{in} + E_{in} + W_{in}E_{in} + Q_{in} - \Sigma\ Q_{out})}{Q_{in} + E_{in} + W_{in}Q_{in}}$$

Actual or real thermal efficiency $\eta_{th}$ of a heat engine is given by:

$$\eta_{th} = \frac{W_{out}}{Q_{in}} = \frac{Q_{in} - Q_{out}}{Q_{in}} = 1 - \frac{Q_{out}}{Q_{in}}$$

where $W_{out}$ is the net useful work done by the engine, $Q_{in}$ is the thermal energy received by the engine, and $Q_{out}$ is the thermal energy lost or rejected to the environment. $E_{in}$ is the electrical energy used by the system for operation of the system (e.g., fuel and/or oxidizer pumps, cooling sources, etc.). $W_{in}$ is work input into the system. Achievable thermal efficiency tends to increase with power output. For example, motor vehicle applications are generally 20% to 35% thermally efficient, while large marine and stationary diesel systems can exceed 50% thermal efficiency (FIG. 1.1.3). Stirling engines have demonstrated thermal efficiencies up to 38%.

The useful work generated by a heat engine can further be converted into electrical energy. The electrical efficiency ($\eta_{El}$) can be calculated in the same manner as the thermal efficiency:

$$\eta_{El} = \frac{E_{out}}{Q_{in}}$$

where $E_{out}$ is the net electrical energy output from an electric machine that is operatively coupled to the engine and $Q_{in}$ is the thermal energy received by the engine. $E_{out}$ may be calculated by subtracting any electricity required to operate the power generation system from the gross power generated by the system. If combustion is the source of heating working fluid for the engine, the electrical efficiency may be calculated using a lower heating value (LHV) of the fuel. Stirling engines have demonstrated LHV electrical efficiencies between 10% and 30%.

Closed cycle engines, such as Stirling arrangements, are challenged to produce increasing levels of power output and power density, and generally compromise improved efficiency or power output with larger sizes and scaling. Such larger sizes or scales can negate other desirable qualities of the engine, such as relatively small-scale or portability.

Stirling engines may generally include two types: kinematic or free piston. Kinematic Stirling engines use mechanically-connected piston assemblies to transmit and convert linear motion of the pistons to a rotary motion for an output shaft. Although such systems may address issues regarding power transmission and stability of the engine, mechanically-connected piston assemblies introduce relatively large power losses via the mechanical members. Additionally, or alternatively, the relatively fixed relationship of mechanically-connected piston assemblies limits the mechanical stroke of the piston assembly. As such, the efficiency of mechanically-connected multi-piston assemblies in a closed cycle engine is decreased in addition to mechanical losses (e.g., friction, leakage, inertia, etc.).

Single-piston free piston closed cycle engine arrangements generally exchange improved thermal efficiency for lower total power generation and density. As such, single-piston free piston closed cycle engine arrangements are not generally suited for higher power output applications.

Multi-piston free piston closed cycle engine arrangements may provide thermal efficiencies of single-piston free piston arrangements and further increase total power generation. However, multi-piston free piston arrangements generally differ from single-piston arrangements and mechanically-connected multi-piston arrangements in that the cycle or motion of a multi-piston free piston arrangement is generally determined by thermo-mechanical interactions of the entire system including the free pistons, the thermal source(s), and a power extraction apparatus. The thermo-mechanical interactions may further include mechanical losses and their effect on balance of the entire system.

For example, multi-piston free-piston closed cycle engines are challenged to respond to time lags. As another example, if one piston assembly drifts from an intended position a subsequent oscillation can become unbalanced. An unbalanced arrangement may lead to undesired vibrations, crashing of the pistons to end walls, or other mechanical losses that may further reduce power output, induce wear and deterioration, or otherwise reduce efficient, stable, or effective use of a multi-piston free piston engine.

As such, there is a need for improved closed cycle engines such as Stirling engines that provide improved power generation efficiency and output. Additionally, there is a need for such improved power generation or energy conversion system that may further retain or improve power density, such as to provide relatively small-scale or portability such as to provide improved application to power generation and distribution systems.

Chapter 1.2—System for Energy Conversion

Referring now to FIG. 1, an exemplary schematic block diagram depicting a system for energy conversion (hereinafter, "system A10") is provided. Various embodiments of the system A10 provided herein include systems for power generation, a heat recovery system, a heat pump or cryogenic cooler, a system including and/or acting as a bottoming cycle and/or a topping cycle, or other system for producing useful work or energy, or combinations thereof. Referring additionally for FIG. 2, various embodiments of the system A10 include a closed cycle engine apparatus (hereinafter, "engine A100", apparatus "A100", or "engine assembly C900", or otherwise denoted herein) operably coupled to a load device c092. The engine A100 contains a substantially fixed mass of an engine working fluid to which and from which thermal energy is exchanged at a respective cold side heat exchanger A42 and a hot side heat exchanger C108. In one embodiment, the engine working fluid is helium. In other embodiments, the engine working fluid may include air, nitrogen, hydrogen, helium, or any appropriate compressible fluid, or combinations thereof. In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the engine. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device C092 is a mechanical work device or an electric machine. In one embodiment, the load device C092 is a pump, compressor, or other work device. In another embodiment, the load device C092 as an electric machine is configured as a generator producing electric energy from movement of a piston assembly A1010 at the engine. In still another embodiment, the electric machine is configured as a motor providing motive force to move or actuate the piston assembly A1010, such as to provide initial movement (e.g., a starter motor). In still various embodiments, the electric machine defines a motor and generator or other electric machine apparatus such as described further herein.

A heater body C100 is thermally coupled to the engine A100. The heater body C100 may generally define any apparatus for producing or otherwise providing a heating working fluid such as to provide thermal energy to the engine working fluid. Various embodiments of the heater body C100 are further provided herein. Exemplary heater bodies C100 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies C100 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. The exemplary heater body C100 providing thermal energy to the engine working fluid may include all or part of a combined heat and power cycle, or cogeneration system, or power generation system generally.

In still various embodiments, the heater body C100 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane ($C_2$), methane, high $H_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, the system A10 includes a working fluid body C108, such as further described herein. In one embodiment, the working fluid body C108 defines a hot side heat exchanger A160, such as further described herein, from which thermal energy is output to the engine working fluid at an expansion chamber A221 of the engine. The working fluid body C108 is positioned at the expansion chamber A221 of the engine in thermal communication with the heater body C100. In other embodiments, the working fluid body C108 may be separate from the heater body C100, such that the heating working fluid is provided in thermal communication, or additionally, in fluid communication with the working fluid body C108. In particular embodiments, the working fluid body C108 is positioned in direct thermal communication with the heater body C100 and the expansion chamber A221 of the engine A100 such as to receive thermal energy from the heater body C100 and provide thermal energy to the engine working fluid within the engine.

In still various embodiments, the heater body C100 may include a single thermal energy output source to a single expansion chamber A221 of the engine. As such, the system A10 may include a plurality of heater assemblies each providing thermal energy to the engine working fluid at each expansion chamber A221. In other embodiments, such as depicted in regard to FIG. 2, the heater body C100 may provide thermal energy to a plurality of expansion chambers A221 of the engine. In still other embodiments, the heater body includes a single thermal energy output source to all expansion chambers A221 of the engine.

The system A10 further includes a chiller assembly, such as chiller assembly A40 further described herein. The chiller assembly A40 is configured to receive and displace thermal energy from a compression chamber A222 of the engine. The system A10 includes a cold side heat exchanger A42 thermally coupled to the compression chamber A222 of the closed cycle engine and the chiller assembly. In one embodiment, the cold side heat exchanger A42 and the piston body C700 defining the compression chamber A222 of the engine are together defined as an integral, unitary structure. In still various embodiments, the cold side heat exchanger A42, at least a portion of the piston body C700 defining the compression chamber A222, and at least a portion of the chiller assembly together define an integral, unitary structure.

In various embodiments, the chiller assembly A40 is a bottoming cycle to the engine A100. As such, the chiller assembly A40 is configured to receive thermal energy from the engine A100. The thermal energy received at the chiller assembly A40, such as through a cold side heat exchanger A42, or cold side heat exchanger A170 further herein, from the engine A100 is added to a chiller working fluid at the chiller assembly A40. In various embodiments, the chiller assembly A40 defines a Rankine cycle system through which the chiller working fluid flows in closed loop arrangement with a compressor. In some embodiments, the chiller working fluid is further in closed loop arrangement with an expander. In still various embodiments, the system A10 includes a heat exchanger A88 (FIG. 3). In various embodiments, the heat exchanger A188 may include a condenser or radiator. The cold side heat exchanger A40 is positioned downstream of the compressor and upstream of the expander and in thermal communication with a compression chamber A222 of the closed cycle engine, such as further depicted and described in regard to FIG. 2-FIG. 3. In various embodiments, the cold side heat exchanger A42 may generally define an evaporator receiving thermal energy from the engine A40.

Referring still to FIG. 1, in some embodiments, the heat exchanger A188 is positioned downstream of the expander and upstream of the compressor and in thermal communication with a cooling working fluid. In the schematic block diagram provided in FIG. 1, the cooling working fluid is an air source. However, in various embodiments, the cooling fluid may define any suitable fluid in thermal communication with the heat exchanger. The heat exchanger may further define a radiator configured to emit or dispense thermal energy from the chiller assembly A40. A flow of cooling working fluid from a cooling fluid source is provided in thermal communication with the heat exchanger to further aid heat transfer from the chiller working fluid within the chiller assembly A40 to the cooling working fluid.

As further described herein, in various embodiments the chiller assembly A40 may include a substantially constant density heat exchanger. The constant density heat exchanger generally includes a chamber including an inlet and an outlet each configured to contain or trap a portion of the chiller working fluid for a period of time as heat from the closed cycle engine is transferred to the cold side heat exchanger A42. In various embodiments, the chamber may define a linear or rotary chamber at which the inlet and the outlet are periodically opened and closed via valves or ports such as to trap the chiller working fluid within the chamber for the desired amount of time. In still various embodiments, the rate at which the inlet and the outlet of the chamber defining the constant density heat exchanger is a function at least of velocity of a particle of fluid trapped within the chamber between the inlet and the outlet. The chiller assembly A40 including the constant density heat exchanger may provide efficiencies, or efficiency increases, performances, power densities, etc. at the system A10 such as further described herein.

It should be appreciated that in other embodiments, the chiller assembly A40 of the system A10 may include a thermal energy sink generally. For example, the chiller assembly A40 may include a body of water, the vacuum of space, ambient air, liquid metal, inert gas, etc. In still various embodiments, the chiller working fluid at the chiller assembly A40 may include, but is not limited to, compressed air, water or water-based solutions, oil or oil-based solutions, or refrigerants, including, but not limited to, class 1, class 2, or class 3 refrigerants. Further exemplary refrigerants may include, but are not limited to, a supercritical fluid including, but not limited to, carbon dioxide, water, methane, ethane, propane, ethylene, propylene, methanol, ethanol, acetone, or nitrous oxide, or combinations thereof. Still exemplary refrigerants may include, but are not limited to, halon, perchloroolefin, perchlorocarbon, perfluoroolefin, perfluorocarbon, hydroolefin, hydrocarbon, hydrochloroolefin, hydrochlorocarbon, hydrofluoroolefin, hydrofluorocarbon, hydrochloroolefin, hydrochlorofluorocarbon, chlorofluoroolefin, or chlorofluorocarbon type refrigerants, or combinations thereof. Still further exemplary embodiments of refrigerant may include, but are not limited to, methylamine, ethylamine, hydrogen, helium, ammonia, water, neon, nitrogen, air, oxygen, argon, sulfur dioxide, carbon dioxide, nitrous oxide, or krypton, or combinations thereof.

It should be appreciated that where combustible or flammable refrigerants are included for the chiller working fluid, various embodiments of the system A10 may beneficially couple the heater body C100, and/or the fuel source, and the chiller assembly A40 in fluid communication such that the combustible or flammable working fluid to which thermal energy is provided at the chiller assembly A40 may further be utilized as the fuel source for generating heating working fluid, and the thermal energy therewith, to output from the heater body C100 to the engine working fluid at the engine A100.

Chapter 1.3—Energy Conversion Apparatus

Figure 2:
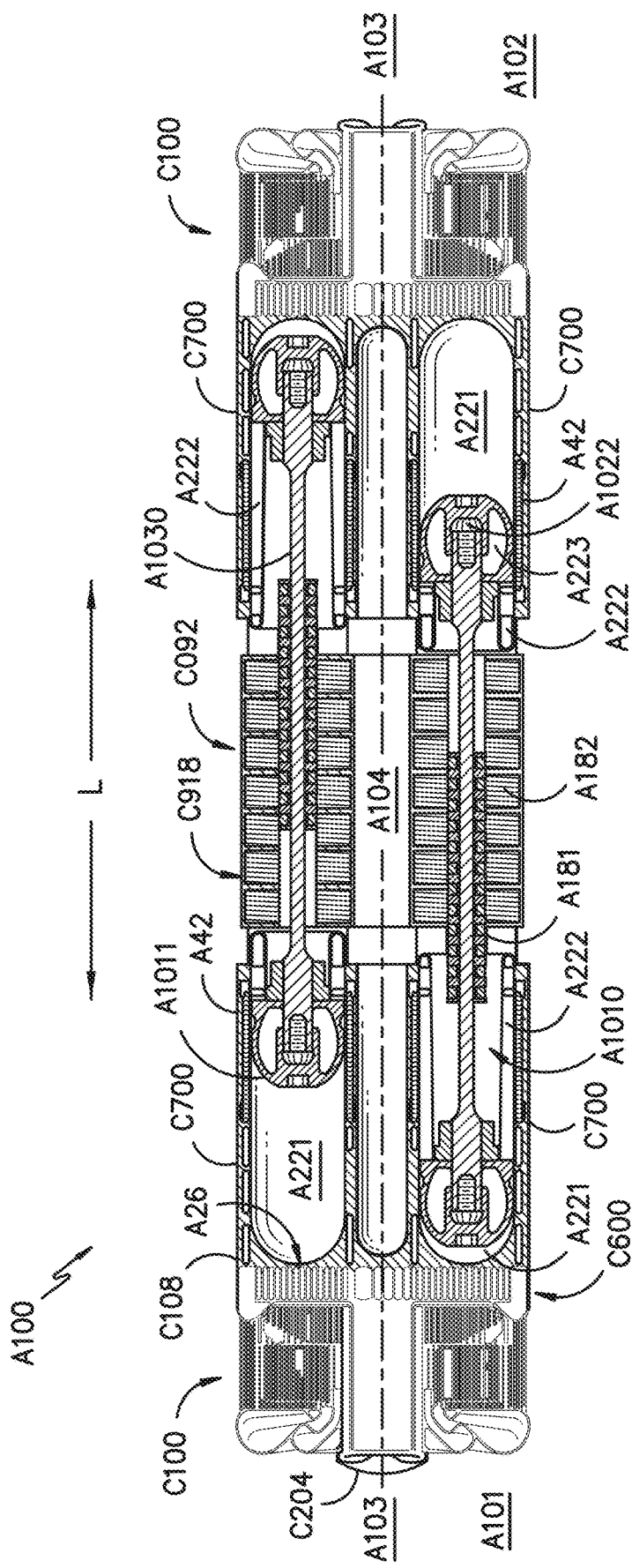
FIG. 2 is a cross sectional view of an exemplary embodiment of a closed cycle engine and load device according to an aspect of the present disclosure.
Figure 3:
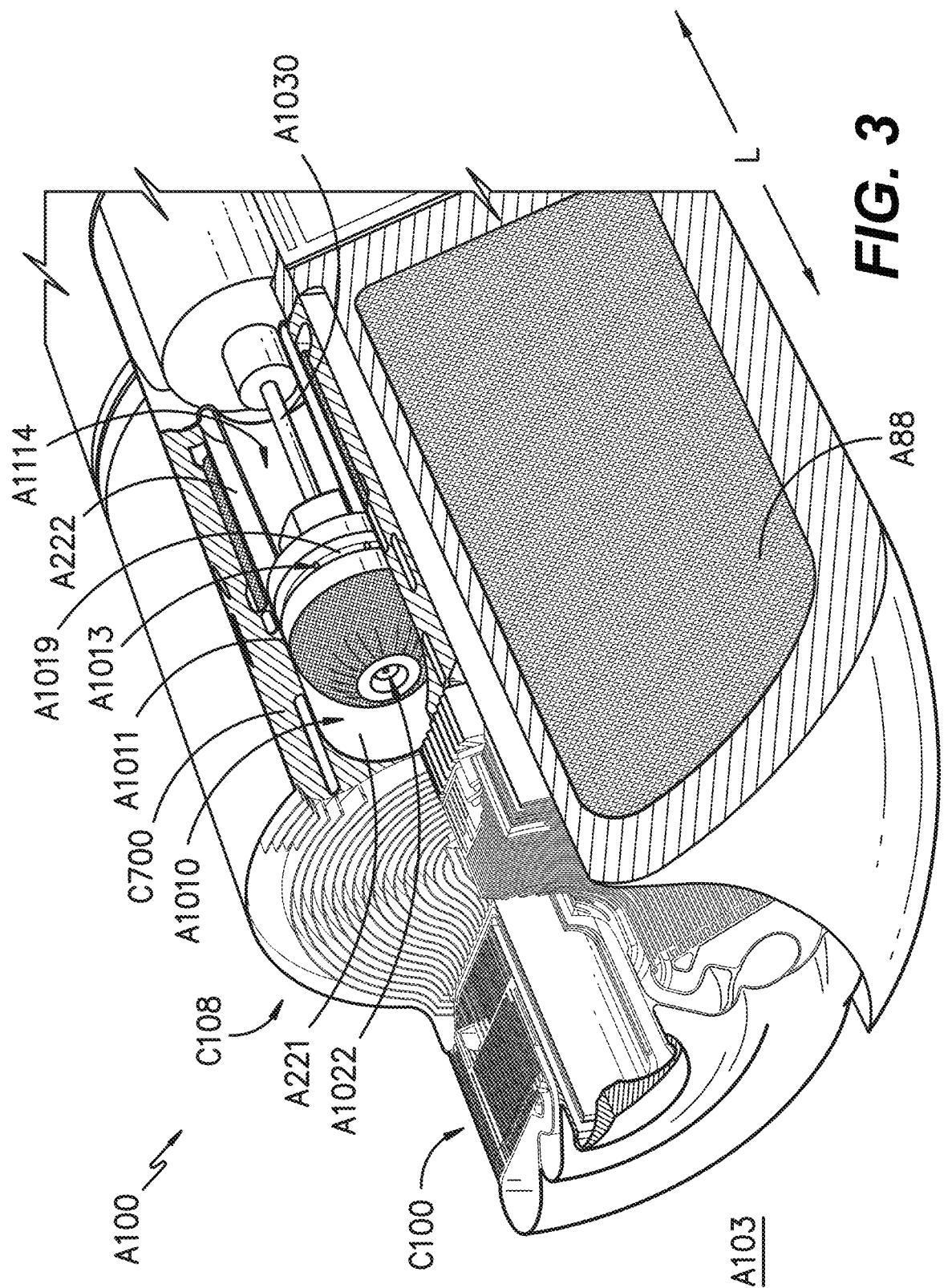
FIG. 3 is a perspective cutaway view of an exemplary portion of an exemplary embodiment of an engine according to an aspect of the present disclosure.

Referring now to FIG. 2-FIG. 3, exemplary embodiments of the system A10 are further provided. FIG. 2 is an exemplary cross sectional view of the system A10 including the heater body C100 and the chiller assembly A40 each in thermal communication with the engine A100, or particularly the engine working fluid within the engine A100, such as shown and described according to the schematic block diagram of FIG. 1. FIG. 3 is an exemplary cutaway perspective view of a portion of the engine A100. The system A10 includes a closed cycle engine A100 including a piston assembly A1010 positioned within a volume or piston chamber C112 defined by a wall defining a piston body C700. The volume within the piston body C700 is separated into a first chamber, or hot chamber, or expansion chamber A221 and a second chamber, or cold chamber (relative to the hot chamber), or compression chamber A222 by a piston A1011 of the piston assembly A1010. The expansion chamber A221 is positioned thermally proximal to the heater body C100 relative to the compression chamber A222 thermally distal to the heater body C100. The compression chamber A222 is positioned thermally proximal to the chiller assembly A40 relative to the expansion chamber A221 thermally distal to the chiller assembly A40.

In various embodiments, the piston assembly A1010 defines a double-ended piston assembly A1010 in which a pair of pistons A1011 is each coupled to a connection member A1030. The connection member A1030 may generally define a rigid shaft or rod extended along a direction of motion of the piston assembly A1010. In other embodiments, the connection members A1030 includes one or more springs or spring assemblies, such as further provided herein, providing flexible or non-rigid movement of the connection member A1030. In still other embodiments, the connection member A1030 may further define substantially U- or V-connections between the pair of pistons A1011.

Each piston A1011 is positioned within the piston body C700 such as to define the expansion chamber A221 and the compression chamber A222 within the volume of the piston body C700. The load device c092 is operably coupled to the piston assembly A1010 such as to extract energy therefrom, provide energy thereto, or both. The load device c092 defining an electric machine is in magnetic communication with the closed cycle engine via the connection member A1030. In various embodiments, the piston assembly A1010 includes a dynamic member A181 positioned in operable communication with a stator assembly A182 of the electric machine. The stator assembly A182 may generally include a plurality of windings wrapped circumferentially relative to the piston assembly A1010 and extended along a lateral direction L. In one embodiment, such as depicted in regard to FIG. 2, the dynamic member A181 is connected to the connection member A1030. The electric machine may further be positioned between the pair of pistons A1011 of each piston assembly A1010. Dynamic motion of the piston assembly A1010 generates electricity at the electric machine. For example, linear motion of the dynamic member A181 between each pair of chambers defined by each piston A1011 of the piston assembly A1010 generates electricity via the magnetic communication with the stator assembly A182 surrounding the dynamic member A181.

Referring to FIG. 2-FIG. 3, in various embodiments, the working fluid body C108 may further define at least a portion of the expansion chamber A221. In one embodiment, such as further described herein, the working fluid body C108 defines a unitary or monolithic structure with at least a portion of the piston body C700, such as to define at least a portion of the expansion chamber A221. In some embodiments, the heater body C100 further defines at least a portion of the working fluid body C108, such as to define a unitary or monolithic structure with the working fluid body C108, such as further described herein. In one embodiment, the system A10 includes the hot side heat exchanger or working fluid body C108 positioned between the heater body C100 and the expansion chamber A221 of the piston body C700. In various embodiments, the working fluid body C108 includes a plurality of heater conduits or working fluid pathways C110 extended from the expansion chamber A221.

The engine A100 defines an outer end A103 and an inner end A104 each relative to a lateral direction L. The outer ends A103 define laterally distal ends of the engine A100 and the inner ends 104 define laterally inward or central positions of the engine A100. In one embodiment, such as depicted in regard to FIG. 2-FIG. 3, the heater body C100 is positioned at outer ends A103 of the system A10. The piston body C700 includes a dome structure A26 at the expansion chamber A221. The expansion chamber dome structure A26 s provides reduced surface area heat losses across the outer end A103 of the expansion chamber A221. In various embodiments, the pistons A1011 of the piston assembly A1010 further include domed pistons A1011 corresponding to the expansion chamber A221 dome. The dome structure A26, the domed piston A1011, or both may provide higher compressions ratios at the chambers A221, A222, such as to improve power density and output.

The chiller assembly A40 is positioned in thermal communication with each compression chamber A222. Referring to FIG. 2-FIG. 3, the chiller assembly A40 is positioned inward along the lateral direction L relative to the heater body C100. In one embodiment, the chiller assembly A40 is positioned laterally between the heater body C100 and the load device c092 along the lateral direction L. The chiller assembly A40 provides the chiller working fluid in thermal communication with the engine working fluid at the cold side heat exchanger A42 and/or compression chamber A222. In various embodiments, the piston body C700 defines the cold side heat exchanger A42 between an inner volume wall A46 and an outer volume wall A48 surrounding at least the compression chamber A222 portion of the piston body C700.

In various embodiments, such as depicted in regard to FIG. 2-FIG. 3, the load device c092 is positioned at the inner end A104 of the system A10 between laterally opposing pistons A1011. The load device c092 may further include a machine body c918 positioned laterally between the piston bodies C700. The machine body c918 surrounds and houses the stator assembly A182 of the load device c092 defining the electric machine. The machine body c918 further surrounds the dynamic member A181 of the electric machine attached to the connection member A1030 of the piston assembly A1010. In various embodiments, such as depicted in regard to FIG. 2-FIG. 3, the machine body c918 further provides an inner end wall A50 at the compression chamber A222 laterally distal relative to the expansion chamber A221 dome.

Chapter 1.7—Engine Chamber to Chamber Conduits Arrangements

Referring to FIGS. 4 through 7, side, end, and perspective views of a portion of the system A10 are provided. The embodiments provided in regard to FIG. 4 through FIG. 7 are configured substantially similarly as shown and described in regard to FIG. 2-FIG. 3. In regard to FIGS. 4-7, the portions of the system A10 depicted therein include four piston assemblies A1010 positioned within eight respective piston bodies C700. The piston bodies C700 may generally include the first volume wall and the second volume wall shown and described in regard to FIG. 2-FIG. 3. The piston bodies C700 may generally define cylinders into which pistons A1011 of the piston assembly A1010 are each positioned such as to define the expansion chamber A221 and the compression chamber A222 within each piston body C700. However, it should be appreciated that other suitable geometries of the piston body C700 containing the piston A1011 may be utilized.

The engine A100 further includes a plurality of walled conduits A1050 connecting particular chambers A221, A222 of each piston body C700 (FIG. 2) such as to define a balanced pressure arrangement of the pistons A1011. In various embodiments, the engine A100 includes at least one interconnected volume of chambers A221, A222 such as described herein. In one embodiment, such as depicted in regard to FIGS. 4-7, the engine A100 includes two interconnected volumes in which each interconnected volume includes an expansion chamber A221 of a first piston body C700 of a first piston assembly A1010 connected in fluid communication of the engine working fluid with a compression chamber A222 of a second piston body C700 of a second piston assembly A1010 each connected by a conduit A1050. More particularly, the balanced pressure arrangement of piston assemblies A1010 depicted in regard to FIGS. 4-7 includes two interconnected volumes each substantially fluidly separated from one another and/or substantially pneumatically separated from one another. The fluidly separated and/or pneumatically separated arrangement of chambers A221, A222 into the interconnected volume, and those chambers A221, A222 outside of the interconnected volume or in another interconnected volume, is particularly provided via the arrangement of expansion chambers A221 connected to compression chambers A222 via the walled conduits A1050 such as further described herein.

In various embodiments, the interconnected volume includes pairs of the expansion chamber A221 fluidly coupled to the compression chamber A222 each defined at laterally separated ends of the piston assemblies A1010. In one embodiment, the engine A100 defines a first end 101 separated along the lateral direction L by the connection member A1030 from a second end 102, such as depicted in FIG. 5 and FIG. 6. Each end of the engine A100 defines an expansion chamber A221 and a compression chamber A222 at each piston A1011 of each piston assembly A1010. The engine A100 depicted in FIGS. 4-7, and further in regard to FIG. 2, includes the expansion chamber A221 at one end connected to a respective compression chamber A222 at another end via respective conduits. In one embodiment, such as depicted in FIGS. 5 and 6, the engine A100 includes two expansion chambers A221 at the first end 101 each connected to respective compression chambers A222 at the second end 102 via respective conduits A1050. The engine A100 further includes two expansion chambers A221 at the second end 102 each connected to respective compression chamber A222 at the first end 101 via respective conduits A1050. The system A10 further includes four expansion chambers A221 at one end each connected to respective compression chambers A222 at the same end via respective conduits A1050. In one embodiment, the system A10 includes two expansion chambers A221 at the first end 101 each connected to respective compression chambers A222 at the first end 101 via respective walled conduits A1050. The system A10 further includes two expansion chambers A221 at the second end 102 each connected to respective compression chambers A222 at the second end 102 via respective walled conduits A1050.

In one embodiment, the engine includes four piston assemblies A1010 extended along the lateral direction L and in circumferential arrangement relative to the reference longitudinal axis C204. The piston assemblies A1010 may be positioned equidistant to one another around the reference longitudinal axis C204. In one embodiment, a pair of the heater body is positioned at outer ends A103 of the engine. The heater body is positioned proximate to the expansion chamber A221 and distal to the compression chamber A222. Each heater body may be positioned and configured to provide a substantially even flow of thermal energy to four hot side heat exchangers 160 or expansion chambers A221 at a time.

In other embodiments, the engine A100 includes two or more piston assemblies A1010 in side-by-side arrangement. The piston assemblies A1010 may be positioned equidistant relative to one another. In still various embodiments, a single heater body C100 may be positioned relative to each hot side heat exchanger or working fluid body C108. It should be appreciated that various embodiments of the system A10 provided herein may include any quantity of heater bodies positioned at any quantity of expansion chambers A221 as desired. Further embodiments of the system A10 provided herein in regard to FIGS. 8 through 11 further illustrate positioning of the heater body C100 relative to the expansion chamber A221. However, it should be appreciated that other arrangements may be utilized as desired such as to provide thermal energy to the expansion chambers A221. In still various embodiments, other arrangements may be utilized such as to provide selective or independent operability of a plurality of heater bodies C100. For example, selective or independent operability of the plurality of heater bodies C100 may desirably control a temperature, flow rate, or other property of thermal energy, or particularly the heating working fluid, provided in thermal communication to the working fluid body C108. Selective operability may further include selective on/off operation of one or more heater bodies C100 independent of one another.

It should further be appreciated that although the piston assemblies A1010 of the engine A100 are depicted in straight, flat, inline, or horizontally opposed arrangements, the piston assemblies A1010 and heater bodies C100 may alternatively be arranged in V-, W-, radial, or circumferential arrangements, or other suitable piston assembly A1010 arrangements. For example, one or more embodiments of the system A10 may include a center and/or outer heater body C100 around which the plurality of piston assemblies A1010 is positioned.

Referring now to FIGS. 8 through 11, further exemplary embodiments of the system A10 are provided. The embodiments provided in regard to FIGS. 8 through 11 are configured substantially similarly as shown and described in regard to FIGS. 1 through 5. Referring to FIGS. 8 through 11, positioning the load device c092 outside of the inner ends 104 of the piston assembly A1010 provides the connection member A1030 to be shorter between pistons A1011. The shorter connection member A1030 provides the pistons A1011 to be positioned more closely together in contrast to a longer connection member A1030 based at least on the load device c092 being positioned at the inner ends 104 of the piston assembly A1010. In regard to FIG. 8, the load device c092 is formed at least in part by the piston A1011 and the surrounding piston body C700. In regard to FIGS. 9-10, the load device c092 is positioned at one or more outer ends A103 of the engine. Positioning the load device c092 outside of the inner ends 104 provides dimensions and sizing of the load device c092 to be substantially de-coupled from dimensions and sizing of the closed cycle engine. For example, positioning the load device c092 outside of the inner end A104 of the engine de-couples the length and thickness of the dynamic member A181 from the connection member A1030. As another example, positioning the load device c092 outside of the inner end A104 of the engine de-couples a desired power density of the engine from the sizing and dimensions of the load device c092, such as an electric machine. As such, the shorter connection member A1030 between the pistons A1011 provides a smaller packaging of the engine while substantially maintaining the power generation and output relative to other arrangements.

Figure 8:
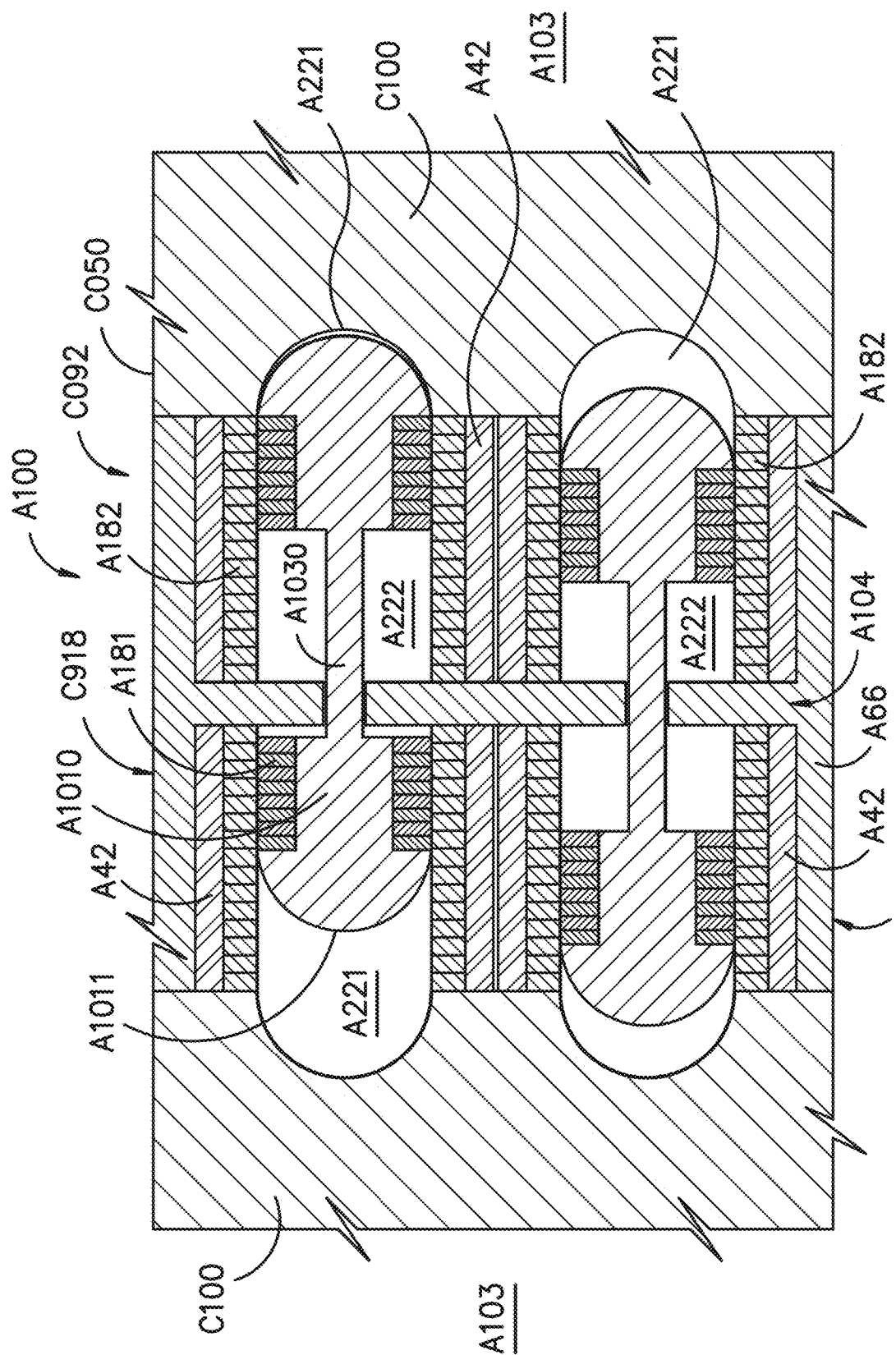
FIG. 8 is a schematic view of an embodiment of an arrangement of a portion of a system including an engine and a load device according to an aspect of the present disclosure.

In FIG. 8, the dynamic member A181 of the load device c092 defining the electric machine is positioned at the pistons A1011 of the piston assembly A1010. The stator assembly A182 of the electric machine is positioned at the piston body C700, such as at the second volume wall. Lateral movement of the pistons A1011 relative to the surrounding stator assembly A182 at the piston body C700 generates electricity at the electric machine. The system A10 further includes the chiller assembly surrounding the electric machine. In more particular embodiments, the chiller assembly surrounds the stator assembly A182 of the load device c092 defining an electric machine. The chiller assembly may further provide working fluid in thermal communication with inner ends 104 of the system A10, such as to provide thermal communication to the compression chamber A222 via the inner end wall A50.

Figure 9:
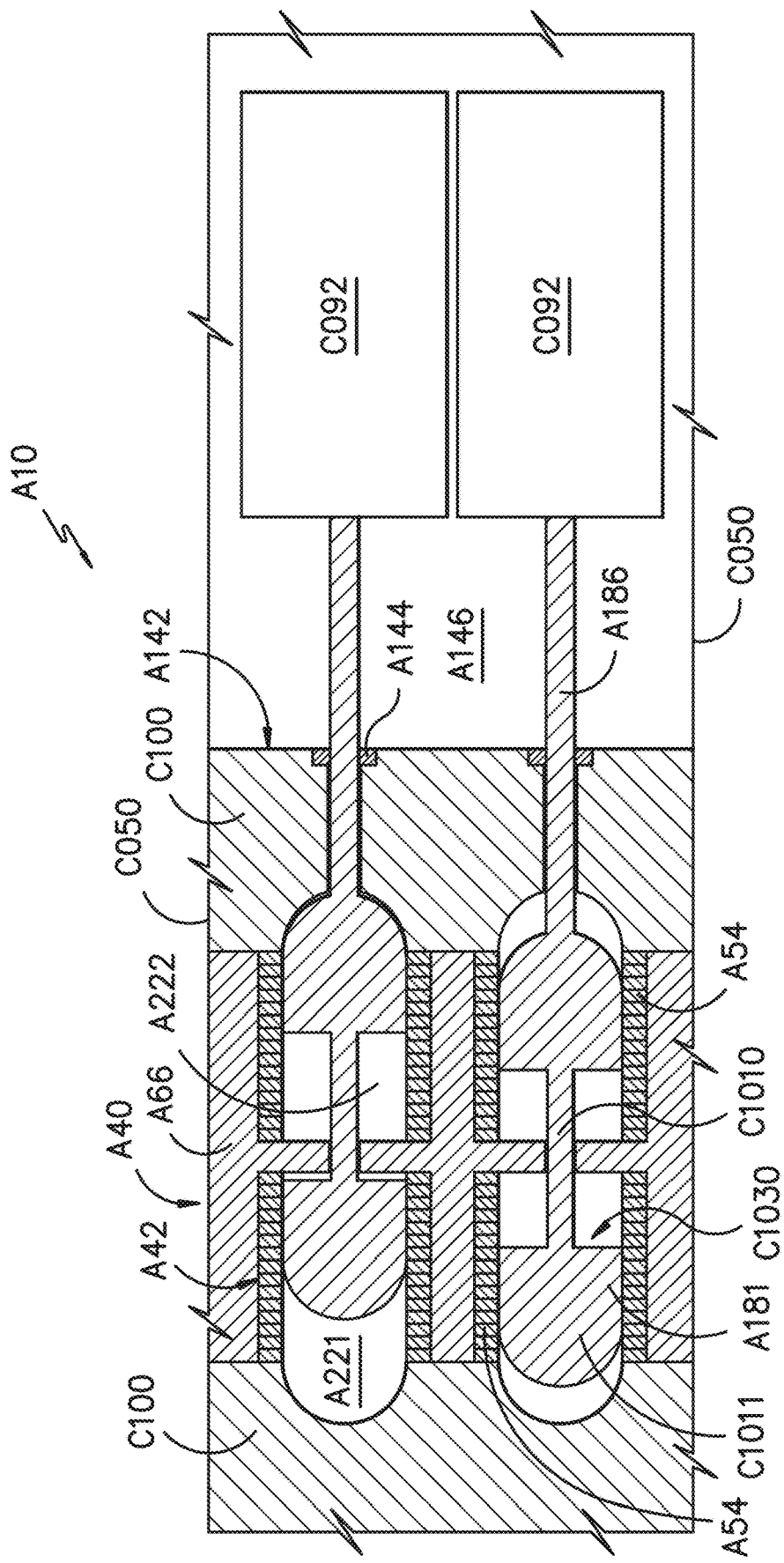
FIG. 9 is a schematic view of another embodiment of an arrangement of a portion of a system including an engine and a load device according to an aspect of the present disclosure.

Referring now to FIGS. 8 through 9, in various embodiments the chiller assembly includes a chiller casing in which a chiller flowpath is defined next to the compression chamber A222 of the volume. The chiller flowpath may particularly be defined immediately next to or adjacent to the second volume wall defined by the chiller assembly, or particularly the chiller casing, such as depicted in regard to FIG. 8. The chiller assembly includes the second volume wall and further includes the inner end wall A50 such as described in regard to FIG. 2-FIG. 3. The second volume wall and the inner end wall A50 may together define a single monolithic structure. Furthermore, the chiller casing may include the second volume wall and the inner end wall A50 and define the chiller flowpath as a single monolithic structure. As such, the structure and method for assembly and improved thermal efficiency may include positioning pistons A1011 and the connection member A1030 through the chiller assembly, operably coupling the pistons A1011 and the connection member A1030 together as the piston assembly A1010, and closing or sealing the expansion chamber A221 and compression chamber A222 via the heater body at the outer ends A103 of the closed cycle engine.

Figure 10:
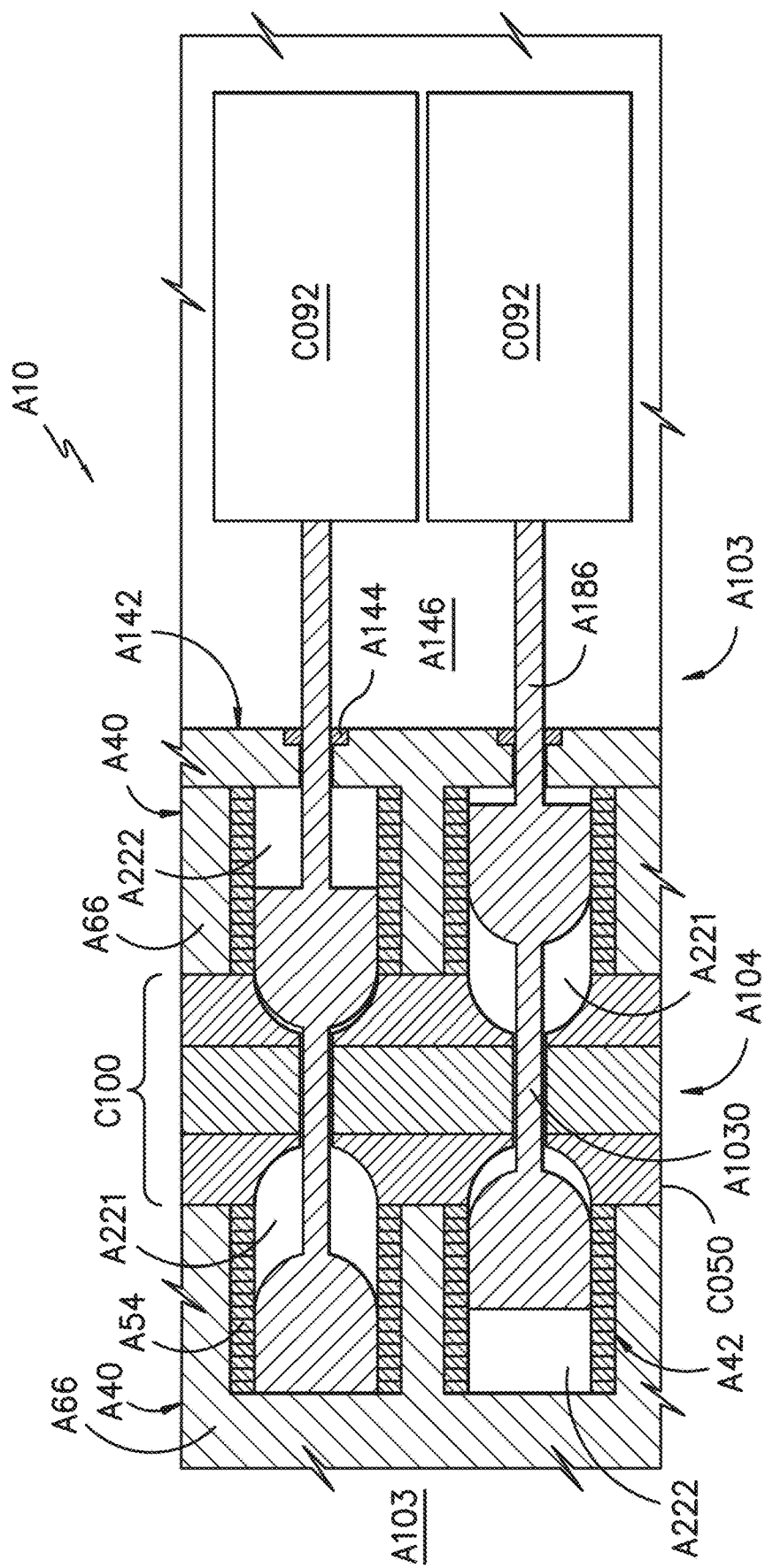
FIG. 10 is a schematic view of yet another embodiment of an arrangement of a portion of a system including an engine and a load device according to an aspect of the present disclosure.

Referring now to FIGS. 9 through 10, in various embodiments the load device c092 is positioned at one or more outer ends A103 of the closed cycle engine in operative communication with the piston assembly A1010. The system A10 may further include an extension member A186 connected to one or more pistons A1011 of the piston assembly A1010. The extension member A186 is connected to the piston A1011 and extended laterally outward toward one or more outer ends A103. The extension member A186 is operatively connected to the load device c092 such that lateral movement of the piston assembly A1010 including the extension member A186 generates electric energy at the electric machine. The extension member A186 further includes the dynamic member A181 at the load device c092 defining the electric machine operatively coupled to the electric machine in magnetic communication with the stator assembly A182, such as depicted and described in regard to FIG. 2-FIG. 3.

Referring still to FIGS. 9 through 10, the machine body c918 surrounding the load device c092 includes an interface wall A142 in contact with the outer end A103 of the load device c092. Within the machine body c918 and around the load device c092 is a cavity A146. The interface wall A142 includes a seal A144, such as a gap seal, at an interface of the extension member A186 and the interface wall A142. The cavity A146 may particularly define a pressurized cavity such that pressurization at the volume within the piston body C700, such as at the expansion chamber A221, is substantially maintained or mitigated from pressure loss within the expansion chamber A221 along the extension member A186. It should be appreciated that any suitable type of seal may be incorporated at the interface wall A142 such as to substantially maintain pressure at the expansion chamber A221, or provide an acceptably low rate of leakage over time from the expansion chamber A221.

Regarding FIG. 9, and similarly as shown and described in regard to FIGS. 2 through 8, the heater body is positioned at outer ends A103 of the closed cycle engine. In regard to the embodiment depicted in FIG. 10, the heater body is positioned at the inner end A104 of the closed cycle engine between each pair of piston bodies C700 at which each respective piston A1011 of the piston assembly A1010 is contained. The heater body may particularly define a single common heater body such as to provide a single thermal energy output source to each expansion chamber A221 of the closed cycle engine.

Figure 4:
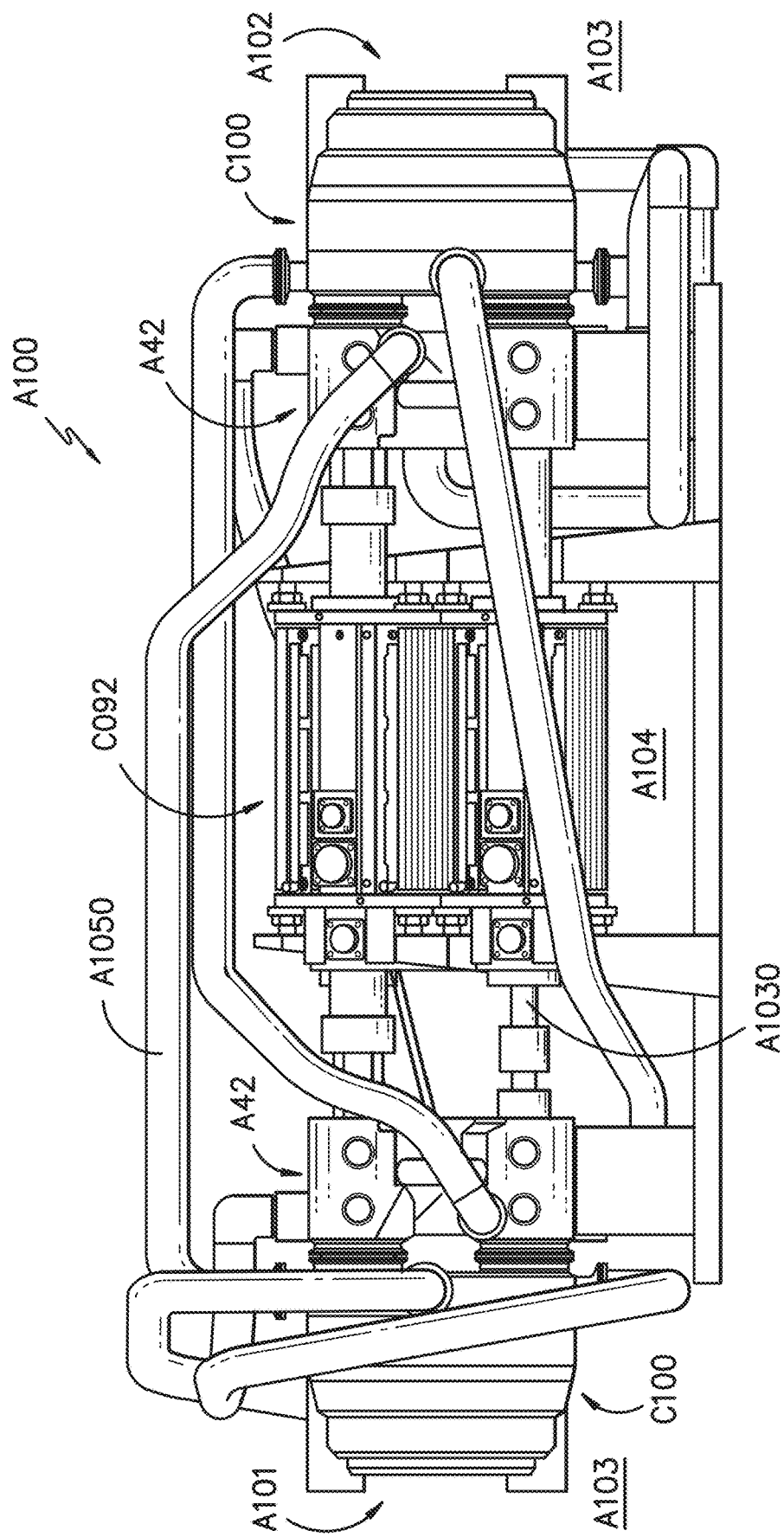
FIG. 4 is a side view of an exemplary embodiment of a portion of an engine according to an aspect of the present disclosure.
Figure 5:
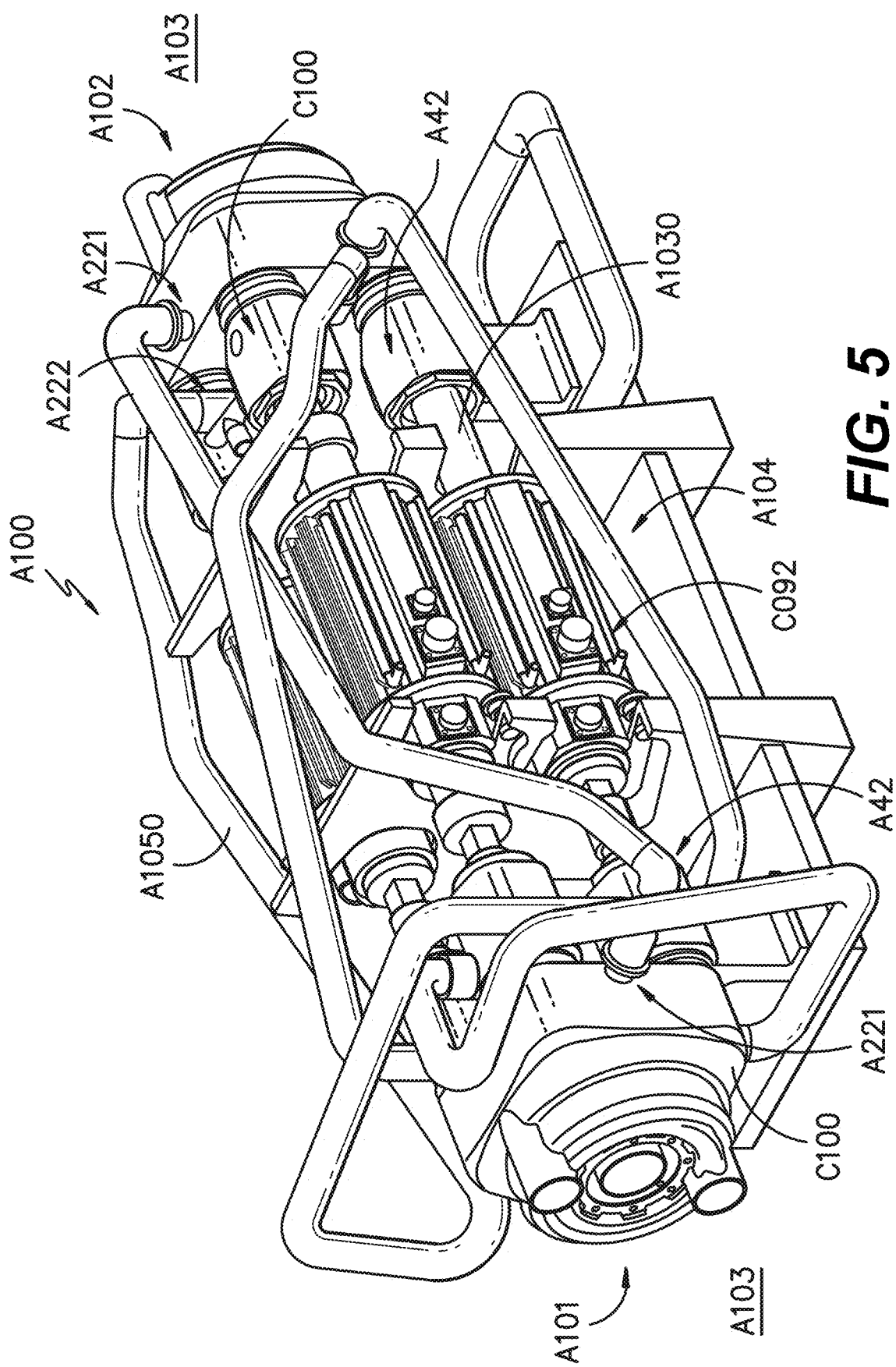
FIG. 5 is a perspective view of an exemplary embodiment of a portion of an engine such as provided in regard to FIG. 4.
Figure 6:
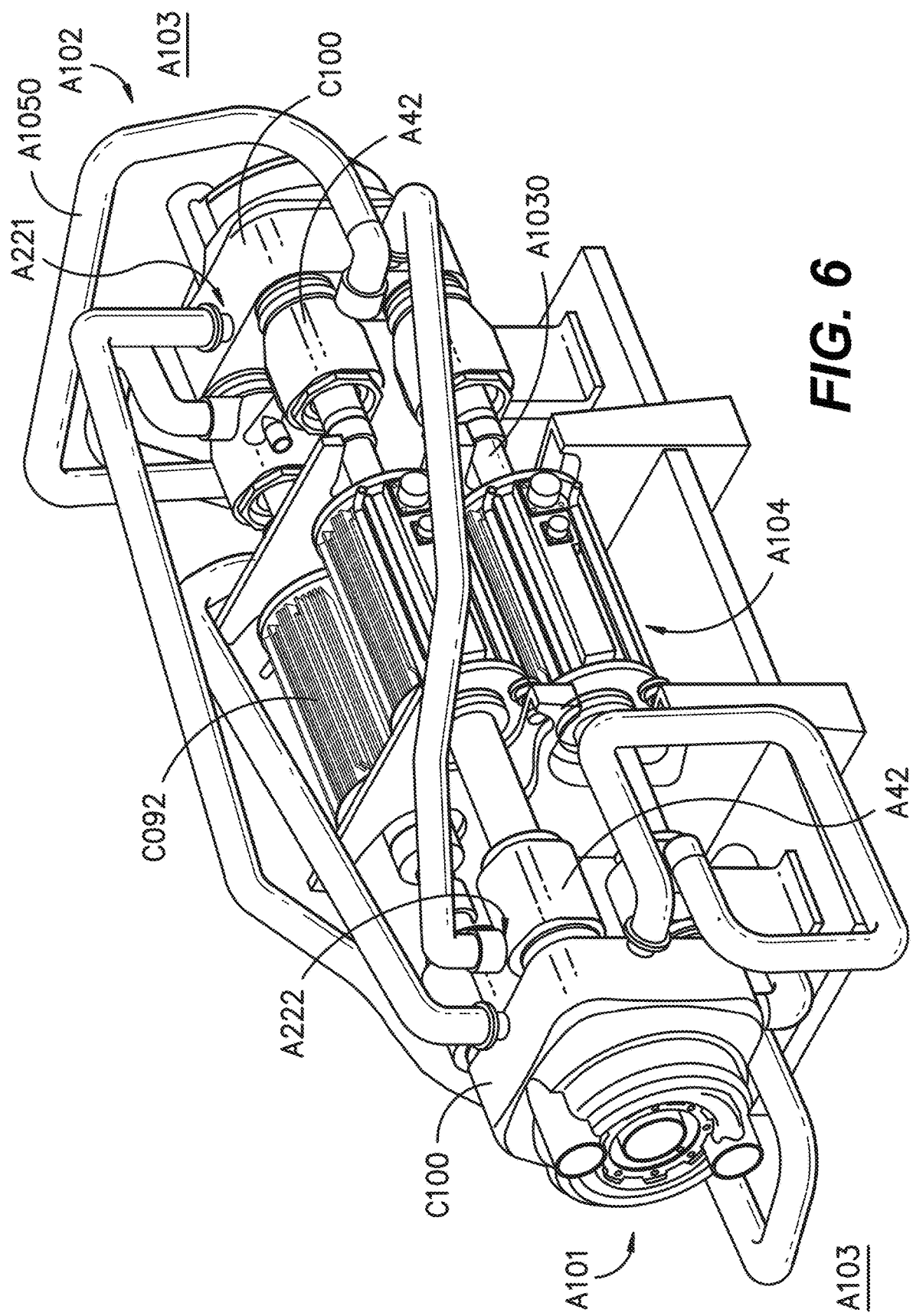
FIG. 6 is another perspective view of an exemplary embodiment of a portion of an engine such as provided in regard to FIGS. 4 through 5.
Figure 7:
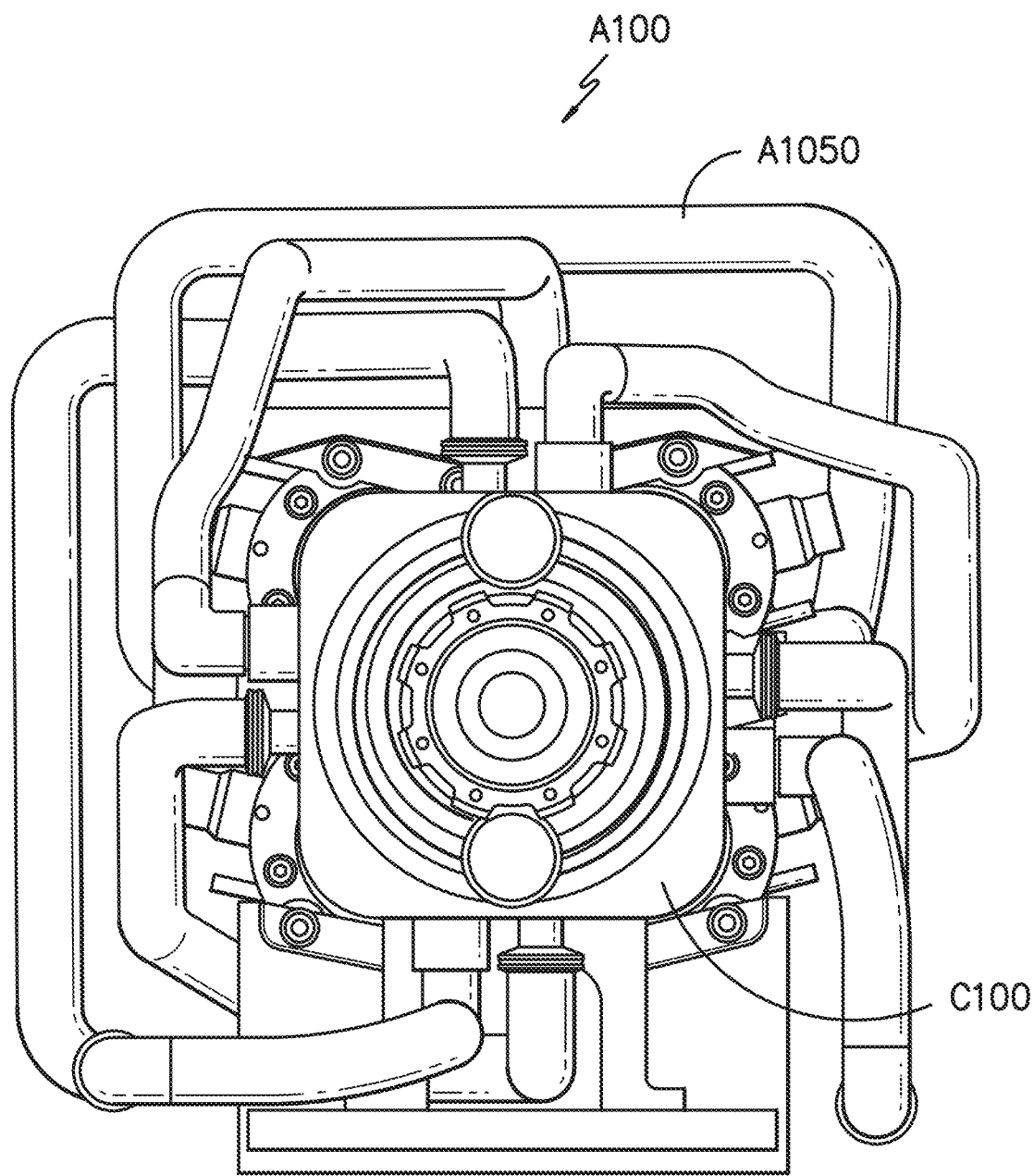
FIG. 7 is an end view of an exemplary embodiment of a portion of an engine such as provided in regard to FIGS. 4 through 5.

Referring to FIG. 10 and further in regard to the embodiment and description regarding FIGS. 4 through 5, the single common heater body may be positioned to provide a substantially uniform thermal energy output to all eight expansion chambers A221 of the closed cycle engine. The single common heater body positioned between the expansion chambers A221 may alleviate or obviate issues that may arise from uneven thermal input to the expansion chambers A221. For example, the single common heater body may mitigate phase drifting of the piston assemblies A1010 relative to one another. As such, the single common heater body may promote balanced pressure operation of the closed cycle engine, mitigate unbalanced operation, reduce vibrations or mitigate promulgation of vibrations, improve efficiency of the system A10, or promote improved operability of the system A10.

It should be appreciated that various embodiments of the system A10 provided in regard to FIGS. 1 through 10 are further configured to provide a desired thermal energy output from the heater body to the expansion chambers A221. For example, the embodiments shown and described herein may be configured to output a substantially uniform thermal energy profile from each heater body to all expansion chambers A221. In still various embodiments, the chiller assembly includes the chiller working fluid input and the chiller working fluid output such as depicted and described in regard to FIGS. 4 through 5, such as to provide a substantially uniform thermal energy output from the compression chamber A222 to the chiller assembly.

Figure 11:
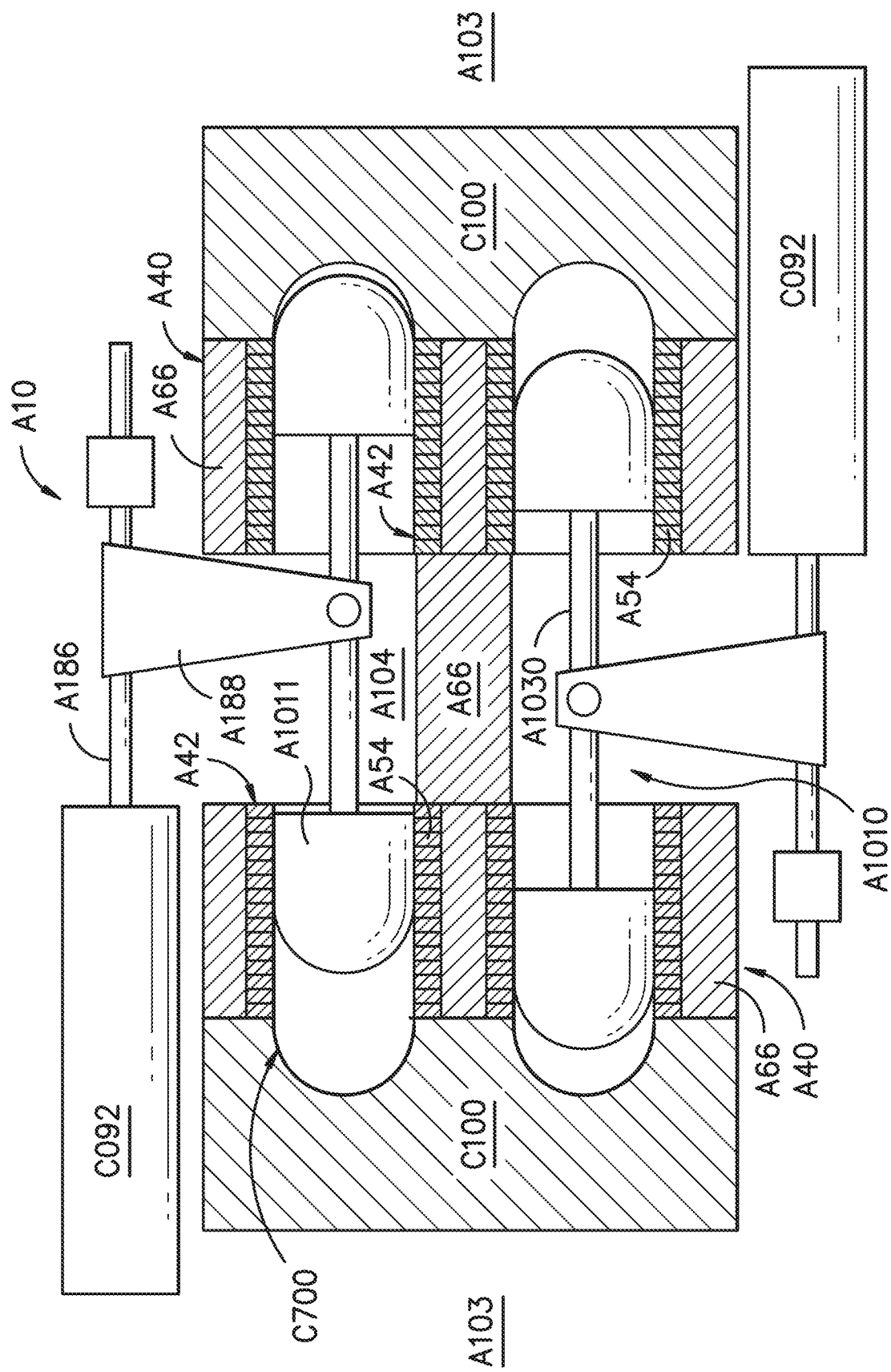
FIG. 11 is a schematic view of still another embodiment of an arrangement of a portion of a system including an engine and a load device according to an aspect of the present disclosure.

Referring now to FIG. 11, the schematic embodiment provided is configured substantially similarly as shown and described in regard to FIGS. 1 through 10. In the embodiment depicted in FIG. 11, the system A10 further includes an adapter A188 attaching the connection member A1030 to the extension member A186. In various embodiments, the adapter A188 is extended along a transverse direction generally acute to the lateral direction L. In one embodiment, the adapter A188 is extended substantially perpendicular to the lateral direction L. The adapter A188 provides substantially parallel arrangement of the connection member A1030 relative to the extension member A186 such as to translate lateral movement of the connection member A1030 at a first plane to lateral movement of the extension member A186 at a second plane different from the first plane. In various embodiments, the adapter A188 includes a mechanical connection, such as, for example, a rocker arm, to extend from the connection member A1030 to the load device c092. The adapter A188 further provides a diameter, length, or other dimension of the load device c092 to be de-coupled from dimensions of the closed cycle engine. In various embodiments, the adapter A188 provides the dynamic member A181 and/or extension member A186 of the load device c092 to have a stroke or length different from the connection member A1030. The adapter A188 may further provide the load device c092 to include a gearing system, a frequency converter, or other devices to alter or scale the output of the load device c092 from the size or speed of the piston assembly A1010. As such, the closed cycle engine and the load device c092 may each be sized substantially separately for improved performance of each.

In general, the exemplary embodiments of system A10 and engine, or portions thereof, described herein may be manufactured or formed using any suitable process. However, in accordance with several aspects of the present subject matter, some or all of system A10 may be formed using an additive manufacturing process, such as a 3-D printing process. The use of such a process may allow portions of the system A10 to be formed integrally, as a single monolithic component, or as any suitable number of sub-components. In various embodiments, the manufacturing process may allow the all or part of the heater body, the chiller assembly, the load device c092, or the engine to be integrally formed and include a variety of features not possible when using prior manufacturing methods. For example, the additive manufacturing methods described herein provide the manufacture of the system A10 having unique features, configurations, thicknesses, materials, densities, and structures not possible using prior manufacturing methods. Some of these novel features can, for example, improve thermal energy transfer between two or more components, improve thermal energy transfer to the engine working fluid, improve thermal energy transfer from the engine working fluid to the chiller working fluid, reduce leakages, or facilitate assembly, or generally improve thermal efficiency, power generation and output, or power density of the system A10 using an additive manufacturing process as described herein.

Various embodiments of the system A10 and engine A100 shown and described herein provide desired power outputs, power densities, or efficiencies, or combinations thereof, based on one or more elements, arrangements, flowpaths, conduits, surface areas, volumes, or assemblies, or methods thereof, provided herein. Efficiencies described herein may include $T_{Hot,engine}$ corresponding to temperature input to the engine working fluid at the heater conduits or working fluid pathways C110 from the hot side heat exchanger C108. Still various embodiments include $T_{Cold,ambient}$ corresponding to temperature removed from the engine working fluid at the chiller conduits A54 to the cold side heat exchanger A42. In other instances, the temperature input may alternatively correspond to heat or thermal energy input to the engine working fluid, such as from the heating working fluid. Still further, the temperature removed may alternatively correspond to heat or thermal energy output from the engine working fluid, such as to the chiller working fluid. In still various embodiments, the environment is the chiller working fluid into which the engine A100 rejects, exhausts, or otherwise releases heat or thermal energy from the engine working fluid at the chiller conduits A54.

In still yet various embodiments, efficiencies described herein may include $Q_{Out}$ corresponding to thermal energy received by the engine working fluid at the heater conduits or working fluid pathways C110 from the hot side heat exchanger C108. Still various embodiments include $Q_{In}$ corresponding to thermal energy received at the chiller working fluid at the chiller working fluid passage A56 at the cold side heat exchanger A42 from the engine working fluid at the chiller conduits A54.

In still another embodiment, $E_{out}$ is the net electrical energy output from the load device C092 that is operatively coupled to the engine A100 via the piston assembly C1010.

In various embodiments, the features, arrangements, surface areas, volumes, or ratios thereof provide the engine A100 to operate at higher efficiencies over known closed cycle engines, or Stirling engines particularly. Various embodiments of the system A10 provided herein may be configured to produce mechanical power output from the piston assembly A1010 at a Carnot efficiency $\eta_{Carnot}$ of up to approximately 80%. In some embodiments, the system A10 provided herein may be configured to produce mechanical power output from the piston assembly A1010 at an efficiency of up to approximately 80% cold environments, such as in space. In one embodiment, the Carnot efficiency corresponds to the thermal efficiency of the engine A100 receiving thermal energy or heat at the heater conduits C110 and expelling thermal energy or heat from the engine working fluid at the chiller conduits A54. In one embodiment, the Carnot efficiency corresponds at least to the engine A100 including the hot side heat exchanger C108 and the cold side heat exchanger A42, such as depicted at the engine level efficiency (FIG. 1).

Various embodiments of the system A10 provided herein may be configured to produce mechanical power output from the piston assembly A1010 at electrical efficiency of up to approximately 80%. In one embodiment, the electrical efficiency corresponds to the useful work generated by the engine A100 receiving heat or thermal energy from the heating working fluid and releasing heat or thermal energy to the chiller working fluid and converted into electrical energy via the load device C092, such as depicted within area A106 in FIG. 1. In one embodiment, the electrical efficiency corresponds at least to the system A10 including the engine A100, the heater body C100, and the chiller assembly A40, such as depicted at the system level efficiency (FIG. 1).

In one embodiment, the system A10 provides a temperature differential via the heater body C100 and the chiller assembly C40 in which the engine A100 generates mechanical power output between 1 kW and 100 kW relative to the piston assembly A1010. In another embodiment, the system A10 is configured to generate between 10 kW and 100 kW. In yet another embodiment, the system A10 is configured to generate between 25 kW and 100 kW. In yet another embodiment, the system A10 may be configured to produce greater than 100 kW. For example, the system A10 may include a plurality of the engine A100 operably coupled at two or more piston assemblies A1010 and the load device c092 to produce greater than 100 kW. In various embodiments, a plurality of the engine A100 may be operably coupled to produce up to 5 megawatts.

In still various embodiments, the engine A100 further defines a ratio of mechanical power output from the piston assembly A1010 to maximum cycle volume of the working fluid. In various embodiments, the system A10 defines a ratio of maximum cycle volume of the engine working fluid to a collective volume of the plurality of heater conduits. The maximum cycle volume is the maximum volume of the engine working fluid within the expansion chamber A221, the compression chamber A222, and the fluid volume connected therebetween (e.g., the expansion chamber A221 of one piston body and the compression chamber A222 of another piston body connected by the walled conduit A1050). The minimum cycle volume is the minimum volume of the engine working fluid within the expansion chamber A221, the compression chamber A222, and the fluid volume connected therebetween (e.g., the expansion chamber A221 of one piston body and the compression chamber A222 of another piston body connected by the walled conduit A1050). The difference between the maximum cycle volume and the minimum cycle volume is the swept volume.

In certain embodiments, the system A10 defines an operational parameter defining a ratio of mechanical power output from the piston assembly A1010 to maximum cycle volume of the working fluid, in which the operational parameter is between 0.0005 and 0.0040 kW per cubic centimeter (cc) for a given efficiency. In various embodiments, the ratio of mechanical power output from the piston assembly A1010 to maximum cycle volume of the working fluid is a range of maximum ratio at which the mechanical power output from the piston assembly A1010 to maximum cycle volume of the working fluid is defined. In some embodiments, the engine A100 defines a maximum ratio of mechanical power output from the piston assembly A1010 to maximum cycle volume of the working fluid between 0.0005 and 0.0040 kW generated from the piston assembly A1010 for one cubic centimeter of engine working fluid at an engine efficiency of at least 50%. Stated differently, between 0.0005 and 0.0040 kW is generated from the piston assembly A1010 for one cubic centimeter of engine working fluid at an engine efficiency of at least 50%. In various embodiments, the engine A100 defines a ratio of mechanical power output from the piston assembly A1010 to the maximum cycle volume of the working fluid between 0.0010 and 0.0030 kW/cc at an engine efficiency of at least 50%. In another embodiment, the engine A100 defines a ratio of mechanical power output from the piston assembly A1010 to the maximum cycle volume of the working fluid between 0.0015 and 0.0025 kW/cc at an engine efficiency of at least 50%. In one embodiment, the system A10 defines the ratio of mechanical power output from the piston assembly A1010 to maximum cycle volume of the working fluid between 0.0005 kW/cc and 0.0040 kW/cc at a Carnot efficiency of the engine of up to 80%. In another embodiment, the engine A100 defines the ratio of mechanical power output from the piston assembly A1010 to maximum cycle volume of the working fluid between 0.0005 kW/cc and 0.0040 kW/cc with an efficiency of the engine A100 of up to 60%.

Various embodiments of the system A10 shown and described herein provide a power density by efficiency that may be advantageous over certain power generation or energy conversion systems including engine and heat exchanger systems. In certain embodiments, the system A10 includes an operational parameter defining a multiplication product of power density (kW/m$^3$) and system level efficiency greater than 51. For example, the power density is power output at the load device c092 over volume of the engine working fluid at the engine A100. In particular embodiments, the system A10 includes the power density over maximum cycle volume of the engine working fluid at the engine A100. In some embodiments, the system A10 includes a power density (kW/m$^3$) by efficiency greater than 100. In still other embodiments, the system A10 includes a power density (kW/m$^3$) by efficiency greater than 255. In various embodiments, the system A10 includes a power density (kW/m$^3$) by efficiency less than 400. In other embodiments, the system A10 includes a power density (kW/m$^3$) by efficiency less than 125. In still various embodiments, the system A10 includes a power density (kW/m$^3$) by efficiency between 51 and 400.

In still various embodiments, the engine A100 includes yet another operational parameter at which one or more of the efficiencies and ratio of mechanical power output from the piston assembly A1010 to maximum cycle volume of the engine working fluid relative to a temperature differential of the engine working fluid at the expansion chamber A221 and the compression chamber A222. In one embodiment, the operational parameter defines the temperature differential of the engine working fluid at the expansion chamber A221 and the compression chamber A222 of at least 630 degrees Celsius. In one embodiment, the cold side heat exchanger A42 is configured to reduce the temperature of the engine working fluid at the chiller conduits A54 and/or compression chamber A222 less than 120 degrees Celsius. In another embodiment, the cold side heat exchanger A42 is configured to reduce the temperature of the engine working fluid at the chiller conduits A54 or compression chamber A222 to between approximately −20 degrees Celsius and approximately 120 degrees Celsius on average during steady-state full power operation. In still another embodiment, the cold side heat exchanger A42 is configured to reduce the temperature of the engine working fluid at the chiller conduits A54 or compression chamber A222 to between 20 degrees Celsius and approximately 120 degrees Celsius on average during steady-state full power operation. In yet another embodiment, the hot side heat exchanger C108 is configured to heat the engine working fluid at the heater conduits C110 or expansion chamber A221 to at least 750 degrees Celsius. However, it should be appreciated that an upper limit of the heat provided to the hot side heat exchanger C108 or the expansion chamber A221 is based at least on materials limits, such as one or materials listed or described herein, or another suitable material for constructing the engine and/or system. Material limits may include, but are not limited to, a melting point, tensile stress, yield stress, deformation or deflection limits, or desired life or durability of the engine.

It should be appreciated that performances, power outputs, efficiencies, or temperature differentials at the system A10, the engine A100, or both, provided herein may be based on a "Sea Level Static" or "Standard Day" input air condition such as defined by the United States National Aeronautics and Space Administration, unless otherwise specified. For example, unless otherwise specified, conditions provided to the heater body, the chiller assembly, or both, or any subsystems, components, etc. therein, or any other portions of the system A10 receiving an input fluid, such as air, are based on Standard Day conditions.

Chapter 5—Systems and Methods of Control

Chapter 5.1.1—Overview

Control systems and methods of controlling various systems disclosed herein will now be provided. In one aspect, a control system for a power generation system is provided. The power generation system includes one or more closed cycle engines, one or more electric machines operatively coupled thereto, and one or more electrical devices in communication with the electric machines. For instance, the electrical devices can be energy storage devices, such as one or more batteries. The control system can control the closed cycle engine and its associated balance of plant to generate a temperature differential. Thus, the engine defines a hot side and a cold side. The temperature differential causes free piston assemblies to move within their respective piston chambers. The movement of the pistons causes the electric machines to generate electrical power. The generated electrical power can be provided to the energy storage devices for charging thereof. The control system monitors one or more operating parameters associated with the closed cycle engine, such as piston movement (e.g., amplitude and position), as well as one or more operating parameters associated with the electric machine, such as voltage or electric current. Based on such parameters, the control system generates control commands that are provided to one or more controllable devices of the system. The controllable devices execute control actions in accordance with the control commands. Accordingly, the desired output of the system can be achieved. Furthermore, the control system can monitor and anticipate load changes on the electric machines and can control the closed cycle engine to anticipate such load changes to better maintain steady state operation despite dynamic and sometimes significant electrical load changes on the electric machines. A method of controlling the power generation system is also provided. In another aspect, a control system for a heat pump system is provided. The heat pump system includes one or more of the closed cycle engines described herein. A method of controlling the heat pump system is also provided. The power generation and heat pump systems as well as control methods therefore are provided in detail below.

Chapter 5.1.2—Power Generation System Overview

Figure 12:
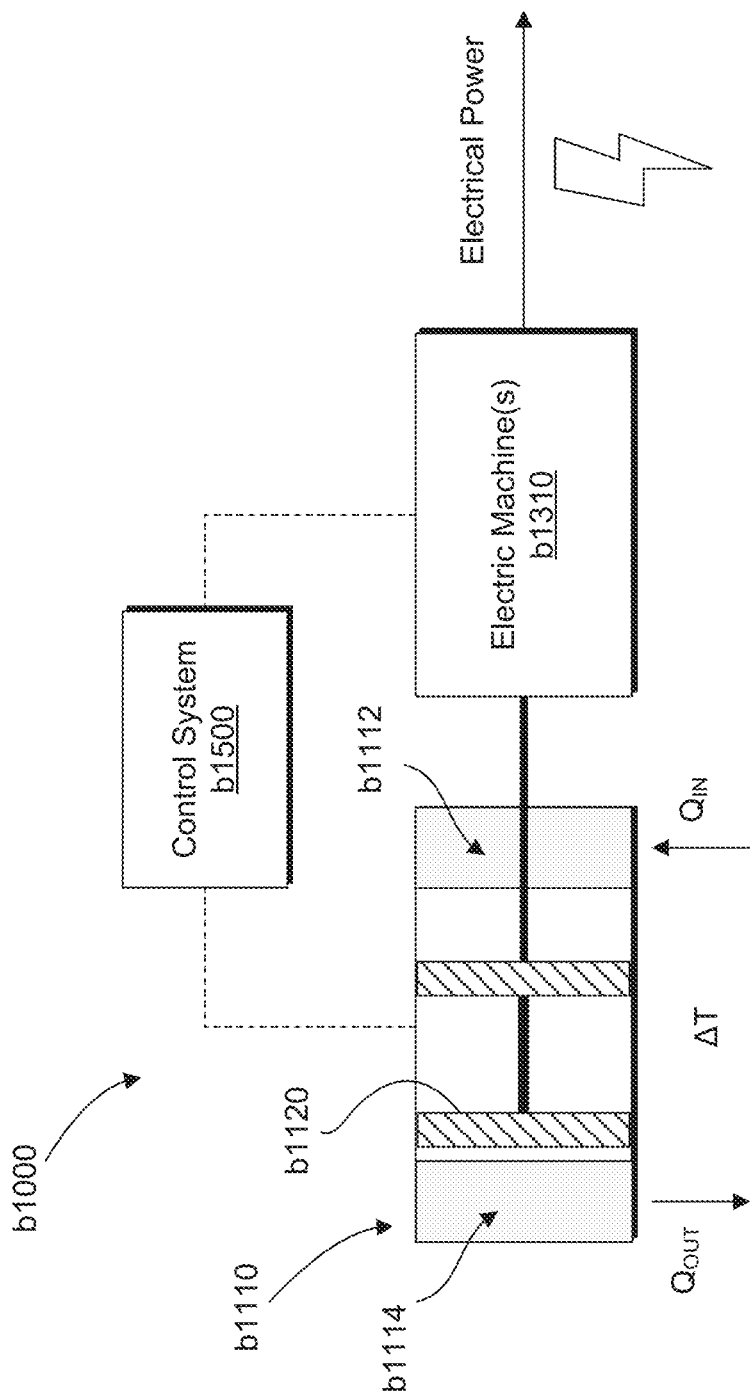
FIG. 12 provides a schematic block diagram of a power generation system according to an aspect of the present disclosure.

FIG. 12 provides a schematic block diagram of a power generation system b1000 according to an aspect of the present disclosure. Generally, the power generation system b1000 is configured to generate electrical power. The generated electrical power can be used in any suitable manner. For instance, the generated electrical power can be used to charge a battery system, fed to a power grid, or used in some other suitable manner.

The power generation system b1000 includes a closed cycle engine b1110, e.g., such as any one of the closed cycle engines described herein. The closed cycle engine b1110 defines a hot side b1112 and a cold side b1114. Accordingly, the closed cycle engine b1110 defines a temperature differential ΔT. Generally, during operation, the hot side b1112 is hotter than or at a higher temperature than the cold side b1114. In some embodiments, the hot side b1112 can be hotter than an ambient temperature. For instance, a heat source can heat or impart thermal energy to the hot side b1112, as denoted by $Q_{IN}$ in FIG. 12. In yet other embodiments, the hot side b1112 can be an ambient temperature and the cold side b1114 can be colder than the ambient temperature. For instance, heat or thermal energy can be removed from the cold side b1114, as denoted by $Q_{OUT}$ in FIG. 12. In some embodiments, the hot side b1112 can be actively heated and the cold side b1114 can be actively cooled or heat can be removed or extracted therefrom. The temperature differential ΔT between the hot side b1112 and the cold side b1114 causes one or more piston assemblies b1120 to move within their respective piston bodies b1116, e.g., between the hot side b1112 and the cold side b1114 of the engine. As the one or more piston assemblies b1120 are moved within their respective piston bodies b1116, one or more electric machines b1310 operatively coupled thereto generate electrical power.

As further depicted in FIG. 12, the power generation system b1000 includes a control system b1500 for controlling various aspects of the power generation system b1000, including controlling the closed cycle engine b1110 and the one or more electric machines b1310 operatively coupled thereto. The control system b1500 can include one or more control devices, such as sensors, controllers, processors, controllable devices b1534, etc. that can monitor and control various aspects of the power generation system b1000. An example manner in which the control system b1500 controls the power generation system b1000 will be described herein.

Figure 13:
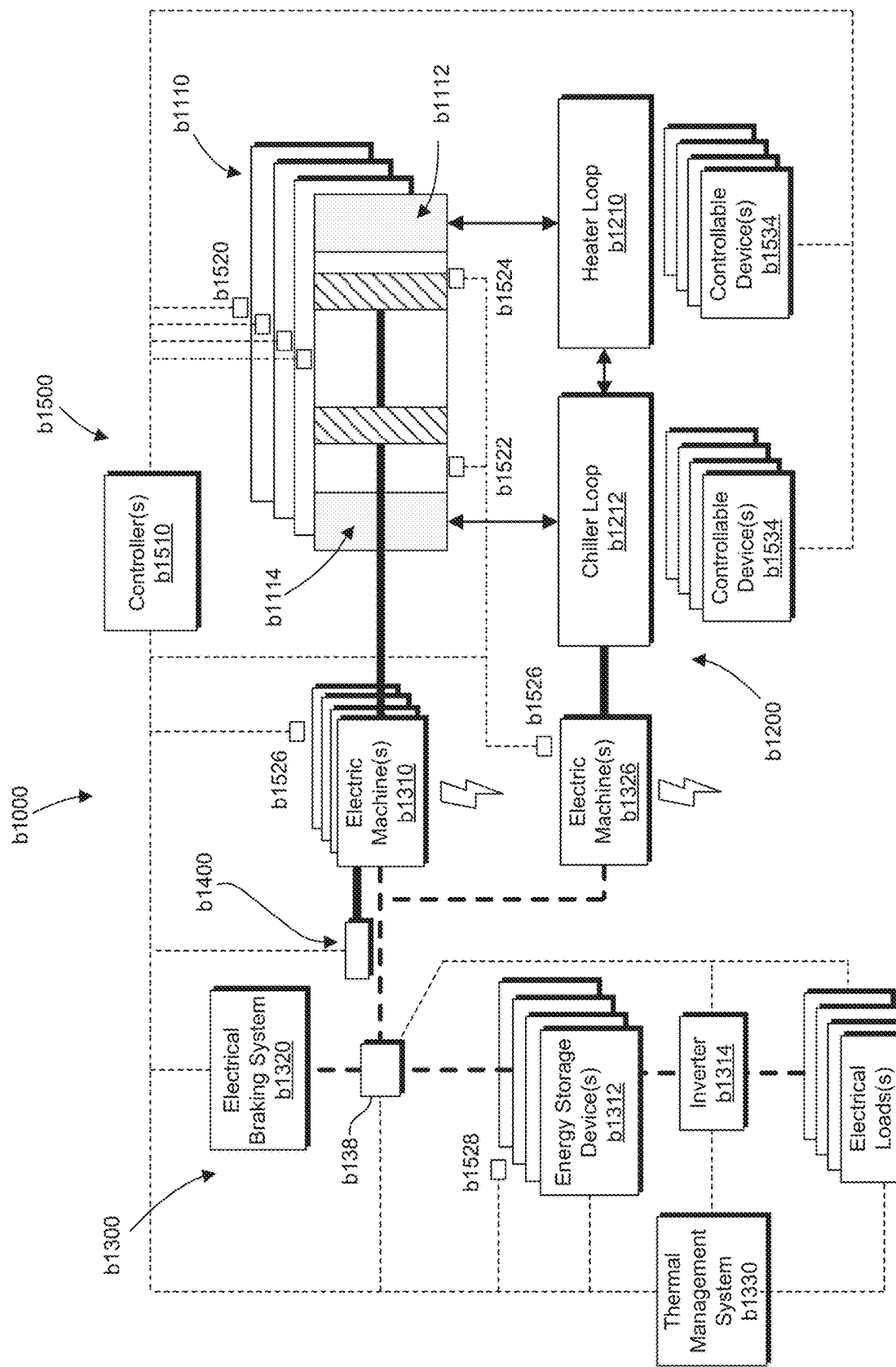
FIG. 13 provides a detailed schematic view of the power generation system of FIG. 12.

FIG. 13 provides a detailed schematic view of the power generation system b1000 of FIG. 12. As shown, the power generation system b1000 includes a closed cycle engine b1110, a balance of plant b1200 for creating or generating the temperature differential ΔT between the hot side b1112 and the cold side b1114 of the engine b1110, and an electrical system b1300 for generating electrical power utilizing the useful work produced by the closed cycle engine b1110. The closed cycle engine b1110 and its associated balance of plant b1200 are configured to produce useful work such that one or more electric machines b1310 of the electrical system b1300 can generate electrical power. As noted above, the generated electrical power can be utilized in any suitable way. For instance, for this embodiment, the generated electrical power can be used to charge one or more energy storage devices b1312 in communication with the one or more electric machines b1310.

The closed cycle engine b1110 can be any of the closed cycle engines b1110 described herein. For instance, in some embodiments, the closed cycle engine b1110 is a Stirling engine, such as e.g., any of the Stirling engines described herein. The closed cycle engine b1110 can include an engine block that has one or more piston bodies b1116. For instance, for the depicted embodiment of FIG. 13, the engine block includes four (4) piston bodies b1116. Each piston body b1116 can receive a piston assembly b1120 therein. The piston assemblies b1120 are each movable within their respective piston bodies b1116, e.g., between the hot side b1112 and the cold side b1114 of the engine. When the piston assemblies b1120 move or travel within their respective piston bodies b1116, the closed cycle engine b1110 produces useful work. Each piston assembly b1120 includes a pair of opposing pistons b1122, b1124 operatively coupled by a connection member b1126, e.g., a shaft.

The balance of plant b1200 shown schematically in FIG. 13 can be any of the balance of plant systems described herein. For this embodiment, the balance of plant b1200 includes a heater loop b1210 for imparting thermal energy or heat to the hot side b1112 of the closed cycle engine b1110 and a chiller loop b1212 for removing or extracted thermal energy or heat from the cold side b1114. Accordingly, the heater loop b1210 and the chiller loop b1212 can generate the temperature differential ΔT. The temperature differential ΔT between the hot side b1112 and the cold side b1114 causes, at least in part, the piston assemblies b1120 to move or travel within their respective piston bodies b1116. Furthermore, the heater loop b1210 and chiller loop b1212 can be in fluid communication as shown in FIG. 13, e.g., for heat recovery purposes. The heater loop b1210 and the chiller loop b1212 can each have one or more controllable devices b1534 associated therewith.

The one or more electric machines b1310 are operatively coupled with the one or more piston assemblies b1120. The one or more electric machines b1310 can be operatively coupled with the one or more piston assemblies b1120 in any suitable manner, such as in any way described in Chapter 1. In some embodiments, for example, one or more electric machines b1310 can be operatively coupled with each piston assembly b1120. In other embodiments, each piston assembly b1120 need not have an electric machine b1310 operatively coupled thereto. The one or more electric machines b1310 can be operatively coupled with the one or more piston assemblies b1120 in any suitable manner. As one example, a piston body b1116 can serve as the stator b1324 and its associated piston assembly b1120 can serve as the dynamic member b1322 or mover of an electric machine b1310. Particularly, stator windings can be disposed along the piston body b1116 between the hot side b1112 and the cold side b1114 and the piston assembly b1120 can have one or more magnetic devices or permanent magnets connected thereto, e.g., connected to the connection member b1126 and/or to the pistons b1122, b1124 themselves. As the piston assemblies b1120 are moved between the hot side b1112 and the cold side b1114 of the closed cycle engine b1110, the stator windings of the piston body b1116 and the permanent magnets of the piston assembly b1120 are in magnetic communication along at least a portion of travel of the piston assembly b1120. Consequently, the permanent magnets excite the stator windings as the magnets travel thereby. In this way, the one or more electric machines b1310 are operable to generate electrical power when the one or more piston assemblies b1120 are moved between the hot side b1112 and the cold side b1114. Thus, in such instances, the electric machines b1310 operate in an electric generator state. That is, the electric machines b1310 function as generators at least in some instances of operation. Although the described above as having a linear configuration, the one or more electric machines b1310 can be any suitable type of electric machines b1310, including for example, rotary electric machines b1310.

As further depicted in FIG. 13, one or more electric machines b1326 can be operatively coupled with one or more devices of the chiller loop b1212. For instance, one or more electric machines b1326 can be operatively coupled with an expansion device or turbine of the chiller loop b1212. The one or more electric machines b1326 operatively coupled with the chiller loop b1212 can generate electrical power that can be used in some useful way and/or can be used to provide electrical power to drive some component of the chiller loop b1212, such as e.g., an expansion device or turbine of the chiller loop b1212.

For this embodiment, the electrical system b1300 of the power generation system b1000 includes one or more energy storage devices b1312 in communication with the one or more electric machines b1310, b1326. For instance, the one or more energy storage devices b1312 can be in electrical communication with the one or more electric machines b1310, e.g., by one or more suitable wired or wireless communication links. Particularly, the one or more energy storage devices b1312 can be in communication with the one or more electric machines b1310 operatively coupled with the closed cycle engine b1110 and/or the one or more electric machines b1326 operatively coupled with the chiller loop b1212. The one or more energy storage devices b1312 can include any suitable type or combination of energy storage devices b1312. For instance, in some embodiments, the one or more energy storage devices b1312 include one or more batteries. For example, as depicted in FIG. 13, the one or more energy storage devices b1312 are configured as a battery system. In some other embodiments, the one or more energy storage devices b1312 include one or more super capacitors. The one or more energy storage devices b1312 can include other suitable energy storage devices b1312 as well.

The one or more energy storage devices b1312 in communication with the one or more electric machines b1310 are operable to receive electrical power therefrom. That is, the electrical power generated by the one or more electric machines b1310 can be provided to the one or more energy storage devices b1312. Further, in some instances during operation, the one or more energy storage devices b1312 in communication with the one or more electric machines b1310 are operable to provide electrical power thereto. For example, during startup or initialization of the closed cycle engine b1110, the one or more energy storage devices b1312 can provide electrical power to the one or more electric machines b1310. The provided electrical power can cause the one or more electric machines b1310 to drive the one or more piston assemblies b1120 within their respective piston bodies b1116, e.g., between the hot side b1112 and cold side b1114. Accordingly, in some instances, the one or more electric machines b1310 are operable in an electric motor state. Thus, for the depicted embodiment of FIG. 13, the one or more electric machines b1310 operatively coupled with the closed cycle engine b1110 are operable in an electric motor state and in an electric generator state.

As further shown in FIG. 13, the electrical system b1300 can include an inverter b1314 for converting direct electrical current to alternating electrical current and one or more electrical loads b1316. The one or more electrical loads b1316 can be in communication with the one or more energy storage devices b1312 in any suitable manner, such as e.g., any suitable wired or wireless communication link. The one or more electrical loads are operable to receive electrical power from the one or more energy storage devices b1312. In some other embodiments, the one or more electric machines b1310 operatively coupled with the closed cycle engine b1110 and/or the one or more electric machines b1310 operatively coupled with some component of the chiller loop b1212 can provide direct electrical power to the one or more electrical loads b1316. The one or more electrical loads b1316 can include any suitable electrical load, such as e.g., a power grid, a fuel cell, an air conditioning unit of a vehicle, etc. A thermal management system b1330 is communicatively coupled with the various electrical components of the electrical system b1300 and is configured to management the thermal loads thereon, e.g., to maintain satisfactory operating temperatures thereof.

The power generation system b1000 also includes a control system b1500 for controlling various aspects thereof, as noted above. Particularly, the control system b1500 can initialize and control the power generation system b1000 during operation in accordance with various control schemes. As one example, the power generation system b1000 can be controlled in such a way that the efficiency of the overall power generation system b1000 is optimized. As another example, the power generation system b1000 can be controlled in such a way that the cost of operating the power generation system b1000 is optimized. For instance, the power generation system b1000 can be controlled in such a way that the cost of operating the system is minimized. In yet other embodiments, the power generation system b1000 can be controlled in such a way that a cost to power generation ratio is minimized. As yet another example, the power generation system b1000 can be controlled in such a way that a set amount of electrical power is generated by the electric machines b1310 of the system. Other control schemes are also possible.

Figure 14:
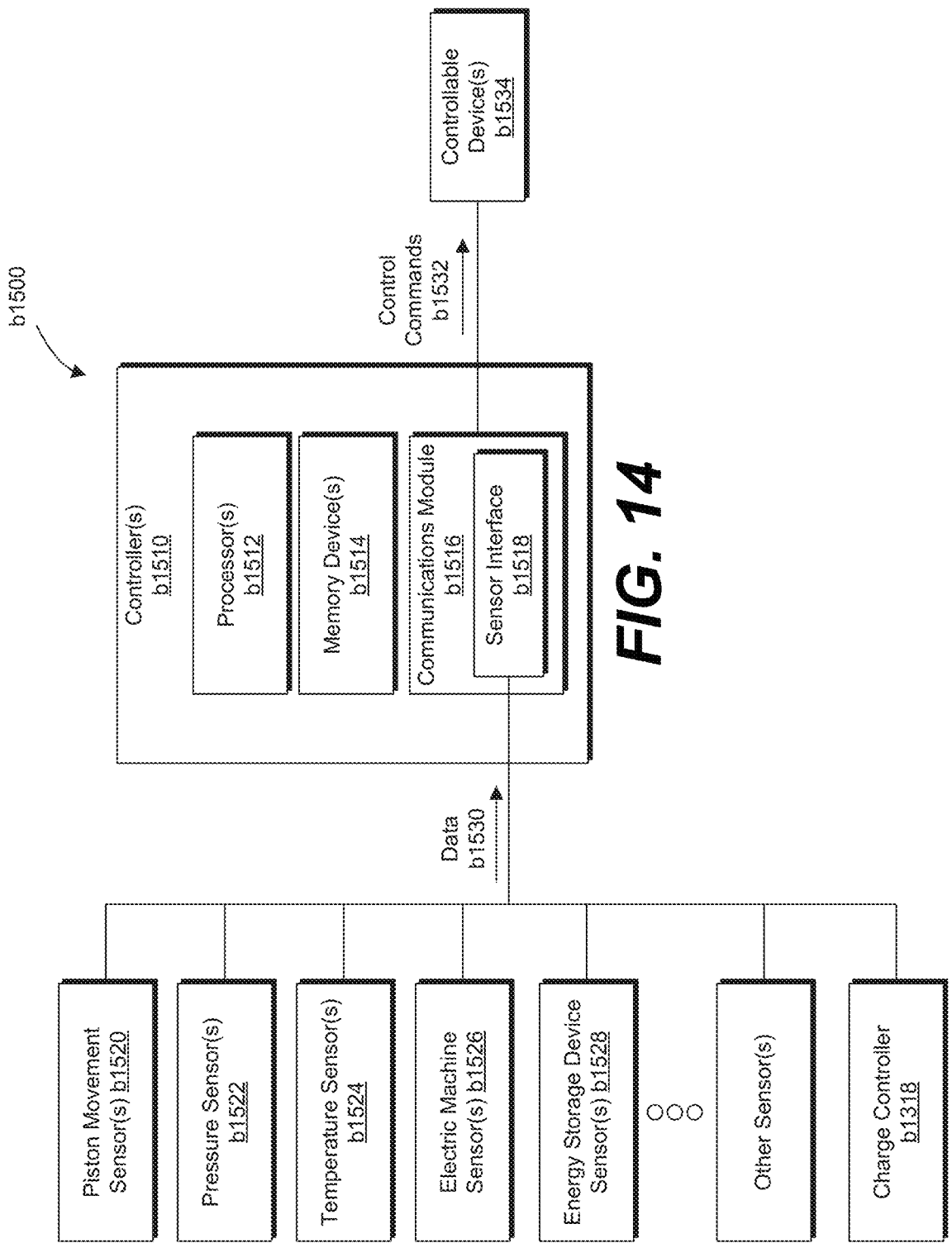
FIG. 14 provides a block diagram of a control system of the power generation system of FIGS. 12 and 13.

With reference now to FIGS. 13 and 14, FIG. 14 provides a block diagram depicting the control system b1500 of the power generation system b1000 of FIGS. 12 and 13. As noted above, the control system b1500 can include one or more control devices, such as sensors, controllers b1510, processors, controllable devices b1534, etc. that can monitor and control various aspects of the power generation system b1000. For instance, the control system b1500 can monitor one or more operating parameters of the closed cycle engine b1110, the one or more electric machines b1310, and/or the one or more energy storage devices b1312 using one or more sensors. For instance, the control system b1500 can monitor one or more piston movement characteristics using one or more piston movement sensors b1520. Example piston movement characteristics can include piston position, speed, amplitude, frequency, and/or phase. The piston movement sensors b1520 can be position encoders, for example. The control system b1500 can also monitor the pressure within the closed cycle engine b1110 at various positions or stations (e.g., within the piston bodies b1116 or along fluid pathways fluidly connecting the piston bodies b1116) using one or more pressure sensors b1522. Further, the control system b1500 can monitor the temperature within the closed cycle engine b1110 at various positions or stations (e.g., within the piston bodies b1116 or along fluid pathways fluidly connecting the piston bodies b1116) using one or more temperature sensors b1524.

In addition, the control system b1500 can monitor various operating parameters associated with components of the electrical system b1300. For instance, the control system b1500 can monitor one or more operating parameters associated with the one or more electric machines b1310 using one or more electric machine sensors b1526. For example, the control system b1500 can monitor the electric current generated or passing through the electric machines b1310 using one or more electric machine sensors b1526, including the amplitude, phase, and/or frequency of the electric current. As another example, the control system b1500 can monitor the voltage at the electric machines b1310 using one or more electric machine sensors b1526, including the amplitude, phase, and/or frequency of the voltage. The control system b1500 can monitor other operating parameters associated with the one or more electric machines b1310 using one or more electric machine sensors b1526, such as e.g., the magnetic field at the electric machines b1310.

Further, the control system b1500 can monitor various operating parameters associated with the one or more energy storage devices b1312 in communication with the one or more electric machines b1310 using one or more energy storage device sensors b1528. In this way, the operating state of the one or more energy storage devices b1312 can be determined. For example, the control system b1500 can monitor the load state of the one or more energy storage devices b1312 using the one or more energy storage device sensors b1528. In some embodiments, the load state of the one or more energy storage devices b1312 is descriptive of at least one of a state of charge and a charge acceptance rate of the one or more energy storage devices b1312 in communication with the one or more electric machines b1310. In some embodiments, the load state of the one or more energy storage devices b1312 is descriptive of both the state of charge and the charge acceptance rate of the one or more energy storage devices b1312. In monitoring the load state of the energy storage devices b1312, the control system b1500 can advantageously control the closed cycle engine b1110 and the one or more electric machines b1310 to meet the charging needs of the one or more energy storage devices b1312.

The state of charge is indicative of the available capacity of the one or more energy storage devices b1312. The state of charge can be expressed as a percentage of the rated capacity of the one or more energy storage devices b1312, e.g., 0-100% with 0% being empty and 100% being full or no available capacity. The state of charge of the one or more energy storage devices b1312 can be determined in any suitable manner, e.g., by a voltage method, coulomb counting method, Kalman filter method, etc. The charge acceptance rate of the one or more energy storage devices b1312 is indicative of the ability of the energy storage devices b1312 to accept and store energy under given conditions, such as e.g., temperature, state of charge, charging rate, charging method, and/or health of the energy storage devices b1312. The charge acceptance rate can be determined in any suitable manner.

The control system b1500 includes one or more controllers b1510. For instance, the control system b1500 can include one or more controllers b1510 that function as the main or primary control devices of the power generation system b1000. The control system b1500 can include other controllers b1510 as well. As shown best in FIG. 14, the controllers b1510 can include one or more processor(s) b1512 and associated memory device(s) b1514 configured to perform a variety of computer-implemented functions and/or instructions (e.g., performing the methods, steps, calculations and the like and storing relevant data as disclosed herein). The instructions, when executed by the one or more processors, can cause the one or more processors to perform operations, including providing control commands b1532 to various controllable devices b1534 of the power generation system b1000.

Additionally, the controllers b1510 can also include a communications module b1516 to facilitate communications between the controllers b1510 and various components of the power generation system b1000. Further, the communications module b1516 can include a sensor interface b1518 (e.g., one or more analog-to-digital converters) to permit signals transmitted from one or more sensors to be converted into signals that can be understood and processed by the one or more processors. It should be appreciated that the sensors can be communicatively coupled to the communications module b1516 using any suitable means. For example, the sensors can be coupled to the sensor interface b1518 via a wired connection. However, in other embodiments, the sensors may be coupled to the sensor interface b1518 via a wireless connection, such as by using any suitable wireless communications protocol. As such, the processor(s) b1512 can be configured to receive one or more signals from the sensors.

As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors can also be configured to compute advanced control algorithms. Additionally, the memory device(s) b1514 can generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) b1514 can generally be configured to store suitable computer-readable instructions that, when implemented by the processor(s) b1512, configure the controllers b1510 to perform the various functions described herein.

The control system b1500 also includes one or more controllable devices b1534. The controllable devices b1534 are communicatively coupled with the one or more controllers b1510, e.g., as shown in FIGS. 13 and 14. The controllable devices b1534 of the power generation system b1000 include any device communicatively coupled with the one or more controllers b1510 that, when commanded by the one or more controllers b1510, can cause a change in output of the power generation system b1000. As one example, the one or more controllers b1510 can control the one or more controllable devices b1534 to cause a change in the temperature differential ΔT between the hot side b1112 and the cold side b1114 of the closed cycle engine b1110. By changing the temperature differential ΔT between the hot side b1112 and the cold side b1114, the work output of the closed cycle engine b1110 can be changed, which can ultimately change the amount of electrical power generated by the one or more electric machines b1310 operatively coupled with the one or more piston assemblies b1120 of the closed cycle engine b1110. To cause a change in the temperature differential ΔT between the hot side b1112 and the cold side b1114, one or more controllers b1510 can command the one or more controllable devices b1534 to apply more or less heat to the hot side b1112 of the closed cycle engine b1110, remove more or less heat from the cold side b1114 of the closed cycle engine b1110, or some combination thereof. As yet another example, the one or more controllers b1510 can control the one or more control devices to cause the load on the one or more electric machines b1310 to change, which causes a change in the amount of electrical power generated by the one or more electric machines b1310.

One example controllable device b1534 includes a charge controller b1318 in communication with the one or more electric machines b1310 and the one or more energy storage devices b1312, e.g., as shown in FIG. 13. The charge controller b1318 are operatively configured to control or regulate the electrical power flowing between the one or more electric machines b1310 and the one or more energy storage devices b1312. The charge controller b1318 can allow all, some, or none of the electrical power generated by the one or more electric machines b1310 to flow to the one or more energy storage devices b1312. For instance, the charge controller b1318 can some of the electrical power to an electrical braking system b1320. The electrical braking system b1320 can include one or more resistor banks for dissipating the electrical power. In this way, the charge controller b1318 can control the flow of electrical power to the one or more energy storage devices b1312, e.g., to prevent overcharging of the one or more energy storage devices b1312.

Another example controllable device b1534 includes a mechanical braking system b1400 in communication with the one or more electric machines b1310, e.g., as shown in FIG. 13. The mechanical braking system b1400 is operatively configured to mechanically apply a counter torque or load on the one or more electric machines b1310 to change the electrical power output of the one or more electric machines b1310 and/or the movement of the piston assemblies b1120. For instance, the one or more controllers b1510 can command the mechanical braking system b1400 to apply a load on the one or more electric machines b1310 to synchronize one or more of the amplitude, phase, and frequency of the electric machine b1310 with one or more of the amplitude, phase, and frequency of the piston assemblies b1120 moving within their respective piston bodies b1116.

Figure 27:
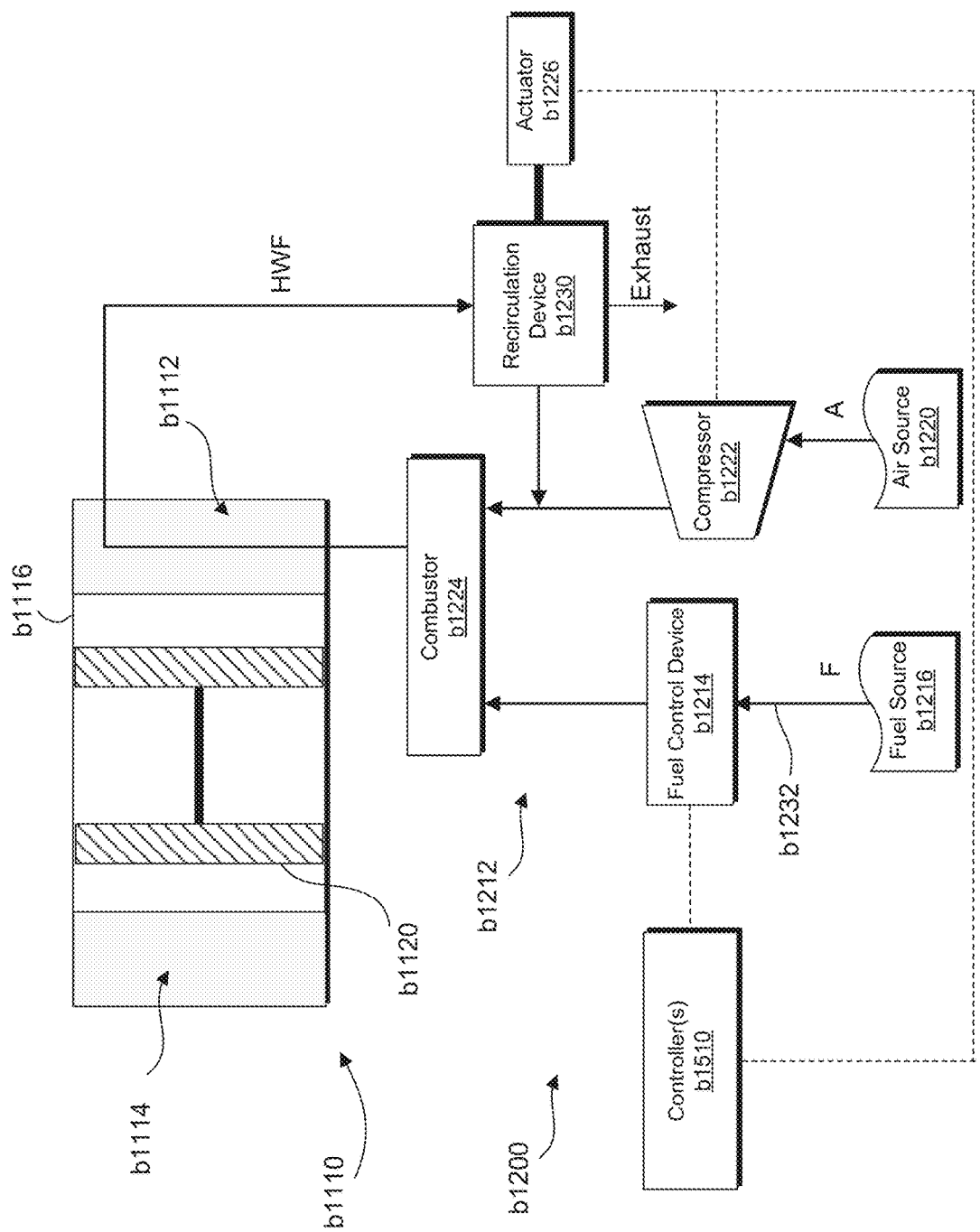
FIG. 27 provides a schematic view of an example heater loop of the balance of plant of the power generation system of FIGS. 12 and 13.

Another example controllable device b1534 can be any of the controllable devices b1534 associated with the heater loop b1210. For instance, one controllable device can include a fuel control device b1214 positioned along an intake line b1232 of the heater loop b1210, e.g., as shown in FIG. 27. The one or more controllers b1510 can command the fuel control device b1214 to allow a desired flow rate of fuel to flow to a combustor b1224 positioned along the heater loop b1210 (e.g., as described herein). Changing the amount of fuel provided to the combustor b1224 can change the heat input to the hot side b1112 of the closed cycle engine b1110, which consequently changes the temperature differential ΔT and thus the work output of the closed cycle engine b1110. Yet another example controllable device b1534 includes a compressor b1222 of the heater loop b1210. The compressor b1222 is operatively configured to compress or pressurize air flowing from an air source b1220 to the combustor b1224. The one or more controllers b1510 can control the compressor speed, e.g., by one or more control commands b1532, and thus can control the air/fuel mixture entering or at the combustor b1224. By changing the air/fuel mixture entering the combustor b1224, the heat input to the hot side b1112 of the closed cycle engine b1110 can be changed. As noted above, changing the heat input to the hot side b1112 can change the temperature differential ΔT between the hot side b1112 and the cold side b1114, which ultimately changes the work output of the closed cycle engine b1110.

Another example controllable device b1534 can be any of the controllable devices b1534 associated with the chiller loop b1212. For instance, the one or more controllable devices b1534 can include a compressor and/or pump positioned along the chiller loop b1212. The one or more controllers b1510 can control the speed of the compressor and/or pump and thus the amount of heat removed or extracted from the cold side b1114 of the closed cycle engine b1110. By removing less heat from the cold side b1114 of the engine, the temperature differential ΔT between the hot and cold side b1114 of the engine is changed, and consequently, the work output of the engine is also changed. Further, a braking system or the like can be used to change the counter torque or load on the one or more electric machines b1310 operatively coupled with one or more components of the chiller loop b1212, such as e.g., an expansion device.

To summarize, as shown best in FIG. 14, the one or more controllers b1510 can receive, from the one or more sensors, data b1530 indicative of one or more operating parameters associated with at least one of the closed cycle engine b1110 and the one or more electric machines b1310. For instance, data b1530 can be received from the piston movement sensors b1520, the pressure sensors b1522, the temperature sensors b1524, the electric machine sensors b1526, etc. The data b1530 can be indicative of operating parameters associated with one or both of the closed cycle engine b1110 and the electric machines b1310. For instance, the data b1530 can be indicative of one or more piston movement characteristics, the pressure within the closed cycle engine b1110 at various positions or stations, the temperature within the closed cycle engine b1110 at various positions or stations, the electric current generated or passing through the electric machines b1310, the voltage at the electric machines b1310 using one or more electric machine sensors b1526, the magnetic field at the electric machines b1310, etc. Additionally, in some embodiments, the one or more controllers b1510 can receive, from the one or more sensors, data b1530 indicative of one or more operating parameters associated with the one or more electrical devices in communication with the electric machines b1310, such as energy storage devices b1312. The operating parameters associated with the electrical devices can be indicative of the load state of such devices, for example.

Based on the received data b1530, the one or more controllers b1510 can control the power generation system b1000 in accordance with various control schemes. During normal operation, for example, the control system b1500 can monitor various operating parameters and can determine control commands b1532 to drive the operating parameters to an operating setpoint or target value. The control commands b1532 can then be provided to controllable device b1534(s). The controllable device b1534(s) can then perform control actions to execute the control commands b1532. When the controllable devices b1534 execute the control commands b1532, an output of the power generation is changed. For example, in performing the control action, the controllable device b1534 can cause a change to the amount of work done on the piston by the working fluid within the piston body b1116 and/or the amount of work done by the piston on the working fluid within the piston body b1116 (e.g., depending on whether the working fluid is expanding or contracting). By changing the work done by or on the piston, the piston speed of the piston assembly b1120 is changed, which changes the electrical power output of the electric machines b1310. Accordingly, the output of the power generation system b1000 is changed.

In addition, in the event the one or more of the piston assemblies b1120 are out of sync with their associated electric machines b1310 with respect to amplitude, phase, and/or frequency during charging of the energy storage devices b1312, the one or more controllers b1510 can provide a control command to one or more of the controllable devices b1534 to cause an adjustment to at least one of the electric machine b1310 and its associated piston assembly b1120 such that the electric machine b1310 and its associated piston assembly b1120 are synchronized in amplitude, phase, and frequency. Further, the control system b1500 can monitor for and prevent failure modes. In addition, as will be explained below, data b1530 can be received to initialize the power generation system b1000.

Chapter 5.1.3—Power Generation System Modes of Operation

Figure 15:
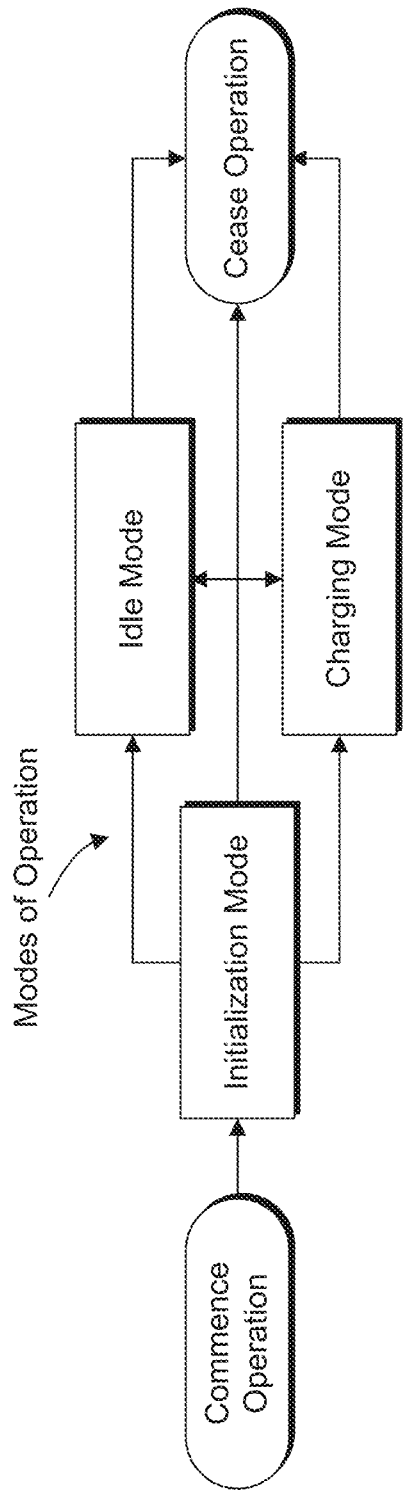
FIG. 15 provides a block diagram depicting various modes of operation of the power generation system of FIGS. 12 and 13.
Figure 16:
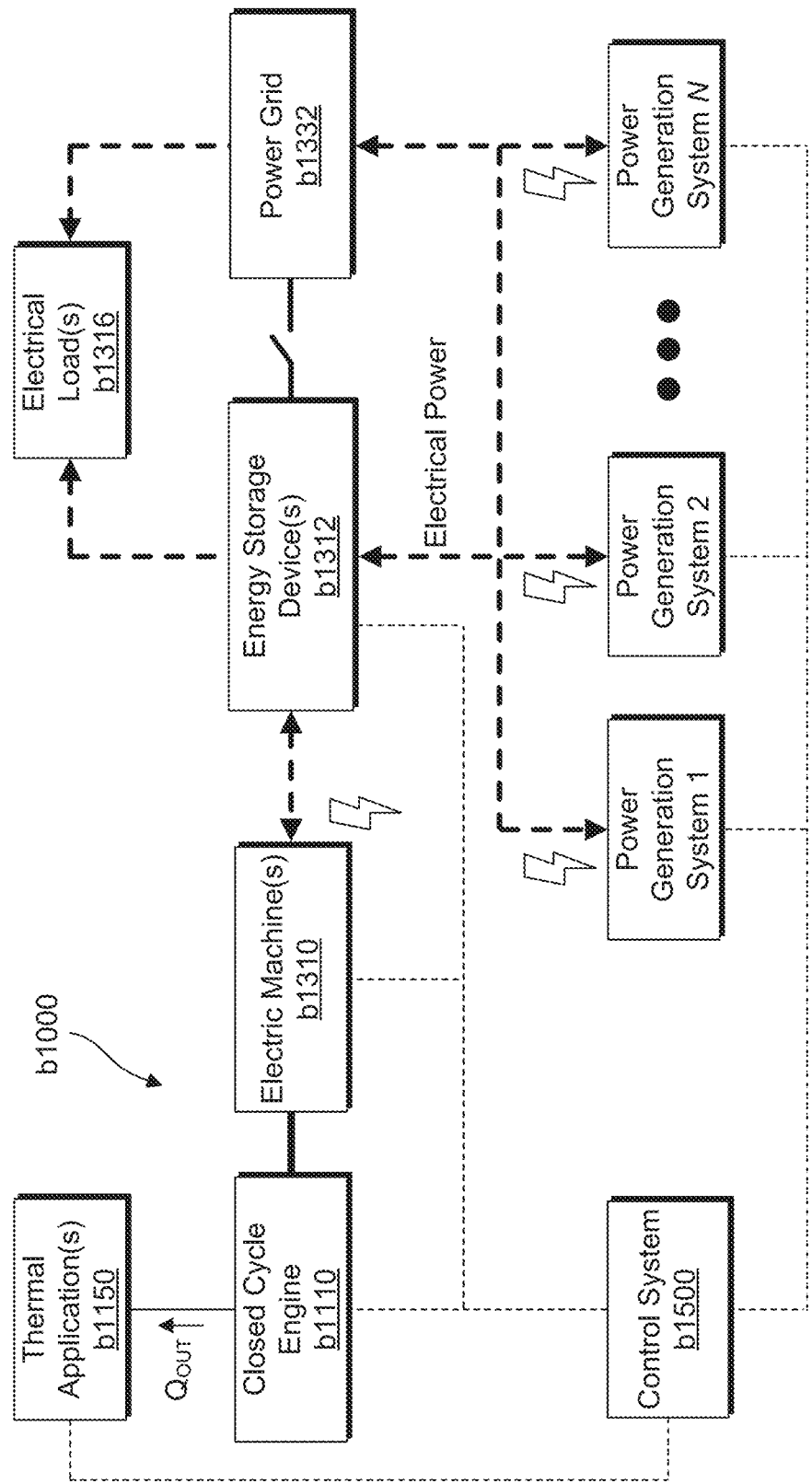
FIG. 16 provides a power generation that includes the power generation system of FIG. 13 as one of a plurality of power generation systems operable to provide electrical power to one or more energy storage devices.

An example manner in which the power generation system b1000 can be operated will now be provided. FIG. 15 provides a block diagram depicting various modes of operation of the power generation system b1000 of FIGS. 12 and 13. As shown in FIG. 15, to commence operation, the power generation system b1000 can be operated in an initialization mode in which the closed cycle engine b1110 and its associated balance of plant b1200 is started up, e.g., from a non-operational state. Once the system is initialized, the power generation system b1000 can be operated in a normal mode, including an idle mode or a charging mode. In the idle mode, the piston assemblies b1120 move within their respective piston bodies b1116 between the hot side b1112 and the cold side b1114 under their own thermal power (e.g., without need for the electric machines b1310 to motor the piston assemblies b1120) and without or with a negligible load applied to the one or more electric machines b1310. As shown in FIG. 15, the power generation system b1000 can transition from the initialization mode to the idle mode. In the charging mode, the piston assemblies b1120 are moved within their respective piston bodies b1116 and a load is applied to the one or more electric machines b1310 operatively coupled with the piston assemblies b1120 of the closed cycle engine b1110, wherein the applied load is more than a negligible load. For instance, the load can be the one or more energy storage devices b1312. In the normal mode, the power generation system b1000 can transition between the idle mode and the charging mode. As one example, the power generation system b1000 can transition from the idle mode to the charging mode automatically based at least in part on a load state of the one or more energy storage devices b1312 or some other trigger criteria. Additionally or alternatively, the power generation system b1000 can be manually transitioned between operating modes, e.g., by a user input. When operation is no longer desired and/or required, operation of the power generation system b1000 can be ceased. To cease operation, as one example, the one or more controllers b1510 can cause the heat source to cease applying heat to the hot side b1112 of the closed cycle engine b1110 and/or cause one or more components to cease removing heat from or cooling the cold side b1114 of the engine. Eventually, the pistons b1122, b1124 will cease moving within their respective piston bodies b1116.

Chapter 5.1.5—Power Generation System Normal Operation

Once the power generation system b1000 is initialized, the system can operate in a normal mode. That is, the power generation system b1000 can be operated in the idle mode or the charging mode, e.g., as shown in FIG. 15. As noted above, in the charging mode, the piston assemblies b1120 are moved under their own thermal power (e.g., without need for the electric machines b1310 to motor the piston assemblies b1120) and an electrical load is applied to the one or more electric machines b1310 operatively coupled with the piston assemblies b1120 of the closed cycle engine b1110. In the idle mode, the piston assemblies b1120 are moved under their own thermal power but without or with a negligible electrical load applied on the electric machines b1310.

Figure 17:
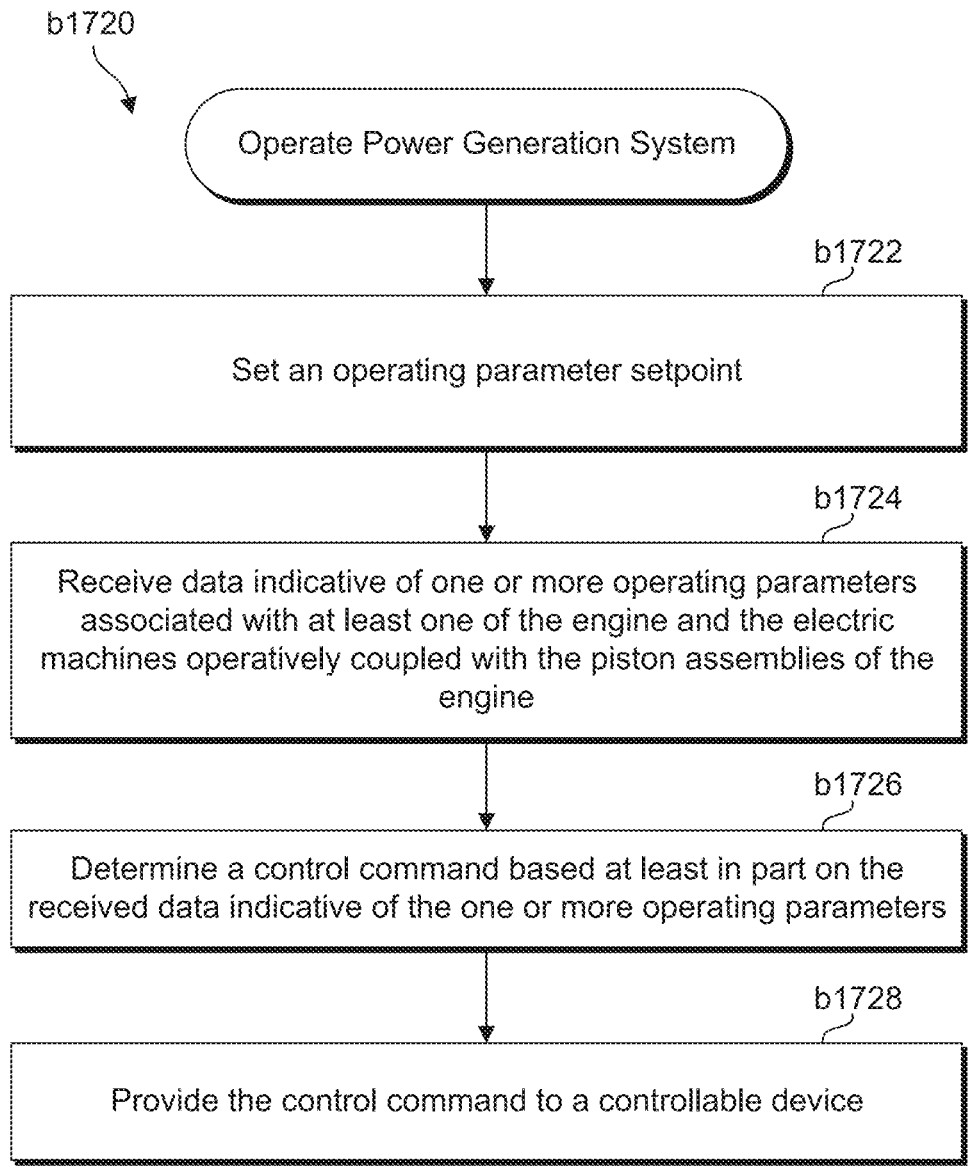
FIG. 17 provides a flow diagram depicting an example method of controlling the power generation system of FIGS. 12 and 13 in a normal mode.

An example manner in which the power generation system b1000 can be controlled in the normal mode will now be provided. FIG. 17 provides a flow diagram depicting an example method (b1720) of controlling the power generation system b1000 of FIGS. 12 and 13 in normal mode. Some or all of the method (b1720) can be implemented by the control system b1500 described herein. In addition, it will be appreciated that exemplary method (b1720) can be modified, adapted, expanded, rearranged and/or omitted in various ways without deviating from the scope of the present subject matter.

At (b1722), the method (b1700) includes setting an operating parameter setpoint. For instance, the one or more controllers b1510 can set the operating parameter setpoint. The operating parameter setpoint is indicative of a desired or target value of some variable operating parameter of the power generation system b1000. In some embodiments, for instance, the operating parameter setpoint can be indicative of an operating parameter associated with the electric machines b1310 operatively coupled with the closed cycle engine b1110. For example, the operating parameter setpoint can be indicative of a target electrical current generated by or at the electric machines b1310. As another example, the operating parameter setpoint can be indicative of a target voltage at the electric machines b1310. In other embodiments, the operating parameter setpoint can be indicative of an operating parameter associated with the closed cycle engine b1110. For example, the operating parameter setpoint can be indicative of a target pressure at some station or position within or fluidly connected with one of the piston bodies b1116. As another example, the operating parameter setpoint can be indicative of a target temperature at some station or position within or fluidly connected with one of the piston bodies b1116. In still other embodiments, the operating parameter setpoint can be indicative of an operating parameter associated with the movement of one or more of the piston assemblies b1120 of the closed cycle engine b1110. For example, the operating parameter setpoint can be indicative of a target speed of one or more of the piston assemblies b1120 of the closed cycle engine b1110. As another example, the operating parameter setpoint can be indicative of a target amplitude of one or more of the piston assemblies b1120 of the closed cycle engine b1110.

The operating parameter setpoint can be set by the one or more controllers b1510 based at least in part on a selected control scheme. The control scheme can be selected from one of a plurality of control schemes. As one example, in some embodiments, the power generation system b1000 can be controlled in accordance with an efficiency control scheme. Utilizing the efficiency control scheme, the power generation system b1000 can be controlled in such a way that the efficiency of the overall power generation system b1000 is optimized. In such embodiments, the operating parameter setpoint can be set as an objection function that seeks to maximize the efficiency of the power generation system b1000. As another example, in some embodiments, the power generation system b1000 can be controlled in accordance with a cost control scheme. Utilizing the cost control scheme, the power generation system b1000 can be controlled in such a way that the cost of operating the overall power generation system b1000 is optimized. In such embodiments, the operating parameter setpoint can be set as an objection function that seeks to minimize the cost of operating the power generation system b1000. As a further example, in some other embodiments, the power generation system b1000 can be controlled in accordance with a cost to power ratio control scheme. Utilizing the cost to power ratio control scheme, the power generation system b1000 can be controlled in such a way that the cost to power ratio is minimized during operation. In such embodiments, the operating parameter setpoint can be set as an objection function that seeks to minimize the cost to power ratio of operating the power generation system b1000.

As yet another example, in some embodiments, the power generation system b1000 can be controlled in accordance with a power output control scheme. Utilizing the power output control scheme, the power generation system b1000 can be controlled in such a way that a set amount of electrical power is generated by the electric machines b1310 of the system. In such embodiments, the operating parameter setpoint can be set as a target electrical power output of the system. In some embodiments, to achieve a particular electrical power output from the electric machines b1310, the operating parameter setpoint can be set as a target piston movement characteristic, such as e.g., the amplitude, speed (i.e., the amplitude of the piston at constant frequency), frequency, etc. The speed of the piston can be the max linear piston speed, for example. Advantageously, as will be explained further below, in some embodiments the operating parameter setpoint can be set as a target piston speed that corresponds to or is associated with a desired or target electrical power output of the electric machines b1310. By setting the operating parameter setpoint as a target piston speed, a one-to-one relationship can be maintained between the piston speed and the electrical power output of the electric machine b1310. Based on the piston speed set point, the fuel input required to heat the hot side b1112 of the closed cycle engine b1110 to achieve the set piston speed can be determined.

Figure 18:
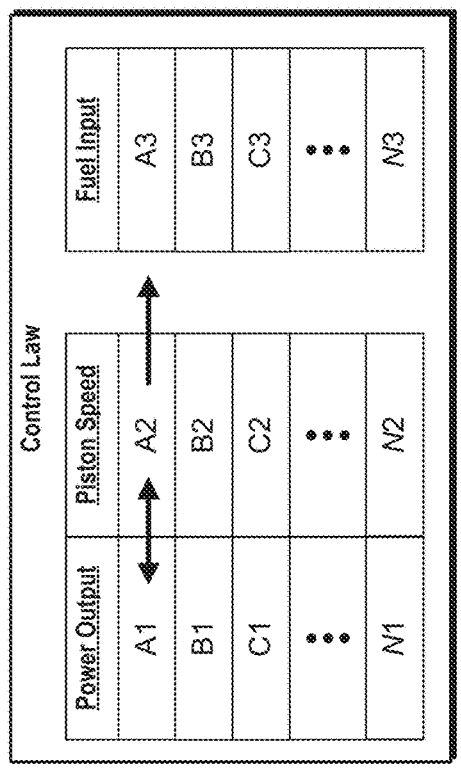
FIG. 18 provides a table of an example control law that associates piston speeds of the piston assembly with power outputs of the electric machines as well as fuel inputs to a combustor for heating a hot side of the closed cycle engine.

For instance, FIG. 18 provides a table of an example control law. The control law can be stored in one or more of the memory devices of the one or more controllers b1510, for example. The control law can be accessed by the one or more processors. As shown, the control law associates or corresponds various piston speeds with electrical power outputs of the electric machines b1310. Then, as noted above, the fuel input (i.e., an amount of fuel to input into the combustor b1224 for combustion) can be determined. Notably, the piston speed has a one-to-one relationship with the power output of the electric machines b1310. For instance, as depicted in FIG. 18, a piston speed A2 is associated with a power output A1 in a one-to-one relationship. The piston speeds B2, C2, and so on to N2 are associated with their respective power outputs B1, C1, and N1 in one-to-one relationships as well. Based on the selected piston speed and/or power output, the fuel input is determined to achieve the desired piston speed and/or power output.

Further, in some example embodiments, the operating parameter setpoint can be varied by the one or more controllers b1510 during operation of the power generation system b1000. For instance, in some embodiments, the operating parameter setpoint can be automatically varied based at least in part on the load state of the one or more energy storage devices b1312 in communication with the one or more electric machines b1310. The one or more controllers b1510 can receive data b1530 from one or more sensors associated with the one or more energy storage devices b1312. Based at least in part on the received data b1530, the one or more controllers b1510 can then determine the load state of the one or more energy storage devices b1312 in communication with the electric machines b1310. As noted previously, the load state can be descriptive of a state of charge or charge capacity of the one or more energy storage devices b1312. In some implementations, the operating parameter setpoint can be varied based at least in part on the state of charge or charge capacity of the one or more energy storage devices b1312.

Figure 19:
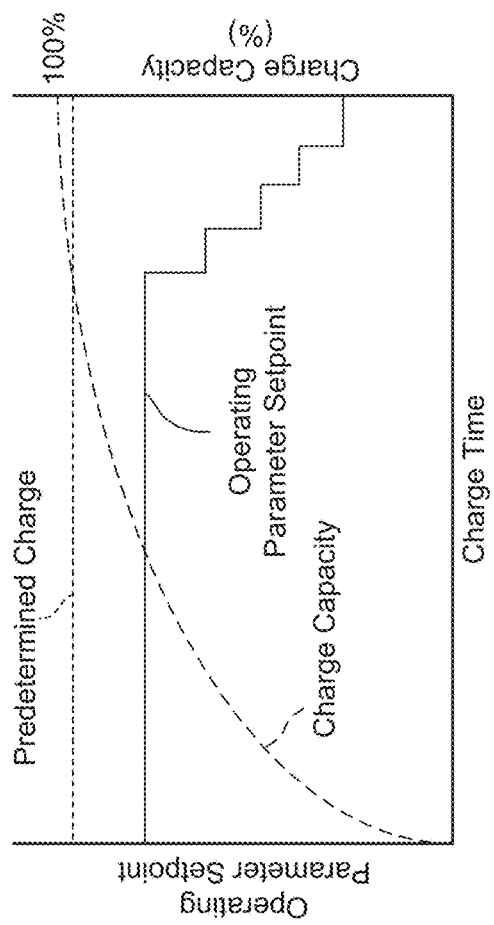
FIG. 19 provides a graph depicting an operating parameter setpoint as well as a charge capacity of the one or more energy storage devices as a function of charge time.

By way of example, FIG. 19 provides a graph depicting an operating parameter setpoint as well as a charge capacity of the one or more energy storage devices b1312 as a function of charge time. As shown, when the charge capacity or state of charge of the one or more energy storage devices b1312 reaches a predetermined charge or predetermined percentage of full charge, the operating parameter setpoint can be varied, e.g., decreased. For instance, in embodiments in which the operating parameter setpoint is indicative of a target piston speed, when the charge capacity of the one or more energy storage devices b1312 reaches the predetermined charge, the operating parameter setpoint of the piston speed can be decreased. In this way, the closed cycle engine b1110 will ultimately produce less useful work, and consequently, the electric machines b1310 operatively coupled thereto will generate less electrical power. Accordingly, the electric machines b1310 can charge the energy storage devices b1312 at a slower charge rate, e.g., to top off or trickle charge the one or more energy storage devices b1312. Moreover, as further shown in FIG. 19, the operating parameter setpoint can be varied multiple times over the charge time, e.g., when the charge capacity of the one or more energy storage devices b1312 reaches a given predetermined charge. Particularly, when the charge capacity of the one or more energy storage devices b1312 reaches a given predetermined charge, the operating parameter setpoint can be varied in a step-like manner as shown in FIG. 19. In some embodiments, the operating parameter setpoint can be varied in a gradual or ramp-like manner.

Figure 20:
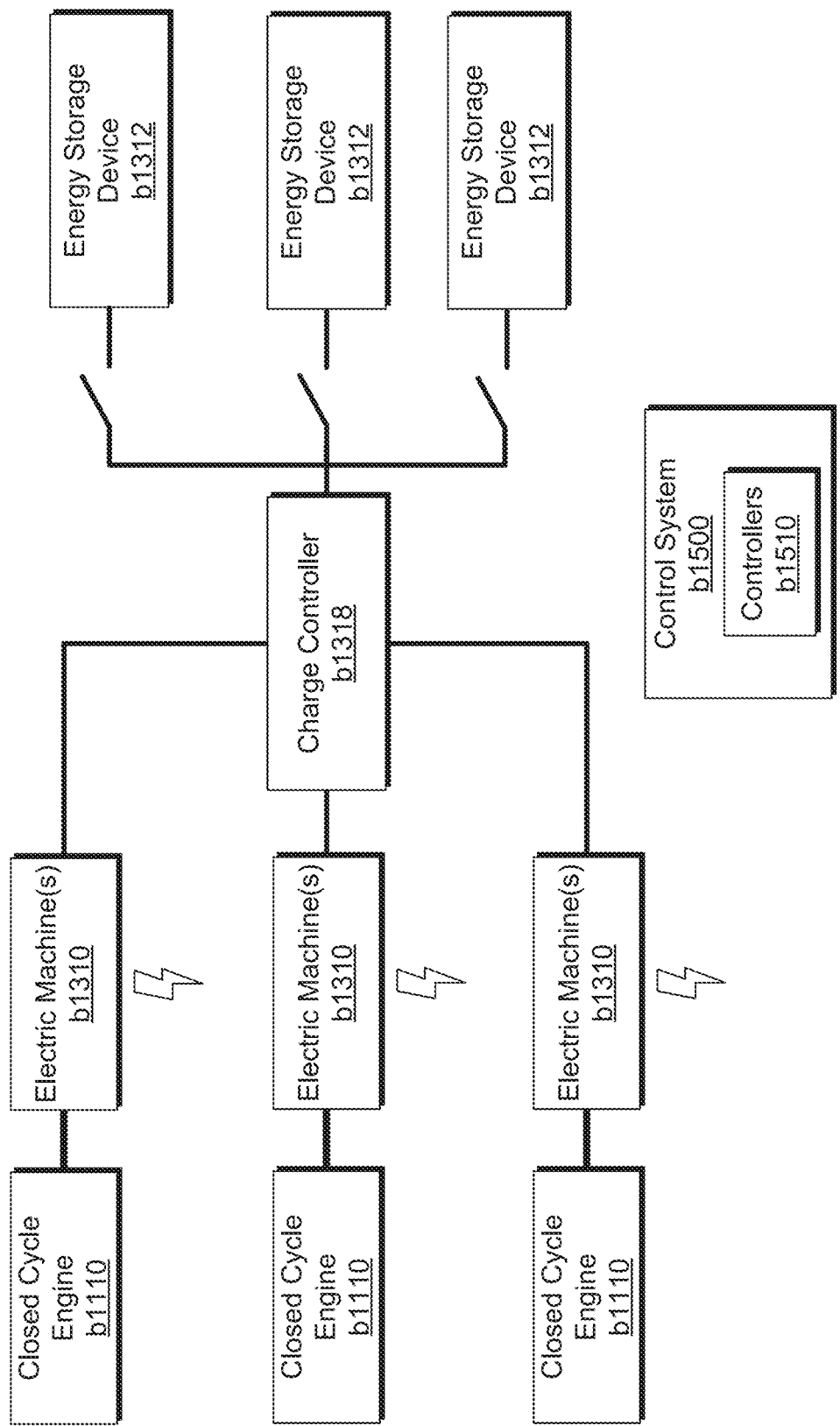
FIG. 20 provides a schematic view of a power generation system that includes a plurality of closed cycle engines each having one or more associated electric machines according to an example aspect of the present disclosure.

In some embodiments, the closed cycle engine b1110 and its associated electric machines b1310 are one of a plurality of closed cycle engines and electric machines b1310 of a power generation system b1000. For instance, FIG. 20 provides a schematic view of a power generation system b1000 that includes a plurality of closed cycle engines each having one or more associated electric machines b1310. Each of the electric machines b1310 of the system are in communication with a charge controller b1318. A plurality of energy storage devices b1312 are in communication with the charge controller b1318 as shown. A switching device can be positioned between the energy storage devices b1312 and the charge controller b1318. Moreover, each closed cycle engine b1110, electric machine b1310, and energy storage devices b1312 are communicatively coupled with the one or more controllers b1510 of the control system b1500. In such embodiments, instead of varying the operating parameter setpoint of a particular engine, the one or more controllers b1510 can control the engines, e.g., to on and off positions. In this way, when the charge capacity of the energy storage devices b1312 reach a predetermined charge (e.g., as shown in FIG. 19), the one or more controllers b1510 can cause one or more of the closed cycle engines b1110 to turn off. Moreover, in embodiments where one or more energy storage devices b1312 come on line or require electrical power, the one or more controllers b1510 can cause one or more of the closed cycle engines to turn on. In addition, as noted herein, some closed cycle engine b1110 configurations can include piston assemblies b1120 that are movable independently of one another. In such embodiments, the one or more controllers b1510 can cause one or more of the piston assemblies b1120 to cease movement or startup based at least in part on the charge capacity of the one or more energy storage devices b1312.

Further, the one or more controllers b1510 can activate the one or more switching devices, e.g., for better maintaining the health of the energy storage devices b1312. For instance, the one or more controllers b1510 can activate a switching device to an open position based at least in part on a sensed temperature of the energy storage device. In this way, the one or more controllers b1510 can prevent the energy storage devices b1312 from overheating, among other benefits.

Figure 21:
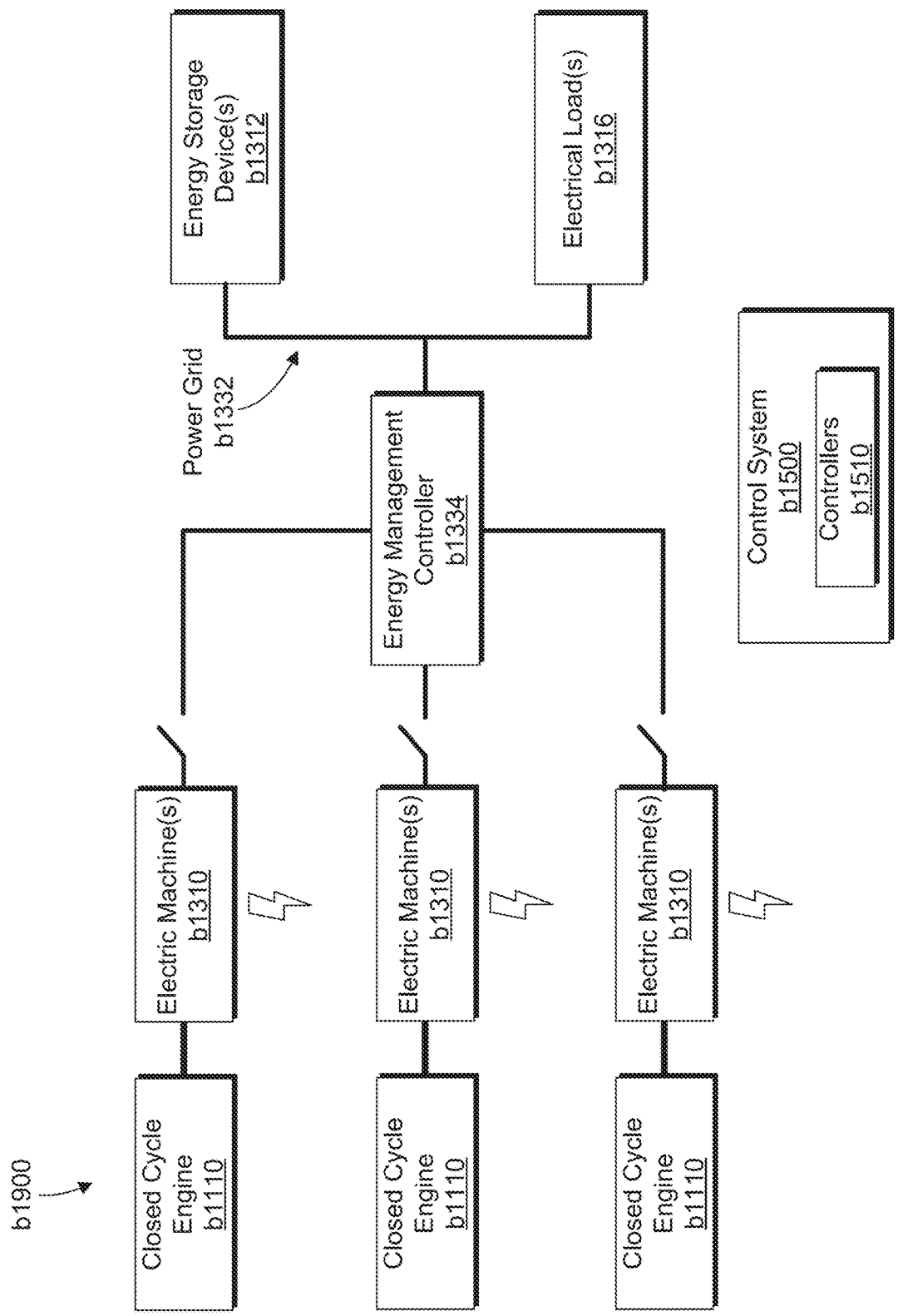
FIG. 21 provides a schematic view of a distributed power generation network that includes a plurality of closed cycle engines each having one or more associated electric machines according to an example aspect of the present disclosure.

FIG. 21 provides a schematic view of a distributed power generation network that includes a plurality of closed cycle engines each having one or more associated electric machines according to an example aspect of the present disclosure. For this embodiment, the closed cycle engine b1110 and its associated electric machines b1310 are one of a plurality of closed cycle engines b1110 and electric machines b1310 of a distributed power generation network b1900. For instance, FIG. 21 provides a schematic view of a distributed power generation network b1900 that includes a plurality of closed cycle engines each having one or more associated electric machines b1310. Each of the electric machines b1310 of the system are in communication with an energy management controller b1334. A switching device can be positioned between each electric machine b1310 and the energy management controller b1334. A power grid b1332 provides communication between the energy management controller b1334 and one or more energy storage devices b1312 and one or more electrical loads b1316. In such embodiments, instead of varying the operating parameter setpoint of a particular engine to control the electrical power output of the distributed network b1900, the one or more controllers b1510 can control the engines b1110, e.g., to on and off positions. In this way, when the charge capacity of the energy storage devices b1312 reach a predetermined charge (e.g., as shown in FIG. 19), the one or more controllers b1510 can cause one or more of the closed cycle engines b1110 to turn off and/or the switching device can be selectively controlled to control the electrical power to the power grid b1332 and ultimately to the energy storage devices b1312 and electrical loads b1316. Moreover, in embodiments where one or more energy storage devices b1312 and/or electrical loads b1316 come on line or demand additional electrical power, the one or more controllers b1510 can cause one or more of the closed cycle engines b1110 to turn on and/or cause the switching devices to close the circuit to allow electrical power to flow from a given electric machine b1310 to the power grid b1332.

In yet other embodiments, the operating parameter setpoint can be varied by the one or more controllers b1510 based at least in part on an anticipated load change on the electric machines b1310. The anticipated load change can be determined by the one or more controllers b1510 based at least in part on the received load state of electrical device(s) in communication with the electric machines b1310, such as energy storage devices b1312, the power grid b1332, electrical loads b1316, etc. For instance, the load state data b1530 can be indicative of an anticipated change in electrical power demanded by the electrical device(s) on the electric machine(s) b1310 and an anticipated time at which the anticipated change in electrical power demanded by the electrical device on the electric machine is to occur. Thus, the magnitude and timing of the load change can be considered by the one or more controllers b1510 and the operating parameter set point can be varied accordingly. In some embodiments, the load state data includes a runtime indicator indicative of a time period or time at which one or more of the electrical devices or elements anticipate coming on line or are scheduled to drop offline. Stated differently, the runtime indicator is indicative of a time period or time at which one or more electrical devices (e.g., electrical loads b1316, energy storage devices b1312, the power grid b1332, etc.) anticipate or are scheduled to receive electrical power from the electric machine b1310. In some embodiments, in addition to the runtime indicator, the load state data includes a power demand schedule indicative of the electrical power demand that each electrical device places on the electric machine(s) b1310 over a given period or runtime. In some embodiments, the power demanded by the electrical devices on the electric machine(s) b1310 are monitored by the one or more controller(s) b1510 so that dynamic load changes can be anticipated. Thus, in some embodiments, the electrical devices are in communication with or communicatively coupled with the one or more controller(s) b1510.

In some embodiments, particularly where there are multiple electrical devices in communication with the electric machine b1310, the load state of the electrical device is indicative of a total anticipated change in electrical power demanded by the plurality of electrical devices on the electric machine for a predetermined time period. For instance, the predetermined time period can be five seconds (5 s). The load state data can be used to anticipate the total anticipated load change over the predetermined time period. Thus, instead of making changes in response to every load change, the system varies the output of the engine and/or electric machine in response to a cumulative anticipated load over the predetermined time period, e.g., (5 seconds). This may, for example, prevent excessive ramping of the closed cycle engine and/or excessive varying of the operating parameter setpoint. Further, in some embodiments, the load state data b1530 can be indicative of the number of electrical devices (e.g., energy storage devices b1312) that are electrically connected with the electric machines b1310 and the electrical power demanded by the electrical devices on the electric machine(s) b1310.

Generally, by anticipating load changes on the electric machine b1310, the output of the closed cycle engine b1110 can more closely balance with the load on the electric machine b1310 when the anticipated load change actually occurs. In this manner, the piston assemblies b1120 are able to better maintain their respective amplitudes during a load change and amplitude spike increases and decreases can be prevented. The operating parameter setpoint can be varied to account for such anticipated loads so as to allow the closed cycle engine b1110 to better maintain steady-state operation despite dynamic load changes on the electric machines b1310.

Figure 22:
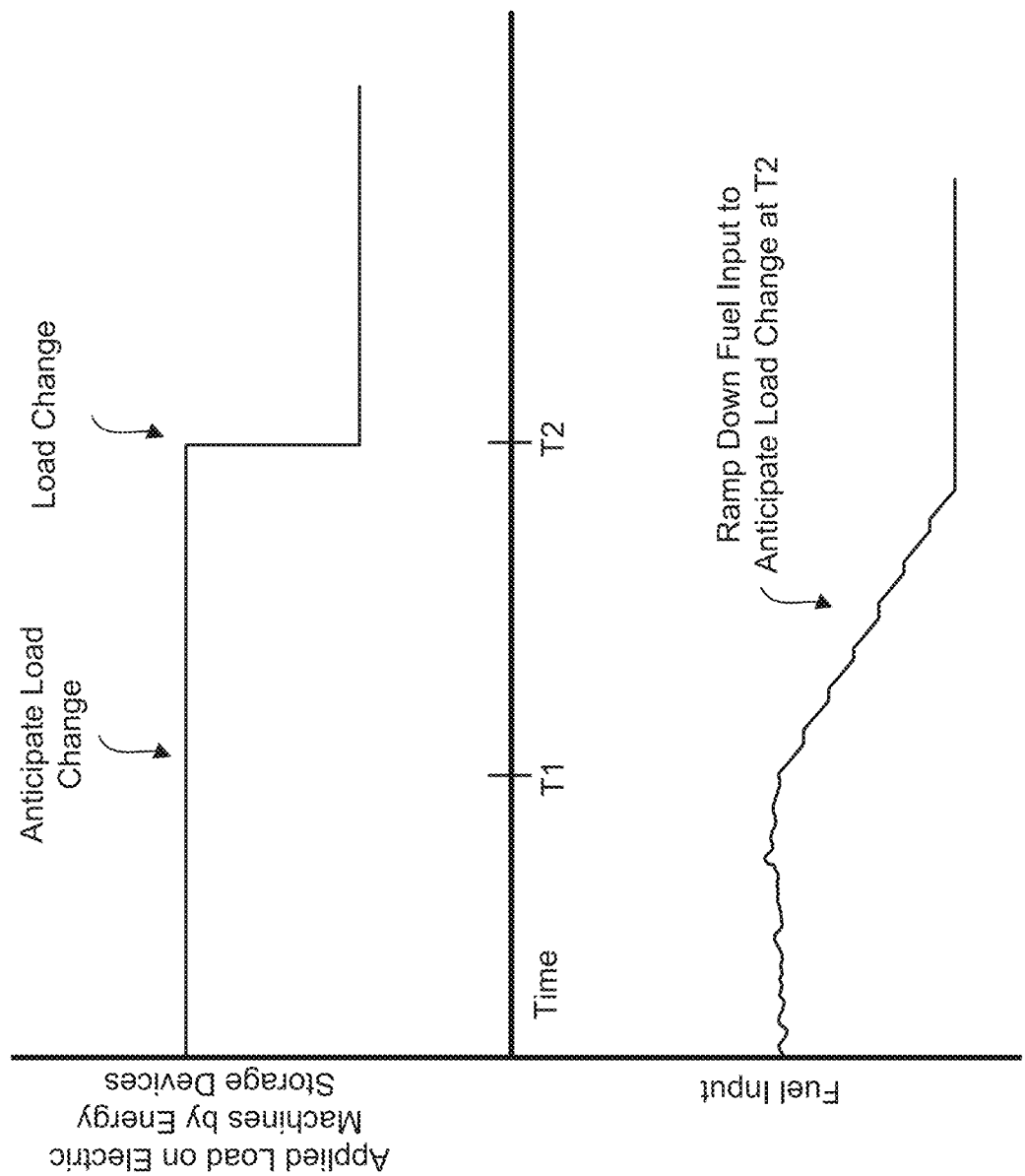
FIG. 22 provides a graph depicting an applied load on the electric machines as a function of time as well as a fuel input to the combustor of a closed cycle engine as a function of time according to an example aspect of the present disclosure.

By way of example, FIG. 22 provides a graph depicting an applied load on the electric machines b1310 as a function of time as well as a fuel input to the combustor b1224 of a closed cycle engine b1110 as a function of time according to an example aspect of the present disclosure. As shown, the applied load on the electric machines b1310 is initially stable during a charging mode. Then, at time T1, the one or more controllers b1510 receive data indicative of one or more operating parameters associated with the energy storage devices b1312 and/or the electric machine b1310. The data can be received by the one or more controllers b1510 from the charge controller b1318 and/or one or more sensors associated with the electric machines b1310 and/or the energy storage devices b1312. The received data can be indicative of a load state of the one or more energy storage devices b1312. Based on the received data, and particularly on the load state of the one or more energy storage devices b1312, the one or more controllers b1510 can determine whether a load change on the one or more electric machines b1310 is anticipated. In this example, the one or more controllers b1510 determine that a load change is in fact anticipated based at least in part on the received data indicative of the load state of the one or more energy storage devices b1312. Thus, at time T1, the one or more controllers b1510 determine that a load change is anticipated. Particularly, the one or more controllers b1510 determined that a load change is anticipated at time T2. The anticipated load change on the electric machines b1310 at time T2 can correspond with one or more energy storage devices b1312 scheduled to go off line (i.e., no longer receive electrical power from the electric machines b1310).

As further shown in FIG. 22, the operating parameter setpoint can be varied to account for the anticipated load change on the electric machines b1310. Specifically, the operating parameter setpoint can be varied in such a way that the fuel input to the combustor b1224 is ramped in anticipation of the load change at time T2. In this example, as the anticipated load change is a load decrease, the operating parameter setpoint is varied in such a way that the fuel input to the combustor b1224 is ramped down. However, as will be appreciated, if the anticipated load change is a load increase, the operating parameter setpoint is varied in such a way that the fuel input to the combustor b1224 is ramped up or increased over time. As depicted in FIG. 22, the one or more controllers b1510 vary the operating parameter setpoint such that the fuel input ramps down and stabilizes at a preselected fuel input known to maintain the amplitude of the pistons b1122, b1124 for the anticipated load change. Advantageously, by ramping the fuel input in anticipation of a load change, the closed cycle engine b1110 may operate more efficiently and better maintain its steady-state operation despite the dynamic drop in electrical load on the electric machines b1310. Furthermore, gradually ramping the closed cycle engine b1110 can reduce vibration of the engine and extend the useful service life of the components of the power generation system b1000, among other benefits.

Figure 23:
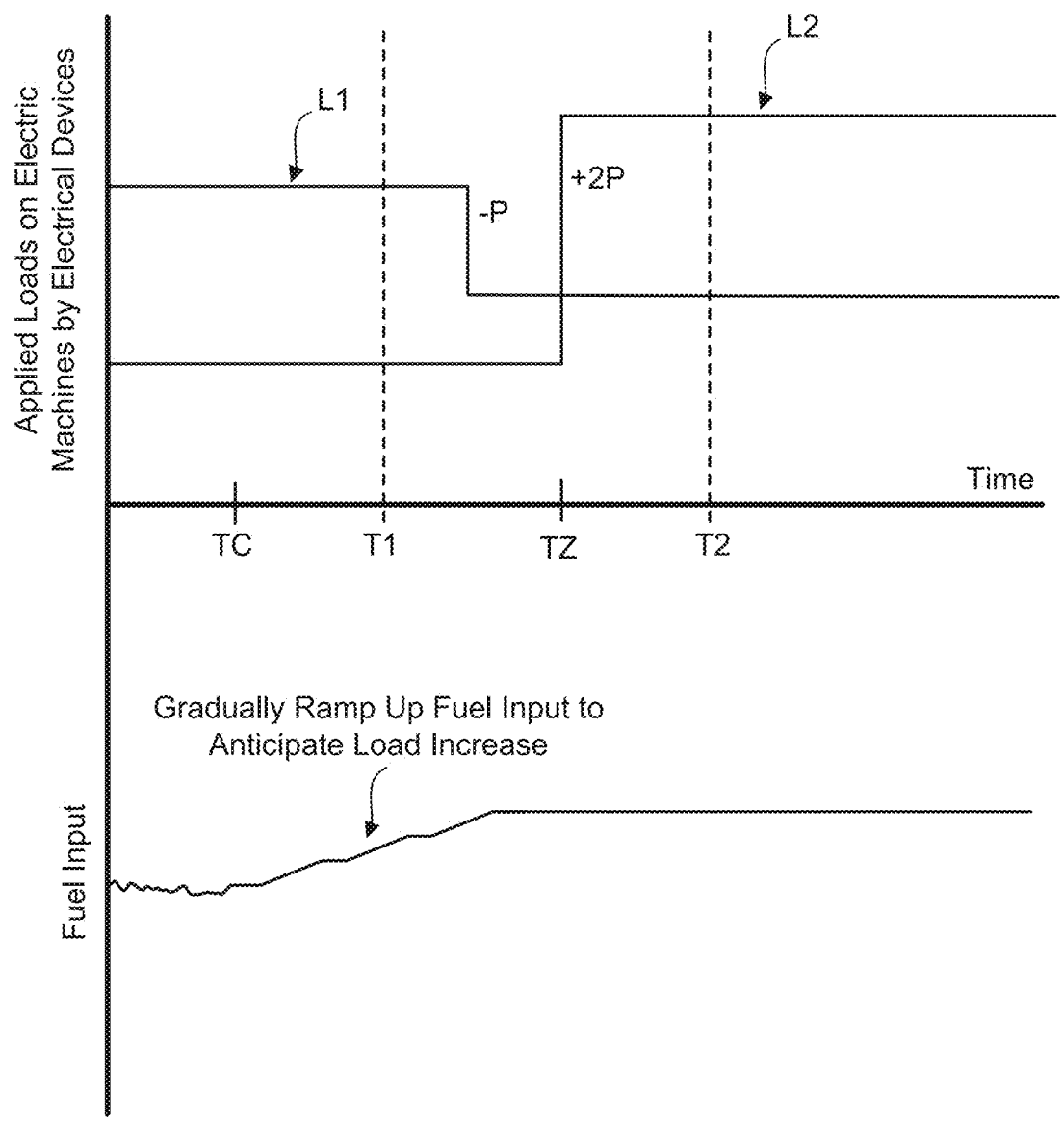
FIG. 23 provides a graph depicting a plurality of applied loads on the electric machines as a function of time as well as a fuel input to the combustor of a closed cycle engine as a function of time according to an example aspect of the present disclosure.

As another example, FIG. 23 provides a graph depicting a plurality of applied loads on the electric machines b1310 as a function of time as well as a fuel input to the combustor b1224 of a closed cycle engine b1110 as a function of time according to an example aspect of the present disclosure. As shown, the applied loads on the electric machines b1310 include a first load L1 and a second load L2, which are both stable or steady state at a current time TC during a charging mode. The first load L1 corresponds to a first electrical device in communication with the electric machines b1310 and the second load L2 corresponds to a second electrical device in communication with the electric machines b1310. At the current time TC, the one or more controllers b1510 can receive data indicative of a load state of the electrical devices in communication with the electric machines b1310. Based on the received data, and particularly on the load state of the electrical devices, the one or more controllers b1510 can determine whether any of the electrical devices in communication with the electric machines b1310 anticipate causing a load change on the one or more electric machines b1310, e.g., by dropping offline, demanding more electric power, or demanding less electrical power. In some embodiments, the load state data is indicative of one or more electrical devices coming on line, or transitioning from not demanding electrical power from the electric machines b1510 to demanding electrical power from the electric machines b1510. By considering the load state of the plurality of electrical devices in communication with the electric machines b1510, for this embodiment, the load state of the electrical devices is indicative of a total anticipated change in electrical power demanded by the plurality of electrical devices on the electric machine. Stated differently, based on the received load state data, the one or more controllers b1510 can determine a total anticipated change in electrical power demanded by the plurality of electrical devices on the electric machine within a predetermined time period occurring in the future with respect to the current time TC. The predetermined future time period can be a rolling time period set ahead from the current time by predetermined anticipation period, for example.

As depicted in FIG. 23, based on the received load state data, the one or more controllers b1510 determine that the first load L1 corresponding to the first electrical device in communication with the electric machines b1310 anticipates decreasing its demanded power on the electric machines b1310 by −P within a predetermined future time period spanning from T1 to T2. Furthermore, based on the received load state data, the one or more controllers b1510 determine that the second load L2 corresponding to the second electrical device in communication with the electric machines b1310 anticipates increasing its demanded power on the electric machines b1310 by +2P within the predetermined future time period spanning from T1 to T2. Accordingly, the one or more controllers b1510 can determine the net or total anticipated load change on the electric machines b1310 within the predetermined future time period, e.g., by summing all of the anticipated load changes. In this example, the one or more controllers b1510 determine the total anticipated load change on the electric machines b1310 within the predetermined future time period is +P (+2P+−P=+P).

Based on the determined total anticipated load change on the electric machines b1310 within the predetermined future time period, the operating parameter setpoint can be varied to account for the total anticipated load change on the electric machines b1310. Specifically, the operating parameter setpoint can be varied in such a way that the fuel input to the combustor b1224 is ramped in anticipation of the total load change within the predetermined future time period. In this example, as the total anticipated load change is a load increase of +P, the operating parameter setpoint is varied in such a way that the fuel input to the combustor b1224 is ramped up or increased over time as shown in FIG. 23. However, as will be appreciated, if the total anticipated load change was a load decrease, the operating parameter setpoint can be varied in such a way that the fuel input to the combustor b1224 is ramped down or decreased over time.

As depicted in FIG. 23, in this example, the one or more controllers b1510 vary the operating parameter setpoint such that the fuel input ramps up and stabilizes at a preselected fuel input known to maintain the amplitude of the pistons b1122, b1124 at a predetermined amplitude range despite the anticipated load change. The fuel input can be ramped up such that the preselected fuel input stabilizes at a time TZ, which corresponds with the timing of when the second load L2 increases by +2P, or more broadly, when the load change on the electric machines b1510 is greatest within the predetermined future time window. Advantageously, by considering the total anticipated load on the electric machines b1310 over a predetermined future time period (e.g., 5 seconds), the closed cycle engine b1110 may operate more efficiently and better maintain its steady-state operation despite the dynamic load changes on the electric machines b1310. Further, excessive ramping of the closed cycle engine and/or excessive varying of the operating parameter setpoint can be prevented. For instance, instead of ramping down the fuel input in anticipation of the first load L1 decreasing by −P, the fuel input is ramped up to account for the cumulative anticipated load change occurring within the predetermined future time period, which is anticipated as a load increase due to the second load L2 scheduled or anticipated to increase by +2P. Thus, by ramping the closed cycle engine based on the total anticipated load change within a predetermined future time period, the closed cycle engine and its associated balance of plant may achieve greater overall efficiency and the service lives of the various components of the system may be increased.

At (b1724), returning to FIG. 17, the method (b1720) includes receiving, from the one or more sensors, data indicative of one or more operating parameters associated with at least one of the closed cycle engine b1110 and the one or more electric machines b1310. For instance, the one or more controllers b1510 can receive data from the one or more of the sensors, e.g., as shown in FIG. 14. In some embodiments, as noted above, the one or more controllers b1510 can also receive data indicative of a load state of the one or more energy storage devices b1312 in communication with the electric machines b1310. The one or more controllers b1510 can receive the sensor data from the sensors continuously, at a predetermined interval, and/or upon request.

As one example, the one or more controllers b1510 can receive, from the one or more piston sensors, data indicative of one or more piston movement characteristics. As noted previously, example piston movement characteristics can include piston position, speed, amplitude, frequency, and/or phase. Data indicative of the one or more piston movement characteristics can be received for one, some, or all of the piston assemblies b1120. As another example, the one or more controllers b1510 can receive, from the one or more pressure sensors b1522, data indicative of the pressure within the closed cycle engine b1110 at one or more positions or stations (e.g., within the piston bodies b1116 or along fluid pathways fluidly connecting the piston bodies b1116). As yet another example, the one or more controllers b1510 can receive, from the one or more temperature sensors b1524, data indicative of the temperature within the closed cycle engine b1110 at one or more positions or stations (e.g., within the piston bodies b1116 or along fluid pathways fluidly connecting the piston bodies b1116). Further, the one or more controllers b1510 can receive, from the one or more temperature sensors b1524, data indicative of the temperature at the combustor b1224 or heat source operable to provide thermal energy to the hot side b1112 of the closed cycle engine b1110.

In addition, as another example, the one or more controllers b1510 can receive, from the one or more electric machine sensors b1526, data indicative of one or more operating parameters associated with the one or more electric machines b1310. For instance, the one or more controllers b1510 can receive, from the one or more electric machine sensors b1526, data indicative of the electric current generated or passing through the electric machines b1310, including the amplitude, phase, and/or frequency of the electric current. Moreover, the one or more controllers b1510 can receive, from the one or more electric machine sensors b1526, data indicative of the voltage at the electric machines b1310, including the amplitude, phase, and/or frequency of the voltage. Furthermore, the one or more controllers b1510 can receive, from the one or more electric machine sensors b1526, data indicative of the magnetic field at the electric machines b1310.

As yet another example, the one or more controllers b1510 can receive, from the one or more energy storage device sensors b1528, data b1530 indicative of one or more operating parameters associated with the one or more energy storage devices b1312 in communication with the electric machines b1310. For instance, the one or more controllers b1510 can receive, from the one or more electric machine sensors b1526, data b1530 indicative of the load state of the energy storage devices b1312. In some embodiments, as noted above, the load state of the one or more energy storage devices b1312 is descriptive of at least one of a state of charge and a charge acceptance rate of the one or more energy storage devices b1312 in communication with the one or more electric machines b1310.

At (b1726), the method (b1700) includes determining a control command based at least in part on the received data indicative of the one or more operating parameters associated with at least one of the closed cycle engine and the one or more electric machines, wherein the control command is selected based at least in part to cause a change in output of the power generation system. For instance, the one or more controllers b1510 can receive the data at (b1724), and based at least in part on the received data, the one or more controllers b1510 can determine one or more control commands b1532 indicative of instructions for causing a change in an output of the power generation system b1000. Further, in some embodiments, the control command is determined by the one or more controllers b1510 based at least in part on the operating parameter setpoint set at (b1722).

As one example, the determined control command can be indicative of instructions for causing a change in an output of the one or more electric machines b1310, e.g., by adjusting the electrical load on the electric machines b1310, causing the electric machines b1310 to operate in a more or less efficient manner, etc. As another example, the determined control command can be indicative of instructions for causing a change in an output of the closed cycle engine b1110, which in turn causes a change in the output of the electric machines b1310 operatively coupled thereto. For instance, the control command can be indicative of instructions for causing a change to the pressure of the working fluid within or at some station or position within the engine, the temperature differential $\Delta T$ between the hot side b1112 and the cold side b1114, the volume of the working fluid within the closed cycle engine b1110, the number of moles of the working fluid within the closed cycle engine b1110, etc.

In some embodiments, the one or more controllers b1510 can determine the control command based on only a single operating parameter, such as e.g., piston speed, electric current at the electric machines b1310, the pressure at some station or position within the closed cycle engine b1110, etc. In yet other embodiments, the one or more controllers b1510 can determine the control command based on only two operating parameters, such as e.g., piston speed and the electric current at the electric machines b1310. In some further embodiments, the one or more controllers b1510 can determine the control command based on two or more operating parameters.

In some embodiments, determining the control command based at least in part on the received data indicative of the one or more operating parameters associated with at least one of the closed cycle engine b1110 and the one or more electric machines b1310 includes determining an error or difference between the operating parameter setpoint set at (b1722) and the received operating parameter at (b1724). The one or more controllers b1510 can then determine the control command based at least in part on the determined difference.

Figures 24, 25:
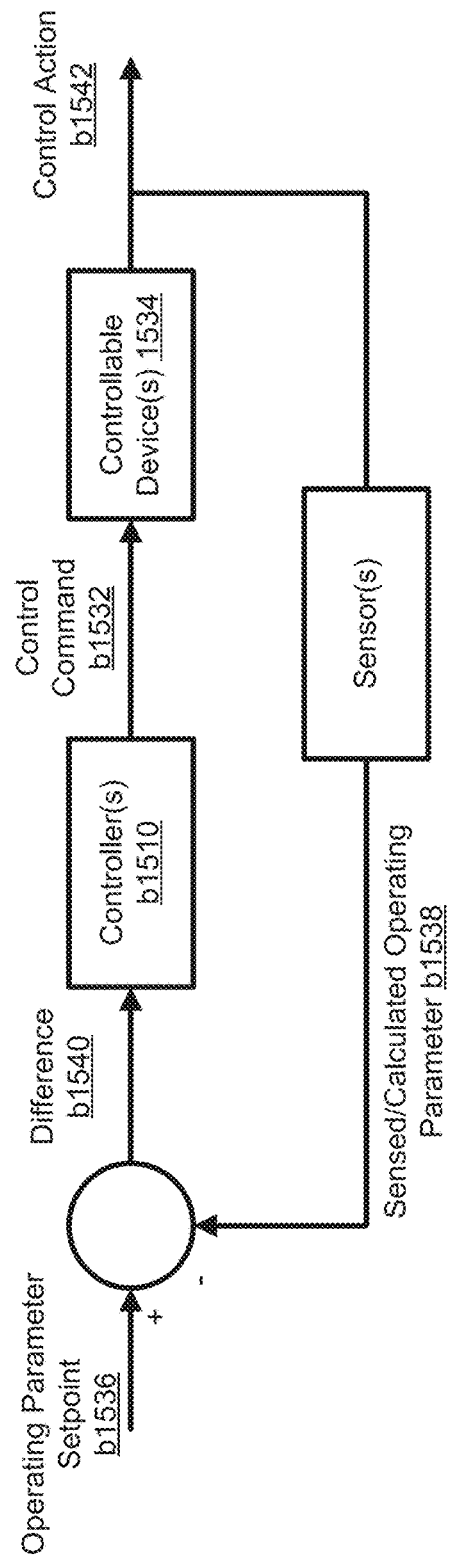
FIG. 24 provides a table of an example control law that associates various differences with various control commands.
FIG. 25 provides an example feedback control loop for controlling the power generation system in accordance with an embodiment of the present disclosure.

For instance, FIG. 24 provides a table of an example control law that associates various differences with various control commands b1532. The control law can be stored in one or more of the memory devices of the one or more controllers b1510, for example. The control law can be accessed by the one or more processors. As noted, the control law associates or corresponds various differences with various control commands b1532. Particularly, as depicted, a difference A corresponds to or is associated with a control command D. For instance, if the difference between the operating parameter setpoint and the received operating parameter yields an error or difference A, the control command D associated with the difference A is determined or selected as the control command. The control command D can be indicative of instructions for adjusting a controllable device b1534, such as e.g., a fuel control device b1214, such that an output of the power generation system b1000 is changed. More specifically, the control command D can be indicative of instructions for adjusting the controllable device b1534 such that the difference between the operating parameter setpoint and the sensed operating parameter received as part of the data is driven toward zero (0). In this way, the control command determined or selected based at least in part on data received from the one or more sensors, when provided to a controllable device, can cause the electric machine operatively coupled with the piston assembly to generate a preselected electrical power output.

As further shown in FIG. 24, a difference B corresponds to or is associated with a control command E, a difference C corresponds to or is associated with a control command F, and so on as the Nth difference corresponds with the Nth control command. In some embodiments, the determined difference and the control command can be associated with one another in a one-to-one relationship. In other embodiments, the determined difference and the control command can be associated with one another based at least in part on some mathematical relationship, such as via derivatives or integrals.

FIG. 25 provides an example feedback control loop for controlling the power generation system b1000 in accordance with an embodiment of the present disclosure. As shown in FIG. 25, an operating parameter setpoint b1536 is input into a summation block. For instance, the operating parameter setpoint b1536 input into the summation block can be the operating parameter setpoint set at (b1722). For this example, the operating parameter setpoint b1536 is a target piston speed of a piston assembly b1120 of the closed cycle engine b1110. The piston speed target can be selected to achieve a particular power output of the electric machines b1310. For instance, the one or more controllers b1510 can access the control law of FIG. 18 and select the piston speed that corresponds with the desired power output of the electric machines b1310. However, the operating parameter setpoint b1536 can be a target value for some other operating parameter associated with at least one of the electric machines b1310 and the closed cycle engine b1110. As further depicted, one or more sensed/calculated operating parameters b1538 received as part of the data at (b1724) are input into the summation block as well. For this example, the sensed/calculated operating parameter b1538 is the piston speed of the piston assembly b1120 of the closed cycle engine b1110. The piston speed of the piston assembly b1120 can be sensed by one of the piston movement sensors b1520.

The operating parameter setpoint b1536 (e.g., the target piston speed) and the sensed/calculated operating parameter b1538 (e.g., the actual piston speed of the piston assembly b1120) are input into the summation block and the one or more controllers b1510 then determine the error or difference b1540 therebetween. The one or more controllers b1510 can then make an adjustment to drive the difference b1540 toward zero (0). For instance, the one or more controllers b1510 can access the control law of FIG. 24, and can determine a control command that corresponds or is associated with the determined difference b1540. The control command is indicative of instructions for causing a change in an output of the power generation system b1000. As one example, the control command b1532 can be provided to a controllable device b1534 that is operable to control an input (e.g., a thermal input) to a working fluid disposed within the piston body b1116 in which the piston assembly b1120 is disposed. In this way, ultimately, the piston speed of the piston assembly b1120 is changed and the difference b1540 between the operating parameter setpoint b1536 and the sensed/calculated operating parameter b1538 is driven towards zero (0), and consequently, the amount of electrical power generated by the electric machine b1310 operatively coupled thereto is changed.

Figure 26:
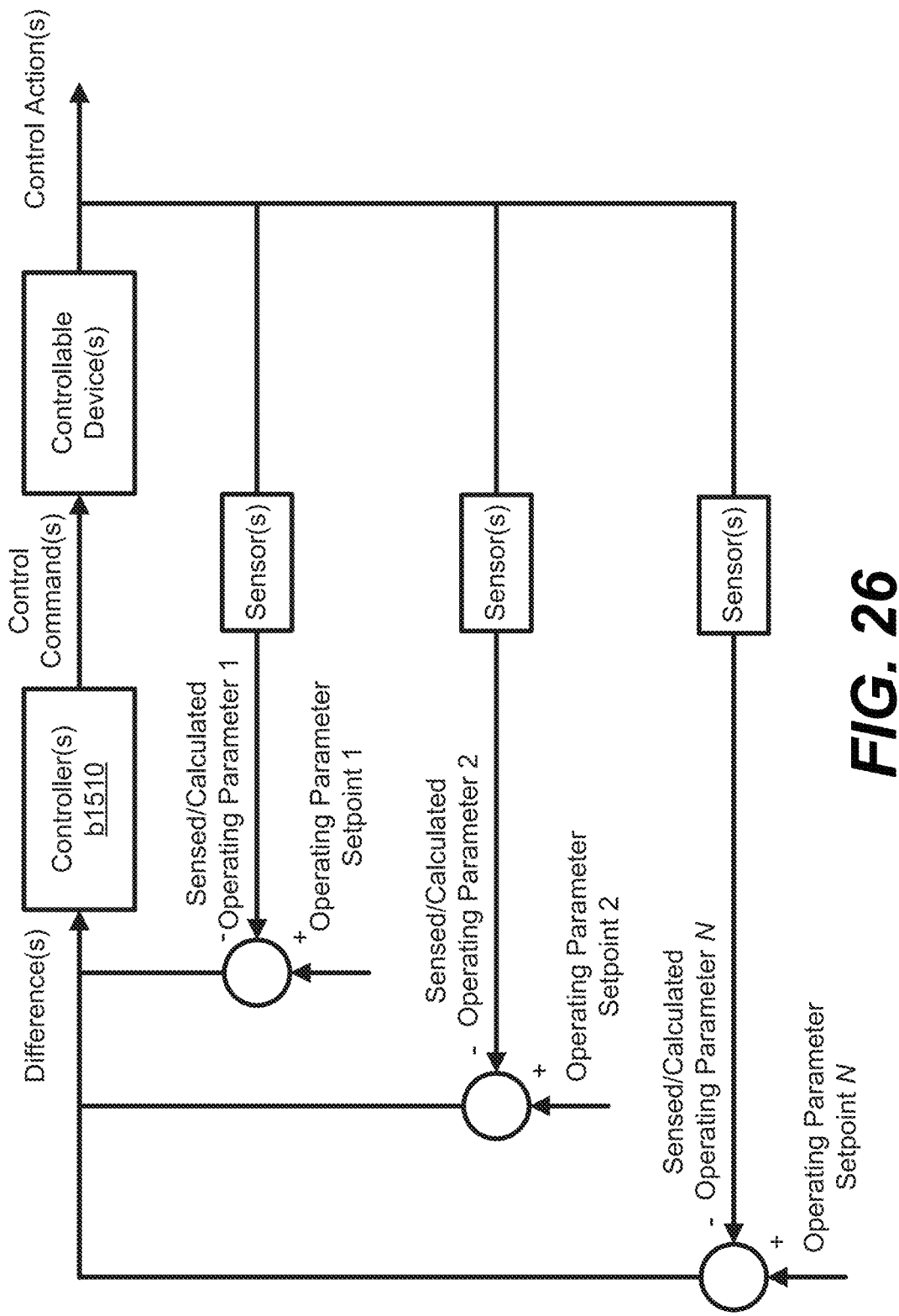
FIG. 26 provides another example feedback control loop for controlling the power generation system in accordance with an embodiment of the present disclosure.

FIG. 26 provides another example feedback control loop for controlling the power generation system b1000 in accordance with an embodiment of the present disclosure. As shown in FIG. 26, in some embodiments, a plurality of differences can be determined and the one or more controllers b1510 can output one or more control commands b1532 based at least in part on the determined differences. Particularly, a first operating parameter setpoint and a first sensed operating parameter are input into a first summation block. Once the first operating parameter setpoint (e.g., the target piston speed) and the first sensed operating parameter (e.g., the actual piston speed of the piston assembly b1120) are input into the first summation block, the one or more controllers b1510 then determine a first difference therebetween. The one or more controllers b1510 can then make an adjustment to drive the first difference toward zero (0), e.g., in a manner noted above. Further, a second operating parameter setpoint and a second sensed operating parameter are input into a second summation block. Once the second operating parameter setpoint (e.g., the target pressure of the working fluid at a station within the engine) and the second sensed operating parameter (e.g., the actual pressure of the working fluid at the station) are input into the second summation block, the one or more controllers b1510 then determine a second difference therebetween. The one or more controllers b1510 can then make an adjustment to drive the second difference toward zero (0), e.g., in a manner noted above. Moreover, a third operating parameter setpoint and a third sensed operating parameter are input into a third summation block. Once the third operating parameter setpoint (e.g., the voltage or current at the electric machines b1310) and the third sensed operating parameter (e.g., the actual voltage or electrical current at the electric machines b1310) are input into the third summation block, the one or more controllers b1510 then determine a third difference therebetween. The one or more controllers b1510 can then make an adjustment to drive the third difference toward zero (0), e.g., in a manner noted above. In such embodiments, the one or more controllers b1510 can determine each of the differences and determine one or more control commands b1532 that drive the differences toward zero (0). In some instances, the one or more controllers b1510 can assign weights to the differences, e.g., based on some preselected criteria, and determine the control commands b1532 in accordance with the determined differences and applied weights. The applied weights can be selected based at least in part on the selected control scheme and/or the importance of driving a particular difference toward zero (0). Further, the applied weights can be selected based at least in part on an optimization function that seeks to minimize or maximize a certain aspect of the power generation system b1000.

At (b1728), with reference again to FIG. 17, the method (b1700) includes providing the control command to a controllable device b1534. In this way, the controllable device b1534 can execute the control command (e.g., perform a control action) to change an output of the power generation system b1000. For instance, as shown in FIG. 25, the determined control command can be provided to the controllable device b1534. The controllable device b1534 can perform a control action b1542 based at least in part on the control command. For instance, if the controllable device b1534 is a valve and the control command is indicative of instructions for opening the valve to a set position or angle, the controllable device b1534 can actuate the valve to the set position based at least in part on the provided control command. When the controllable device b1534 performs the control action b1542 in accordance with the control command, the output of the power generation system b1000 is changed. For example, in performing the control action b1542, the controllable device b1534 can cause a change to the amount of work done on the piston by the working fluid within the piston body b1116 and/or the amount of work done by the piston on the working fluid within the piston body b1116 (e.g., depending on whether the working fluid is expanding or contracting). By changing the work done by or on the piston, the piston speed of the piston assembly b1120 is changed, which ultimately changes the output of the power generation system b1000. As noted herein, the controllable device b1534 can be any device communicatively coupled with the one or more controllers b1510 that, when commanded by the one or more controllers b1510 via a control command, causes a change in output of the power generation system b1000.

FIG. 27 provides a schematic view of an example heater loop b1210 of the balance of plant b1200 of the power generation system b1000 of FIGS. 12 and 13. As shown, in some example embodiments, the controllable device b1534 is a device operable to change the temperature differential ΔT between the hot side b1112 and the cold side b1114 of the closed cycle engine b1110. As one example, the controllable device b1534 is a fuel control device b1214 positioned along an intake line b1232 of the heater loop b1210. The one or more controllers b1510 can provide the control command to the fuel control device b1214, e.g., to change the amount of fuel flowing to the combustor b1224 positioned downstream of the fuel control device b1214 along the heater loop b1210. The fuel control device b1214 can perform a control action b1542 based at least in part on the provided control command. For instance, the fuel control device b1214 can modulate the amount of fuel provided to the combustor b1224, e.g., to change the fuel/air mixture thereof and consequently the heat input to the hot side b1112 of the closed cycle engine b1110.

As another example, with reference still to FIG. 27, the controllable device b1534 can be an actuator b1226 operable to move or control a recirculation device b1230 positioned along the heater loop b1210. The actuator b1226 is operatively coupled with the recirculation device b1230. The one or more controllers b1510 can provide the control command to the actuator b1226, e.g., to change the amount of combustion gasses or heating working fluid HWF recirculated to the combustor b1224. In this way, the equivalence ratio (i.e., the ratio of the actual fuel/air ratio to the stoichiometric fuel/air ratio) can be changed, and thus ultimately the heat input to the hot side b1112 of the closed cycle engine b1110 can be changed, which in turn changes the output of the power generation system b1000. In some example embodiments, the recirculation device b1230 is a geometry-based control device. For instance, e.g. the geometry-based control device can be built into some portion of the heater body. Based upon one or more flowrates through the passages of the heater body, the geometry-based control device can direct a preselected amount of recirculated heating working fluid HWF to the combustor b1224 with the remaining portion being exhausted from the system and/or used as a heat recovery source for imparting thermal energy to components of the heater loop b1210 and/or the chiller loop b1212 and/or some other thermal system or application in fluid communication with the balance of plant b1200 of the cycle engine.

As yet another example, the controllable device b1534 can be the compressor b1222 of the heater loop b1210. The one or more controllers b1510 can provide the control command to the compressor b1222, e.g., to change the speed of the compressor b1222. In this way, the mass flow and/or the pressure of the air flowing downstream to the combustor b1224 can be changed, and thus ultimately the heat input to the hot side b1112 of the closed cycle engine b1110 can be changed, which in turn changes the output of the power generation system b1000.

With reference again to FIG. 13, in some example embodiments, the controllable device b1534 is a device operable to change the load on the electric machines b1310 (i.e., the torque load thereon), which causes a change in the amount of electrical power generated by the one or more electric machines b1310. Changing the electrical load on the electric machines b1310 may also change the motion characteristics of the piston assemblies b1120 of the closed cycle engine b1110. As one example, the controllable device b1534 is a charge controller b1318 in communication with the electric machines b1310. The charge controller b1318 can include one or more switching devices operable to selectively apply a load on the electric machines b1310. The switching devices of the flow control device can be controlled by the one or more controllers b1510 to selectively apply a predetermined load on the electric machines b1310. For instance, based at least in part on a provided control command, the switching devices can allow the energy storage devices b1312 to apply an electric load on the electric machines b1310, or in some instances, the switching devices can prevent the energy storage devices b1312 from applying an electric load on the electric machines b1310. Further, in some embodiments, based at least in part on one or more control commands b1532, the switching devices of the charge controller b1318 can selectively allow one or more resistor banks of the electrical braking system b1320 to apply an electric load on the electric machines b1310, or in some instances, the switching devices can prevent the resistor banks of the electrical braking system b1320 from applying an electric load on the electric machines b1310.

As another example, the controllable device b1534 can be a mechanical braking system b1400 operatively coupled with the electric machines b1310. The one or more controllers b1510 can control the mechanical braking system b1400 to selectively apply a predetermined load on the electric machines b1310. Particularly, the one or more controllers b1510 can provide the control command to the mechanical braking system b1400 and the mechanical braking system b1400 can perform a control action to execute the control command. For instance, the mechanical braking system b1400, when commanded to do so, can apply a predetermined load on the electric machines b1310. Further, the control command can be indicative of instructions to apply more or less of a predetermined load on the electric machines b1310, e.g., to change an output of the power generation system b1000.

As yet another example, the one or more controllers b1510 can cause the one or more electric machines b1310 to operate in a less efficient manner. For instance, the one or more controllers b1510 can provide a control command indicative of instructions for the electric machines b1310 to operate in a less efficient manner, e.g., to apply a predetermined load or torque on the closed cycle engine b1110, which ultimately changes the output of the power generation system b1000. By way of example, the phase or current advance angle, the amplitude of phase current, or some other operating parameter known to affect the efficiency of electric machines b1310 can be controlled to operate one or more of the electric machines b1310 in a reduced-efficiency mode. In some embodiments, the one or more controllers b1510 can cause the one or more electric machines b1310 operate in a more efficient manner, e.g., to change the applied predetermined torque load on the closed cycle engine b1110.

Figure 28:
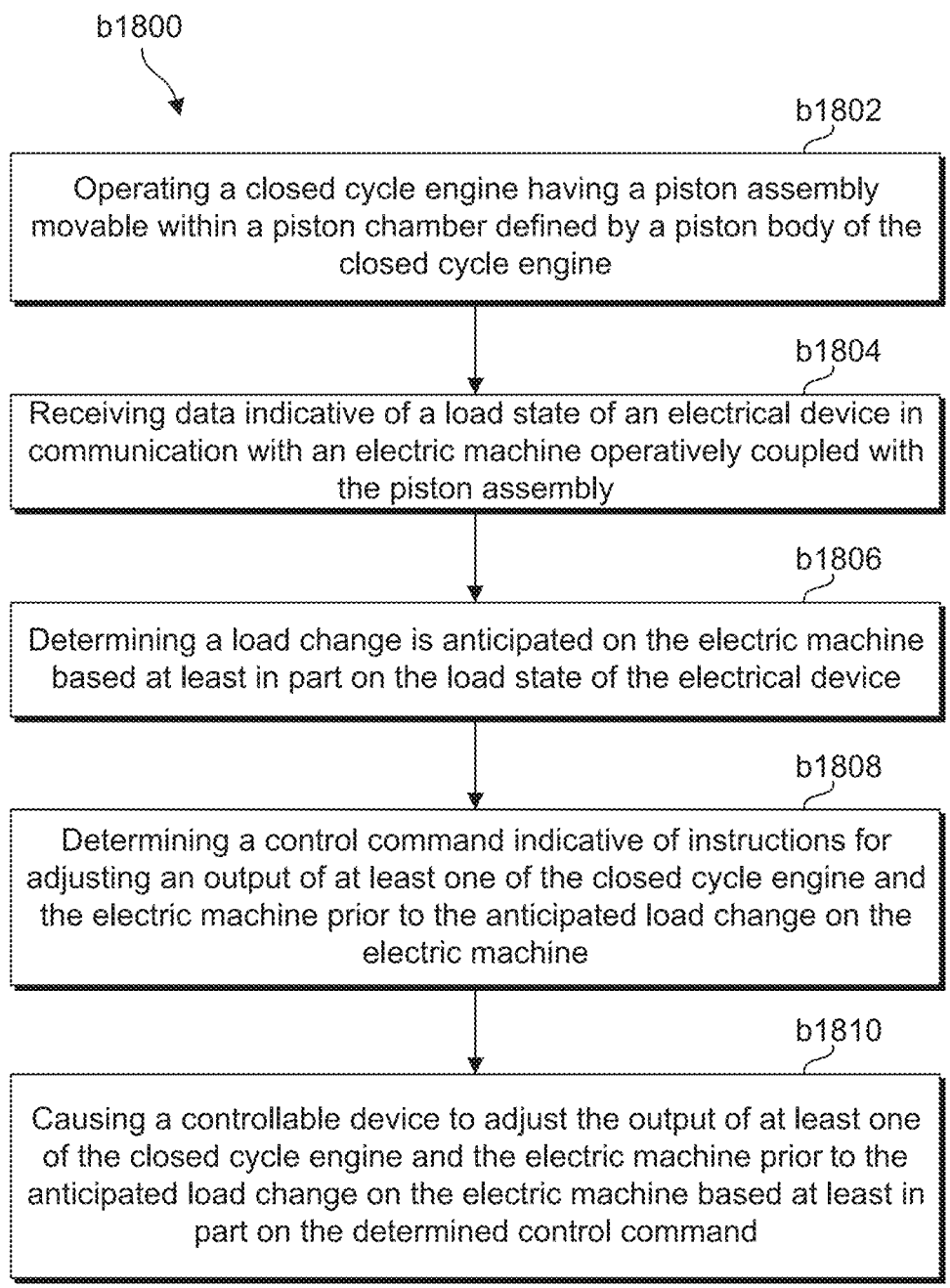
FIG. 28 is a flow diagram of a method for controlling a system according to an example aspect of the present disclosure.

In some implementations, as noted above, the system can anticipate dynamic load changes on the electric machine and make adjustments to the output of the closed cycle engine in anticipation of such load changes. FIG. 28 provides a flow diagram for a method (b1800) of controlling a system according to an example aspect of the present disclosure. For instance, the method (b1800) can be implemented to control any of the energy conversion or power generation systems described herein, such as any of the systems of FIGS. 12, 13, 16, 20, 21, etc. In addition, it will be appreciated that exemplary method (b1800) can be modified, adapted, expanded, rearranged and/or omitted in various ways without deviating from the scope of the present subject matter.

At (b1802), the method (b1800) includes operating a closed cycle engine having a piston assembly movable within a piston chamber defined by a piston body of the closed cycle engine. For instance, the closed cycle engine can be any of the closed cycle engines provided herein. In some implementations, the closed cycle engine is a Stirling engine. In some implementations, the closed cycle engine is a regenerative heat engine. Further, in some implementations, in operating the closed cycle engine b1110 at (b1802), a computer readable medium that includes computer-executable instructions, which, when executed by one or more processors of the controller b1510, cause the controller b1510 to: cause or create a temperature differential between the hot side b1112 and the cold side b1114 of the closed cycle engine b1110 having a piston assembly b1120 movable within a piston chamber b1118 defined by a piston body b1116 of the closed cycle engine b1110, the piston assembly b1120 moved based at least in part on the temperature differential. For instance, the controller b1510 can cause the heater loop b1210 to impart thermal energy to the hot side b1112 and can cause the chiller loop b1212 to remove or extract heat from the cold side b1214. In this way, the engine working fluid EWF to expand and contract, thereby moving the piston assembly b1120 within the piston chamber b1118.

At (b1804), the method (b1800) includes receiving data indicative of a load state of an electrical device in communication with an electric machine operatively coupled with the piston assembly. For instance, the data can be received from various sensors described herein. The controller b1510 can receive data b1530 indicative of a load state of the electrical device in communication with the electric machine b1310 operatively coupled with the piston assembly b1120, the electric machine b1310 being operable to generate electrical power when the piston assembly b1120 is moved within the piston chamber b1118. In some implementations, the electrical device is a power grid. In some implementations, the electrical device is an energy storage device, such as a battery. In some implementations, the electrical device is an electrical device or system of a vehicle. Further, in some implementations, the load state of the electrical device is indicative of the electrical power demanded by the electrical device on the electric machine. In other implementations, the load state of the electrical device includes a runtime indicator indicative of a time period or time in which the electrical device anticipates coming on line, dropping offline, or otherwise anticipates a change demanded power on the electric machines.

In some implementations, the load state of the electrical device received as part of the data can account for a power generation state of one or more other power generation systems. For instance, with reference to FIG. 16, the load state data associated the electrical device received by the controller b1510 can be indicative of a power generation state of other power generation systems in communication with the electrical device (e.g., the energy storage devices b1312 and/or the electrical loads b1316 via the power grid b1332). Particularly, the load state data associated with the electrical device received by the controller b1510 can be indicative of a power generation state of the first power generation system, the second power generation system, and so on to the Nth power generation system. The power generation state data can be received as part of the load state data of the electrical device as noted above, or in some implementations, directly from the power generation system itself. The power generation state data can include how much and when other power generation systems anticipate providing electrical power to the energy storage devices b1312 and/or the electrical loads b1316 via the power grid b1332. Accordingly, the controller b1510 can receive data b1530 indicative of the power generation state of each power generation system in communication with the electrical device, which can include when and how much the other power generation systems anticipate providing electrical power thereto, which ultimately affects the load state of the electrical device (e.g., the power demanded from the electric machine b1310 by the electrical device). In this way, the closed cycle engine b1110 can ramp up or down to anticipate load changes on the electric machine b1310, e.g., in a similar manner as shown in FIG. 22.

With reference again to FIGS. 20 and 21, in some implementations, the load state of the electrical device received as part of the data can account for a power generation state of one or more other power generation systems that include a closed cycle engine and one or more associated electric machines. In addition, the load state of the electrical device can take into account a plurality of electrical device load states, such as the load state of each energy storage device b1312 shown in FIG. 20. The controller b1510 can utilize the collective load state data of the electrical devices to anticipate power demand changes, or stated differently, load changes on the electric machine b1310. Further, with reference to FIG. 21, the load state of the electrical device received as part of the data can account for a load state of one or more other electrical loads b1316 and/or energy storage devices b1312 in communication with the energy management system b1334. In this way, certain closed cycle engines b1110 of the distributed power network b1900 can be ramped up or down or turned on or off to meet anticipated power demand changes, which as noted above, can ultimately cause load changes on the electric machine b1310.

At (b1806), with reference again to FIG. 28, the method (b1800) includes determining a load change is anticipated on the electric machine based at least in part on the load state of the electrical device. In some implementations, the load change is a load decrease on the electric machine. In other implementations, the load change is a load increase on the electric machine. In some implementations, the method (b1800) further includes determining whether the anticipated load change is a load increase or a load decrease. The controller b1510 can determine whether a load change is anticipated, e.g., based on the load state data. As noted above, the load state data can be based at least in part on the power generation state of one or more other power generation systems in communication with the electrical device, including the power generation system state of other closed cycle engines and associated electric machines, a plurality of load states or a collective load state of electrical devices in communication with the electric machine, including via a power grid, and/or some combination thereof.

At (b1808), the method (b1800) includes determining a control command indicative of instructions for adjusting an output of at least one of the closed cycle engine and the electric machine prior to the anticipated load change on the electric machine. The one or more controllers b1510 can determine the control command and can provide the control command to a controllable device, such as any of the controllable devices provided herein. In some implementations, the controller b1510 can determine a control command indicative of instructions for adjusting an output of at least one of the closed cycle engine and the electric machine prior to or at the same time as the anticipated load change on the electric machine. In this way, the closed cycle engine can be ramped up or down in anticipation of the load change, or at the very least, immediately upon the load change. Accordingly, in such implementation, the controller b1510 controls the system in a proactive manner.

At (b1810), the method (b1800) includes causing a controllable device to adjust the output of at least one of the closed cycle engine and the electric machine prior to the anticipated load change on the electric machine based at least in part on the determined control command. In some implementations, the controllable device is a fuel control device. In some implementations, the controllable device is a fuel pump. As noted above, in some implementations, the method (b1800) includes determining whether the anticipated load change is a load increase or a load decrease. In such implementations, on one hand, if the anticipated load change is a load decrease, the control command is determined such that a fuel input to the combustor is ramped down to anticipate the load decrease. On the other hand, if the anticipated load change is a load increase, the control command is determined such that a fuel input to the combustor is ramped up to anticipate the load increase. The controller b1510 can cause a controllable device to adjust the output of at least one of the closed cycle engine and the electric machine prior to or at the same time as the anticipated load change on the electric machine based at least in part on the determined control command.

Chapter 5.1.9—Computing System

Figure 29:
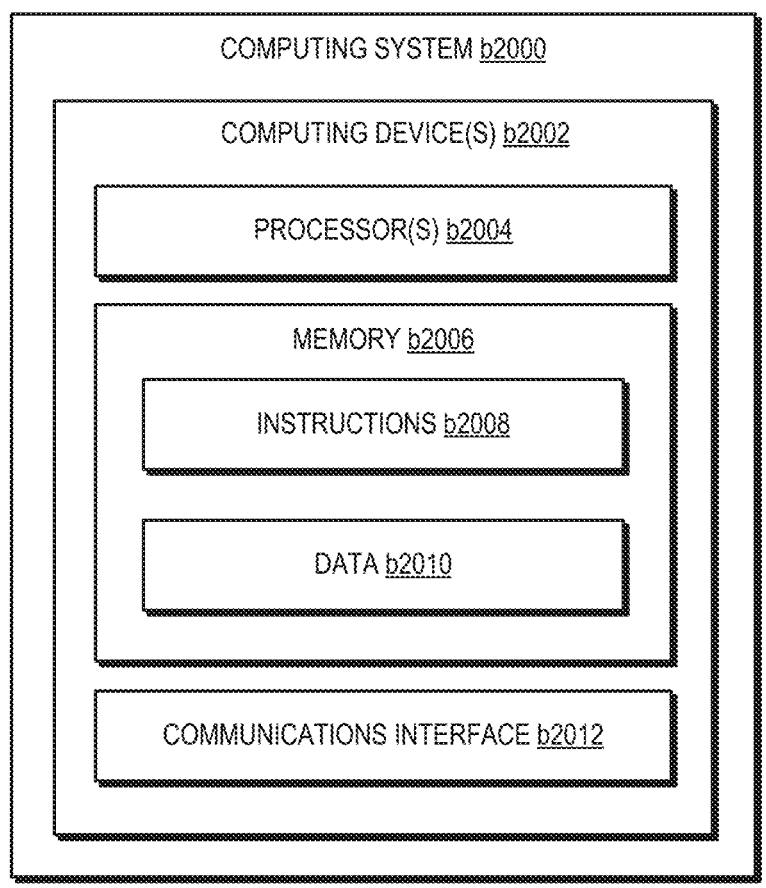
FIG. 29 provides an example computing system in accordance with an example embodiment of the present disclosure.

FIG. 29 provides an example computing system in accordance with an example embodiment of the present disclosure. The one or more controllers, computing devices, or other control devices described herein can include various components and perform various functions of the one or more computing devices of the computing system b2000 described below.

As shown in FIG. 29, the computing system b2000 can include one or more computing device(s) b2002. The computing device(s) b2002 can include one or more processor(s) b2004 and one or more memory device(s) b2006. The one or more processor(s) b2004 can include any suitable processing device, such as a microprocessor, microcontroller, integrated circuit, logic device, and/or other suitable processing device. The one or more memory device(s) b2006 can include one or more computer-readable media, including, but not limited to, non-transitory computer-readable media, RAM, ROM, hard drives, flash drives, and/or other memory devices.

The one or more memory device(s) b2006 can store information accessible by the one or more processor(s) b2004, including computer-readable instructions b2008 that can be executed by the one or more processor(s) b2004. The instructions b2008 can be any set of instructions that when executed by the one or more processor(s) b2004, cause the one or more processor(s) b2004 to perform operations. In some embodiments, the instructions b2008 can be executed by the one or more processor(s) b2004 to cause the one or more processor(s) b2004 to perform operations, such as any of the operations and functions for which the computing system b2000 and/or the computing device(s) b2002 are configured, such as e.g., operations for controlling certain aspects of power generation systems and/or controlling one or more closed cycle engines as described herein. For instance, the methods described herein can be implemented in whole or in part by the computing system b2000. Accordingly, the method can be at least partially a computer-implemented method such that at least some of the steps of the method are performed by one or more computing devices, such as the exemplary computing device(s) b2002 of the computing system b2000. The instructions b2008 can be software written in any suitable programming language or can be implemented in hardware. Additionally, and/or alternatively, the instructions b2008 can be executed in logically and/or virtually separate threads on processor(s) b2004. The memory device(s) b2006 can further store data b2010 that can be accessed by the processor(s) b2004. For example, the data b2010 can include models, databases, etc.

The computing device(s) b2002 can also include a network interface b2012 used to communicate, for example, with the other components of system (e.g., via a network). The network interface b2012 can include any suitable components for interfacing with one or more network(s), including for example, transmitters, receivers, ports, controllers b1510, antennas, and/or other suitable components. One or more controllable devices b1534 and other controllers b1510 can be configured to receive one or more commands or data from the computing device(s) b2002 or provide one or more commands or data to the computing device(s) b2002.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
   a closed cycle engine having a piston body defining a first chamber and a second chamber and having a piston assembly that includes pistons coupled to a connection member, one of the pistons being movable within the first chamber and one of the pistons being movable within the second chamber;
   an electric machine operatively coupled with the piston assembly, wherein the electric machine is operable to generate electrical power when the pistons are moved within their respective first and second chambers;
   an electrical device in communication with the electric machine, the electrical device operable to receive electrical power from the electric machine; and
   a control system, comprising:
      one or more sensors;
      a controllable device; and
      a controller communicatively coupled with the one or more sensors and the controllable device, the controller being configured to:
         determine whether a load change on the electric machine is anticipated based at least in part on data received indicative of a load state of the electrical device;
         in response to whether the load change is anticipated, determine a control command indicative of instructions for adjusting a thermal input to the closed cycle engine; and
         cause the controllable device to adjust the thermal input based at least in part on the control command.

2. The system of claim 1, wherein the one piston movable within the first chamber and the one piston movable within the second chamber are movable within their respective first and second chambers linearly.

3. The system of claim 1, wherein the one piston movable within the first chamber and the one piston movable within the second chamber are coupled to opposing ends of the connection member.

4. The system of claim 1, wherein the electric machine includes a dynamic member in operable communication with a stator assembly, and wherein the dynamic member of the electric machine is connected to the connection member.

5. The system of claim 1, wherein the electric machine includes a dynamic member in operable communication with a stator assembly, and
   wherein a first dynamic member of the dynamic member is connected to the one piston movable within the first chamber and a second dynamic member of the dynamic member is connected to the one piston movable within the second chamber, and
   wherein a first stator of the stator assembly is positioned at the piston body along the first chamber and a second stator of the stator assembly is positioned at the piston body along the second chamber.

6. The system of claim 1, wherein the piston assembly is a free piston assembly that is mechanically decoupled from the piston body.

7. The system of claim 1, wherein the closed cycle engine further includes a second piston body defining a third chamber and a fourth chamber and has a second piston assembly that includes second pistons coupled to a second connection member, one of the second pistons being movable within the third chamber and one of the second pistons being movable within the fourth chamber.

8. The system of claim 7, wherein the closed cycle engine includes a first interconnected volume in which the first chamber is in fluid communication with the fourth chamber and a second interconnected volume in which the second chamber is in fluid communication with the third chamber, the first and second interconnected volumes being at least one of substantially fluidly separated from one another and substantially pneumatically separated from one another.

9. The system of claim 1, wherein the load state of the electrical device is indicative of an anticipated change in electrical power demanded by the electrical device on the electric machine and an anticipated time at which the anticipated change in electrical power demanded by the electrical device on the electric machine is to occur.

10. The system of claim 1, wherein the electrical device is one of a plurality of electrical devices, and wherein the load state of the electrical device is indicative of a total anticipated change in electrical power demanded by the plurality of electrical devices on the electric machine for a predetermined time period, and
    wherein the control command is determined based at least in part on the total anticipated change in electrical power demanded by the plurality of electrical devices on the electric machine over the predetermined time period.

11. The system of claim 1, wherein the controller is configured to:
    determine whether the anticipated load change is a load increase or a load decrease, and
    wherein if the anticipated load change is a load decrease, the control command is determined such that a fuel input to the closed cycle engine is ramped down to anticipate the load decrease, and
    wherein if the anticipated load change is a load increase, the control command is determined such that a fuel input to the closed cycle engine is ramped up to anticipate the load increase.

12. A method, comprising:
    operating a closed cycle engine having a piston body defining a first chamber and a second chamber and having a piston assembly that includes pistons coupled to a connection member, one of the pistons being movable within the first chamber and one of the pistons being movable within the second chamber;
    receiving data indicative of a load state of an electrical device in communication with an electric machine operatively coupled with the piston assembly;
    determining a load change is anticipated on the electric machine based at least in part on the load state of the electrical device;
    determining a control command indicative of instructions for adjusting a thermal input to the closed cycle engine prior to the anticipated load change on the electric machine; and
    causing a controllable device to adjust the thermal input to the closed cycle engine prior to the anticipated load change on the electric machine based at least in part on the determined control command.

13. The method of claim 12, wherein the load state of the electrical device is indicative of the electrical power demanded by the electrical device on the electric machine.

14. The method of claim 12, wherein the load state of the electrical device includes a runtime indicator indicative of a time period in which the electrical device anticipates coming on line or dropping offline.

15. The method of claim 12, further comprising:
determining whether the anticipated load change is a load increase or a load decrease, and
wherein if the anticipated load change is a load decrease, the control command is determined such that a fuel input to a combustor of the closed cycle engine is ramped down to anticipate the load decrease, and
wherein if the anticipated load change is a load increase, the control command is determined such that a fuel input to a combustor of the closed cycle engine is ramped up to anticipate the load increase.

16. The method of claim 12, wherein the controllable device is a fuel control device.

17. The method of claim 12, wherein the one piston movable within the first chamber and the one piston movable within the second chamber are movable within their respective first and second chambers linearly.

18. A computer readable medium comprising computer-executable instructions, which, when executed by one or more processors of a controller, cause the controller to:
cause a temperature differential between a hot side and a cold side of a closed cycle engine, the closed cycle engine having a piston body defining a first chamber and a second chamber and having a piston assembly that includes pistons coupled to a connection member, one of the pistons being movable within the first chamber and one of the pistons being movable within the second chamber, the pistons being moved within their respective first and second chambers based at least in part on the temperature differential;
receive data indicative of a load state of an electrical device in communication with an electric machine operatively coupled with the piston assembly, the electric machine operable to generate electrical power when the piston assembly is moved within the piston chamber;
determine whether a load change is anticipated on the electric machine based at least in part on the load state of the electrical device;
determine a control command indicative of instructions for adjusting a thermal input to the closed cycle engine prior to or at the same time as the anticipated load change on the electric machine; and
cause a controllable device to adjust the thermal input to the closed cycle engine prior to or at the same time as the anticipated load change on the electric machine based at least in part on the determined control command.

19. The computer readable medium of claim 18, wherein the closed cycle engine is a regenerative heat engine.

20. The computer readable medium of claim 18, wherein the piston assembly is a linearly movable free piston assembly that is mechanically decoupled from the piston body.

* * * * *